(12) United States Patent
Yoshinaga et al.

(10) Patent No.: US 8,502,810 B2
(45) Date of Patent: Aug. 6, 2013

(54) DISPLAY DEVICE AND DISPLAY METHOD

(75) Inventors: Tomoro Yoshinaga, Kanagawa (JP); Takashi Hirakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 631 days.

(21) Appl. No.: 12/771,619

(22) Filed: Apr. 30, 2010

(65) Prior Publication Data

US 2010/0295837 A1 Nov. 25, 2010

(30) Foreign Application Priority Data

May 19, 2009 (JP) ................................ 2009-120730

(51) Int. Cl.
*G06F 3/038* (2013.01)
*G09G 5/00* (2006.01)

(52) U.S. Cl.
USPC ........................................................ 345/211

(58) Field of Classification Search
USPC ........................................................ 345/211
See application file for complete search history.

(56) References Cited

U.S. PATENT DOCUMENTS

| | | | | |
|---|---|---|---|---|
| 5,959,930 | A * | 9/1999 | Sakurai | 365/230.03 |
| 6,084,562 | A * | 7/2000 | Onda | 345/94 |
| 7,233,033 | B2 * | 6/2007 | Koyama et al. | 257/223 |
| 2008/0284707 | A1 * | 11/2008 | Katagawa et al. | 345/96 |

FOREIGN PATENT DOCUMENTS

| | | |
|---|---|---|
| JP | 04-104675 | 4/1992 |
| JP | H10-032772 A | 2/1998 |
| JP | H10-039841 A | 2/1998 |
| JP | H11-259053 A | 9/1999 |
| JP | 2005-173418 A | 6/2005 |
| JP | 2006-202355 A | 8/2006 |

OTHER PUBLICATIONS

Japanese Office Action issued on Dec. 4, 2012 in Patent Application No. 2009-120730.

* cited by examiner

*Primary Examiner* — Kevin M Nguyen
*Assistant Examiner* — Kenneth B Lee, Jr.
(74) *Attorney, Agent, or Firm* — Sony Corporation

(57) ABSTRACT

A display device includes: a pixel array unit including a plurality of scanning lines and a plurality of signal lines; a scanning line driving unit that sequentially applies a driving voltage to the plurality of scanning lines according to a shift timing indicated by a shift clock; a signal line driving unit that drives the plurality of signal lines on the basis of an input video signal, and a clock adjusting unit that adjusts the shift clock such that there are n (n is a natural number equal to or greater than 2) shift timings within each one horizontal line period for which an image signal corresponding to one horizontal line is displayed.

12 Claims, 39 Drawing Sheets

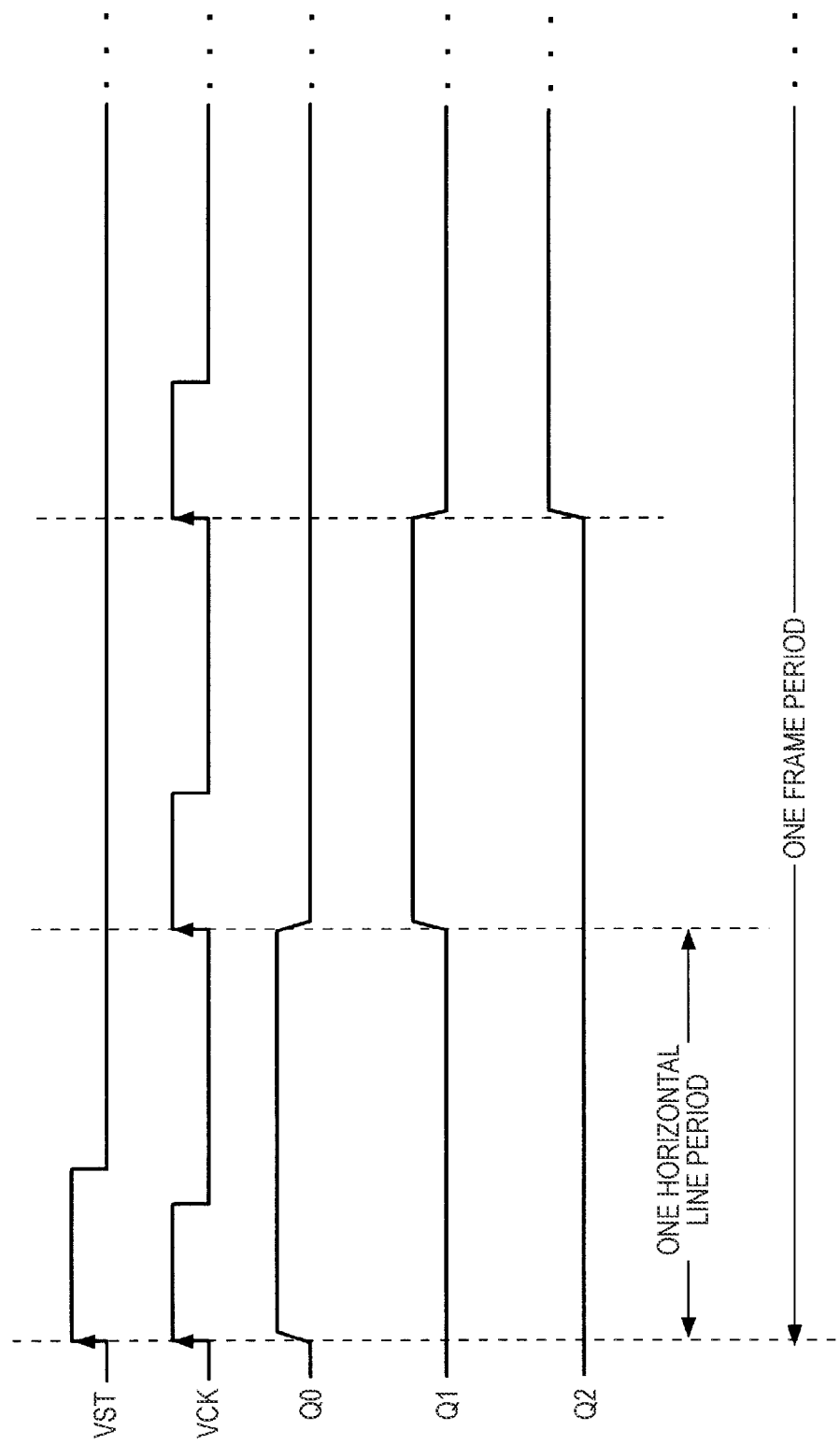

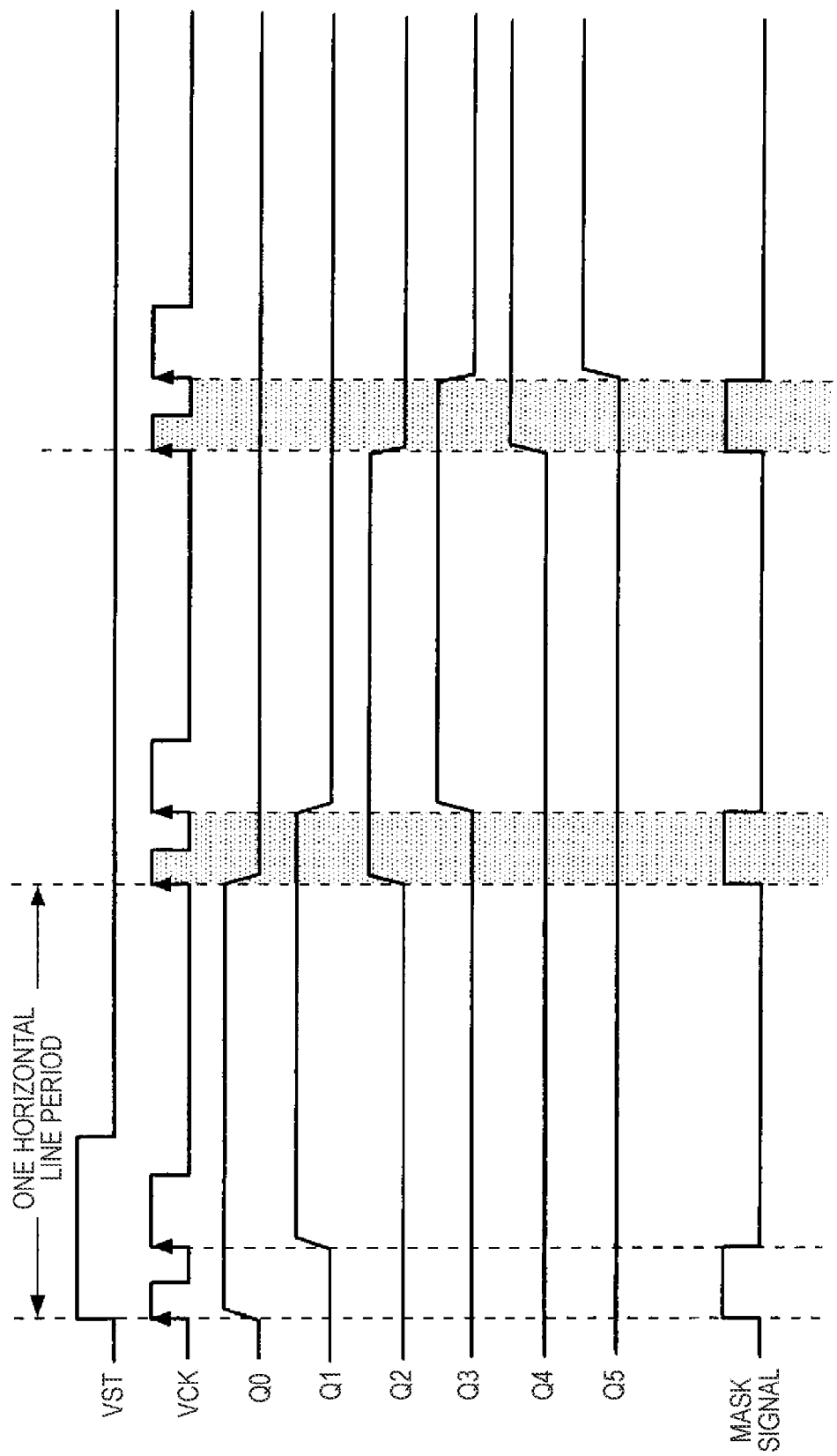

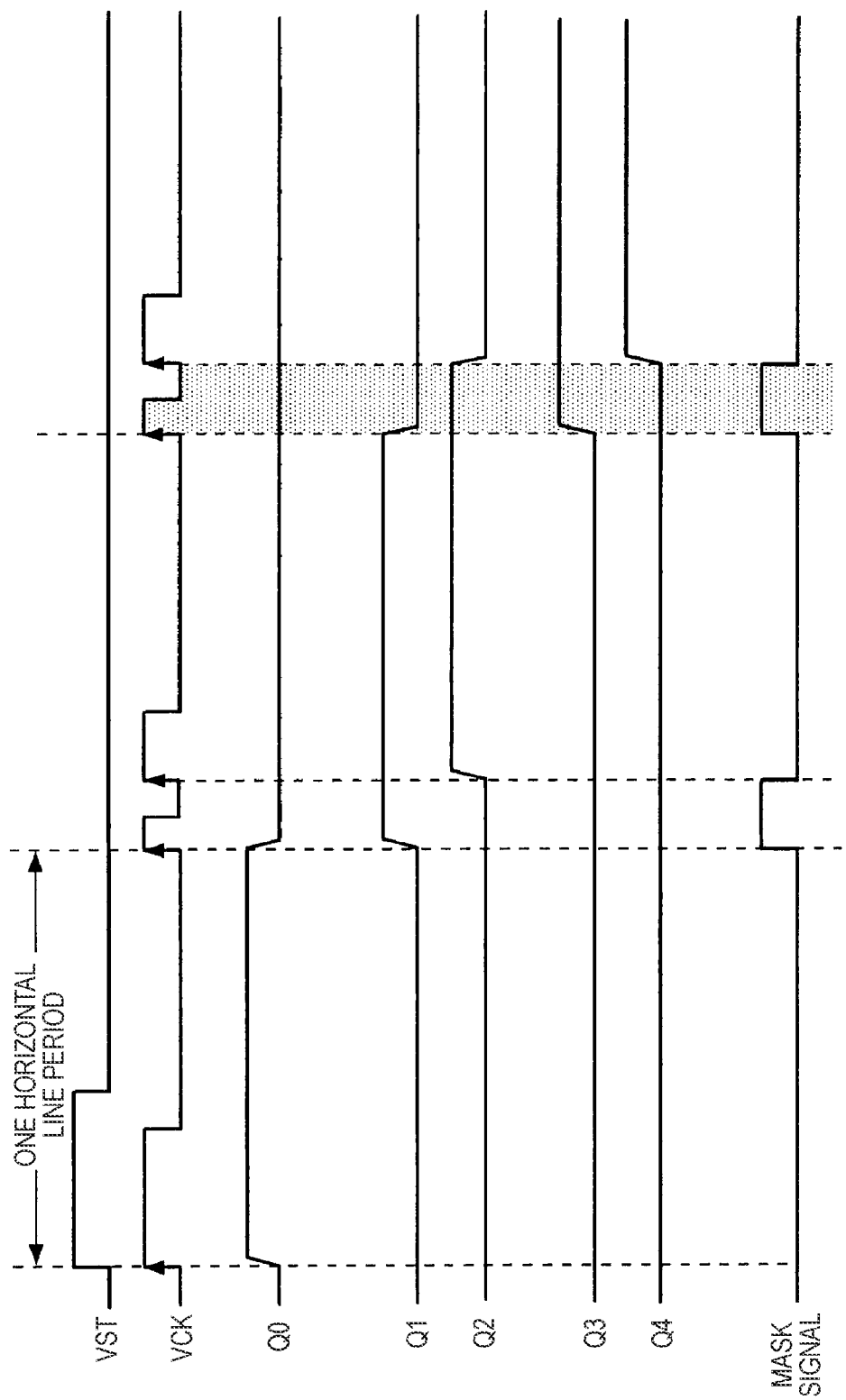

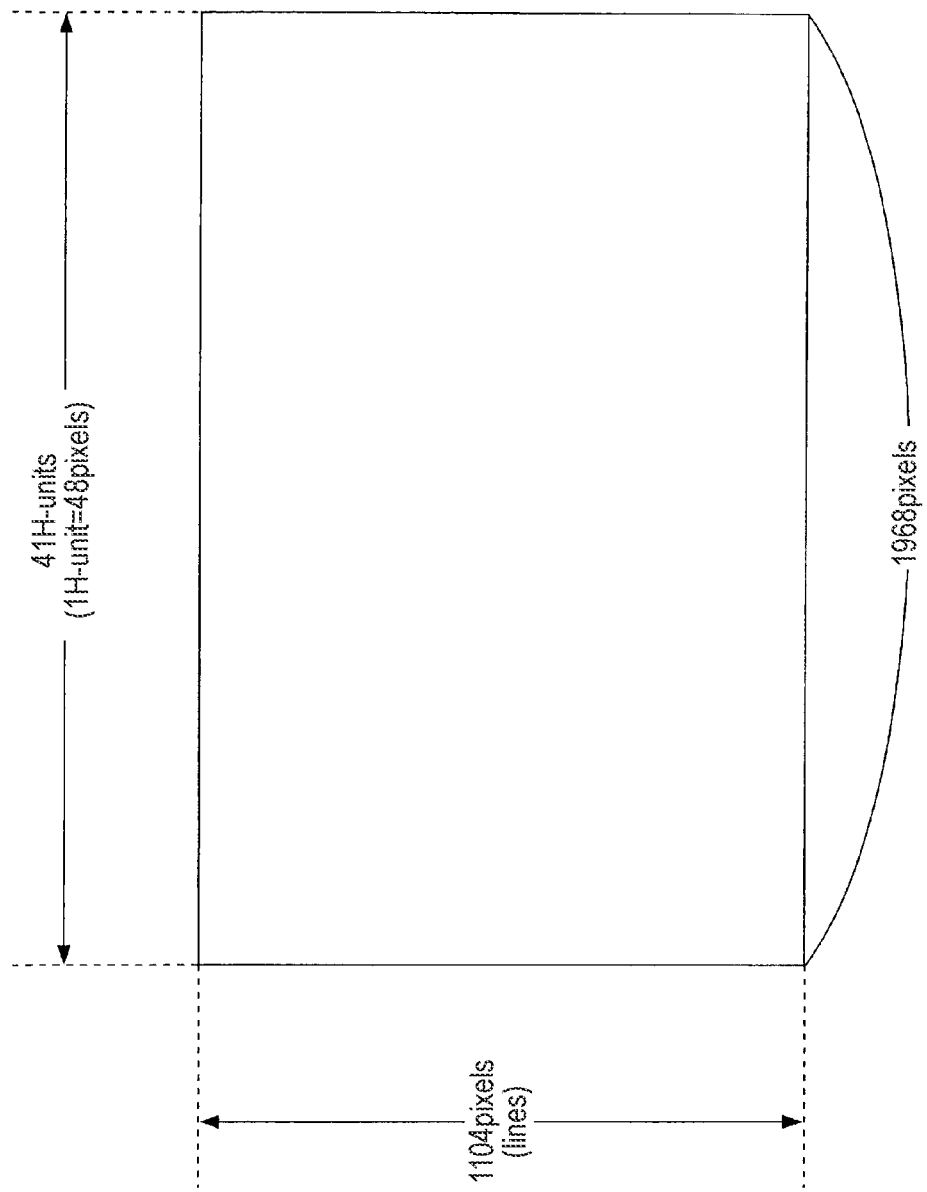

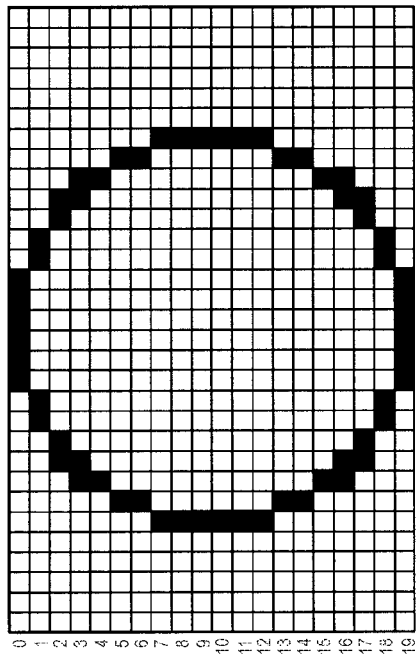
FIG.19A INPUT IMAGE
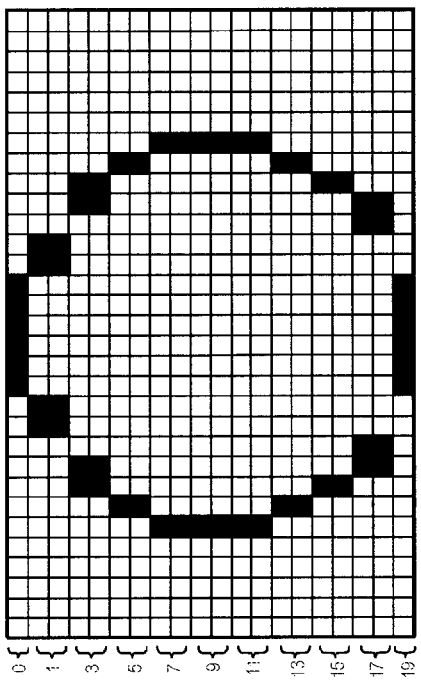
FIG.19C ODD FRAME
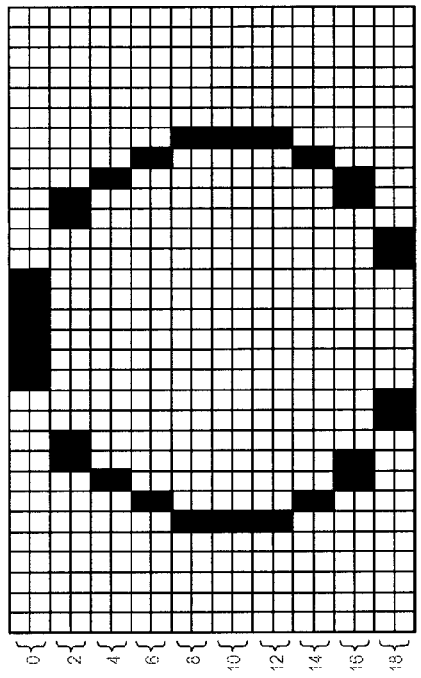
FIG.19B EVEN FRAME

ACTUAL VIEW
(EVEN FRAME + ODD FRAME)

FIFTH EMBODIMENT

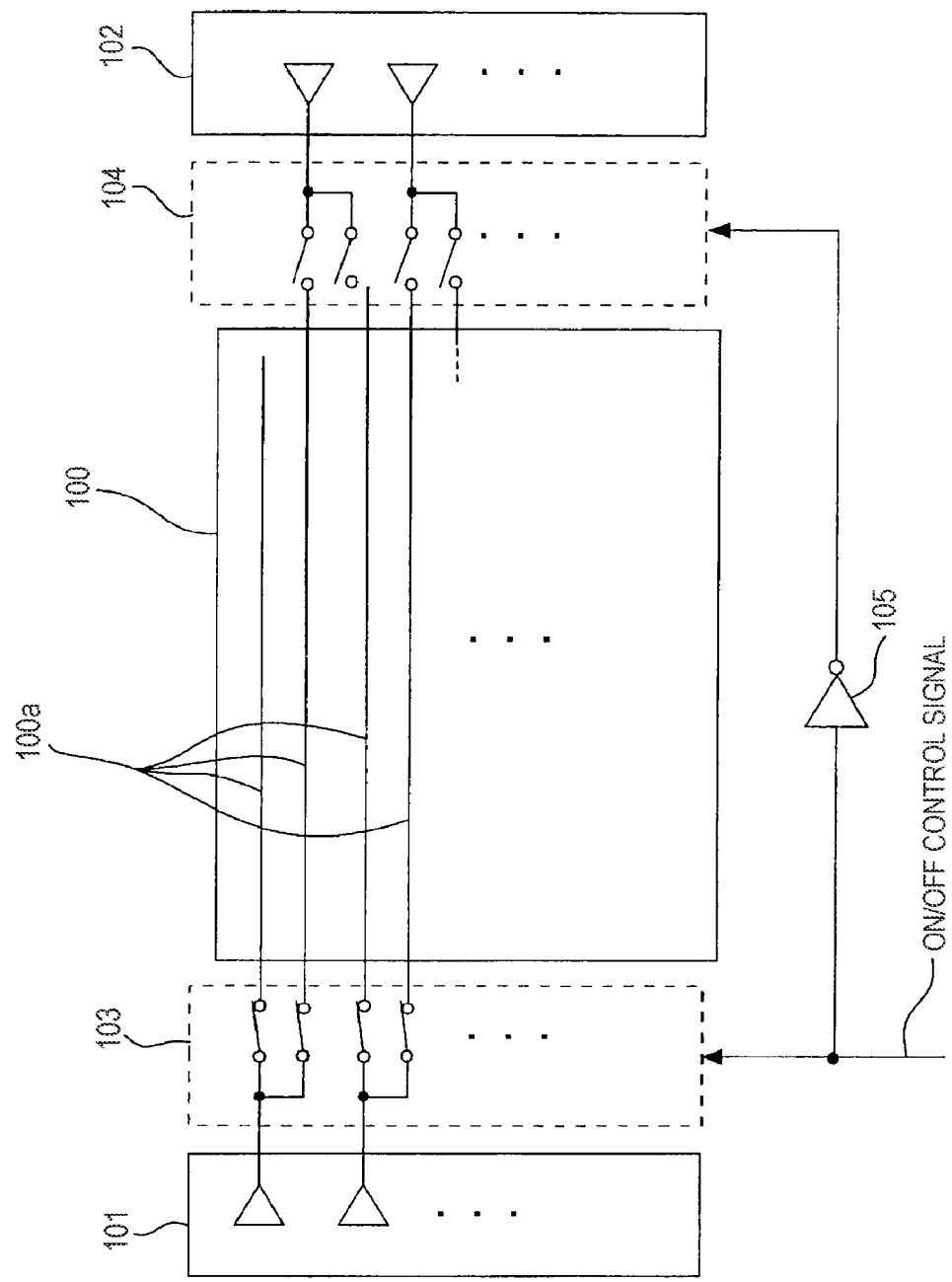

DISPLAY DEVICE AND DISPLAY METHOD

BACKGROUND OF THE INVENTION

1. Field of the Invention

The present invention relates to a display device that includes a display unit having a plurality of scanning lines and a plurality of signal lines and displays an image and a display method.

2. Description of the Related Art

For example, so-called flat panel displays (hereinafter, referred to as FPDs), such as a liquid crystal display, an organic EL (Electro Luminescence) display, a plasma display, and an FED (Field Emission display) have been widely spread.

The FPD uses a fixed pixel method that fixedly arranges pixels in the horizontal direction and the vertical direction and performs image display.

The quality of a moving picture displayed by the FPD is not sufficiently higher than that of, for example, a CRT (Cathode Ray Tube) display according to the related art. Therefore, it is necessary to improve the image quality of the FPD. For example, the problems arising in the display of a moving picture include so-called motion blur and jerkiness which is perceived as an overlap image.

These problems are caused by, for example, the delay of a screen switching response speed or hold-type display in the case of a liquid crystal display. In the hold-type display, while images are continuously displayed for one frame period, the observer determines that the displayed object is being moved and moves the eyes in the traveling direction of the object. Therefore, there is a deviation between the actual display position and the view position, and the deviation is accumulated in the retina, which is perceived as motion blur.

For example, low time reproducibility in image display causes the deterioration of the quality of a moving picture, such as motion blur. Therefore, in order to improve the quality of the moving picture, it is effective to increase the frame rate and improve the time reproducibility.

In order to increase the frame rate, for example, there is a method of simultaneously driving a plurality of adjacent scanning lines. Specifically, in general, one scanning line is driven for one horizontal line period. However, in this case, a plurality of scanning lines are simultaneously driven.

FIG. 40 is a diagram illustrating an example of the detailed structure for simultaneously driving a plurality of lines to improve the frame rate.

The structure shown in FIG. 40 corresponds to when two adjacent scanning lines are simultaneously driven for one horizontal line period.

In FIG. 40, a pixel array 100 corresponds to a so-called dot matrix image display and includes a plurality of scanning lines 100a, as shown in FIG. 40. Although not shown in FIG. 40, the image array 100 includes a plurality of signal lines intersecting the plurality of scanning lines 100a. A set of a transistor (switch) and a storage capacitor is provided at each of the intersections of the scanning lines 100a and the signal lines. One set of the transistor and the capacitor forms one pixel.

When a driving voltage is applied to the scanning line 100a, each transistor connected to the scanning line 100a is turned on and signal values can be written to each pixel including the transistor (active state). Then, when a voltage corresponding to an input image (corresponding to one line) is applied to each signal line, the signal value can be written to each pixel on the scanning line 100a in the active state. In general, the driving voltage is sequentially applied to the scanning lines 100a to select the scanning lines, and an image corresponding to one frame is sequentially displayed on the lines.

In the structure shown in FIG. 40, as the drivers (line driving circuit) that apply the driving voltage to the scanning lines 100a, a driver 101 and a driver 102 are provided as shown in FIG. 40. A switch circuit 103 including a plurality of switches each capable of simultaneously supplying the output voltage of the driver 101 to each set of two scanning lines 100a is provided between the driver 101 and the scanning lines 100a. In addition, a switch circuit 104 including a plurality of switches each capable of simultaneously supplying the output voltage of the driver 102 to each set of two scanning lines 100a, which is different from the set of two scanning lines 100a supplied with the driving voltage by the switch circuit 103, is provided between the driver 102 and the scanning lines 100a.

The on/off operations of the switch circuit 103 are controlled by an ON/OFF control signal. Specifically, the switch circuit 103 turns on the plurality of switches when the ON/OFF control signal is at an H level.

The ON/OFF control signal is supplied to the switch circuit 104 through an inverting circuit 105. The switch circuit 104 turns on the plurality of switches included therein when the input signal from the inverting circuit 105 is at an H level (the period for which the switch circuit 103 is turned off).

During the period for which the ON/OFF control signal is at an H level, the driver 101 outputs a sequential driving voltage to each set of two switches of the switch circuit 103. As a result, it is possible to apply the sequential driving voltage to each set of two scanning lines 100a of the pixel array 100.

During the period for which the ON/OFF control signal is at an L level, the driver 102 outputs the sequential driving voltage to each set of two switches of the switch circuit 104. As a result, during the period, it is possible to apply the sequential driving voltage to each set of two scanning lines 100a during a period that is different from that for which the switch circuit 103 is turned on in the pixel array 100.

According to the structure shown in FIG. 40, since a plurality of scanning lines are simultaneously driven, it is possible to reduce the time required to scan one frame. As a result, it is possible to improve the frame rate. Specifically, in the example shown in FIG. 40, the time required to scan one frame is half the general scanning time. It is possible to increase the frame rate to be two times higher than that when general one line sequential scanning is performed.

When the frame rate is improved, the quality of a moving picture is improved.

SUMMARY OF THE INVENTION

However, in the structure shown in FIG. 40, sets of the scanning lines that can be simultaneously scanned are fixed by a set of a plurality of switches. Therefore, it is difficult to freely change the sets of the scanning lines that are simultaneously scanned.

It is difficult to use parts common to the display panel having the structure shown in FIG. 40 and a display device performing general one line sequential scanning. That is, when the display panel having the structure shown in FIG. 40 is used to improve the frame rate, different panels are provided in a product performing one line sequential scanning and a product simultaneous driving a plurality of lines. As a result, it is difficult to reduce the manufacturing costs of a product.

Thus, it is desirable to provide a display device capable of simultaneously driving a plurality of lines, freely changing sets of a plurality of lines which are simultaneously driven, selectively performing the simultaneous scanning of a plurality of lines and one line sequential scanning to reduce manufacturing costs by use of common parts.

According to an embodiment of the invention, there is provided a display device including: a pixel array unit including a plurality of scanning lines and a plurality of signal lines; a scanning line driving unit that sequentially applies a driving voltage to the plurality of scanning lines according to a shift timing indicated by a shift clock; a signal line driving unit that drives the plurality of signal lines on the basis of an input video signal; and a clock adjusting unit that adjusts the shift clock such that there are n (n is a natural number equal to or greater than 2) shift timings within each one horizontal line period for which an image signal corresponding to one horizontal line is displayed.

According to the embodiment of the invention, the shift clock input to the scanning line driving unit is adjusted such that a state in which there is one shift timing within one horizontal line period is changed to a state in which there are n (a plurality of) shift timings within one horizontal line period. Therefore, it is possible to obtain the period for which sets of a plurality of adjacent scanning lines are simultaneously driven in each one horizontal line period. In this way, it is possible to sequentially or simultaneously drive a plurality of lines and thus improve the frame rate.

It is possible to sequentially scan sets of a plurality of horizontal lines by adjusting the shift clock input to the scanning line driving unit. That is, when the shift clock is not adjusted, it is possible to perform general one line sequential driving. Therefore, according to the embodiment of the invention, it is possible to switch the sequential scanning of a plurality of horizontal lines and general one horizontal line sequential scanning by the adjustment/non-adjustment of the shift clock.

In addition, it is possible to freely change the number of lines that are simultaneously driven or sets of the lines according to a method of adjusting the shift clock.

According to the embodiment of the invention, in order to simultaneously drive a plurality of scanning lines during one horizontal line period to improve the frame rate, a method of adjusting the shift clock input to the scanning line driving unit is used. Therefore, it is possible to freely change the number of lines that are simultaneously driven or sets of the lines.

According to the embodiment of the invention, it is possible to perform the switch between the sequential scanning of a plurality of horizontal lines and general one horizontal line sequential scanning by switching the adjustment and the non-adjustment of the shift clock input to the scanning line driving unit. As such, since it is possible to perform switching to the general one line sequential scanning by the adjustment/non-adjustment of the shift clock, it is possible to manufacture a display panel common to a product performing one line sequential scanning and a product simultaneous driving a plurality of lines. As a result, it is possible to reduce the manufacturing costs of a product.

BRIEF DESCRIPTION OF THE DRAWINGS

FIG. 3 is a timing chart illustrating the relationship among a vertical direction start instruction signal (VST), a vertical direction clock (VCK), and output signals (only Q0 to Q2) from a flip-flop when general one line sequential scanning is performed;

FIG. 5 is a diagram illustrating a method of adjusting the vertical direction clock in order to implement two line simultaneous driving (sets of lines in which there is no remaining line);

FIG. 6 is a diagram illustrating a method of adjusting the vertical direction clock in order to implement two line simultaneous driving (sets of lines in which there is the remaining line);

FIG. 7 is a diagram illustrating an example of the number of pixels of a pixel array in the display device according to the embodiment;

FIGS. 19A to 19C are diagrams illustrating the supplement of the resolution in the vertical direction by the display method according to the first embodiment;

FIG. 40 is a diagram illustrating the structure of a display panel unit according to the related art that simultaneously drives plurality of scanning lines.

DESCRIPTION OF THE PREFERRED EMBODIMENTS

Hereinafter, modes for implementing the invention (hereinafter, referred to as embodiments) will be described.

Description will be made in the following order.
<1. Scanning line driving method according to embodiment>
  [1-1. Structure of display panel]
  [1-2. One line sequential driving by shift clock]
  [1-3. Two line simultaneous driving by adjustment of shift clock]
  [1-4. For source division driving]
  [1-5. Detailed structure for two line simultaneous driving]
  [1-6. For bipolar driving]
  [1-7. EVEN/ODD display]
  [1-8. Structure of display device according to first embodiment]
  [1-9. Outline of first embodiment]
<2. Second embodiment>
  [2-1. Dynamic switching of one line sequential driving]
  [2-2. Structure of display device]
<3. Third embodiment>
  [3-1. Application to 3D system]
  [3-2. Structure of display device]
<4. Fourth embodiment>
  [4-1. Dynamic switching to one line sequential driving in 3D system]
  [4-2. Structure of display device]
<5. Fifth embodiment>
  [5-1. Application to single panel field sequential driving]
  [5-2. Structure of display device]
<6. Sixth embodiment>
  [6-1. Dynamic switching to one line sequential driving during single panel field sequential driving]
  [6-2. Structure of display device]
<7. Modifications>

1. Scanning Line Driving Method According to Embodiment 1-1. Structure of Display Panel FIG. 1 is a diagram illustrating the structure of a display panel included in a display device according to an embodiment of the invention.

The display device according to the embodiment whose overall structure will be described below is an active matrix liquid crystal display device. FIG. 1 shows the structure of a liquid crystal display panel included in the liquid crystal display device according to the embodiment.

Figure 1:
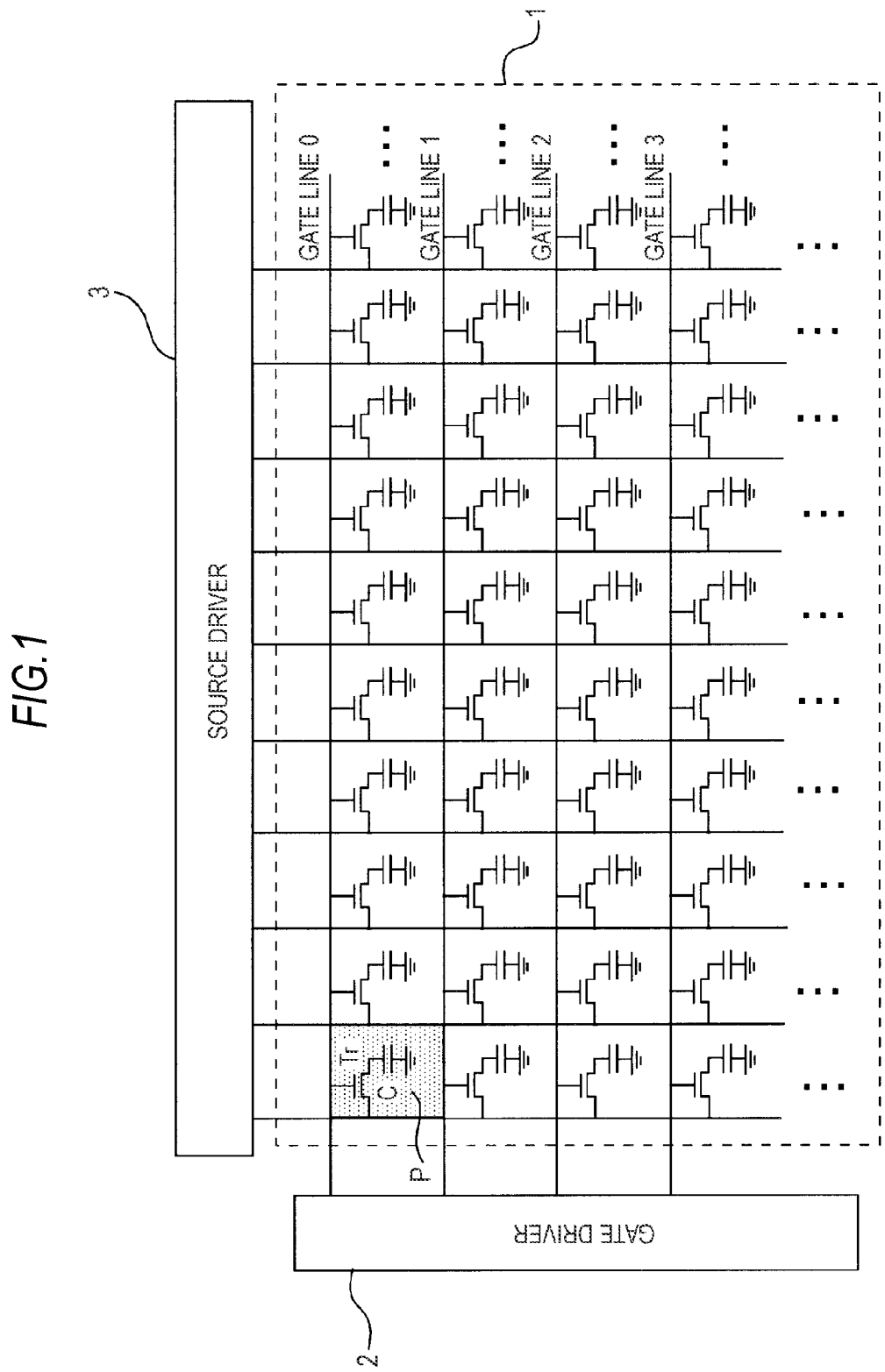
FIG. 1 is a diagram illustrating the structure of a display panel included in a display device according to an embodiment of the invention.

As shown in FIG. 1, in this case, the display panel includes a pixel array 1, a gate driver 2, and a source driver 3.

The pixel array 1 has an element substrate including a plurality of scanning lines, a plurality of signal lines intersecting the scanning lines, and sets of capacitors C, which are voltage storage capacitors, and transistors Tr (switching elements) that are provided at the intersections of the signal lines and the scanning lines. Although not shown in FIG. 1, the pixel array 1 further includes an opposite substrate that is provided opposite to the element substrate and liquid crystal filled between the element substrate and the opposite substrate.

In the pixel array 1, one set of the capacitor C and the transistor Tr provided at each of the intersections of the scanning lines and the signal lines serves as one pixel P.

In this case, a field effect transistor (FET) is used as the transistor Tr. The transistor Tr has a gate that is connected to the scanning line, a source that is connected to the signal line, and a drain that is connected to the capacitor C.

In the display panel shown in FIG. 1, the gate driver 2 is provided in order to drive the scanning lines formed in the pixel array 1.

The source driver 3 is provided in order to drive the signal lines.

When the gate driver 2 applies a voltage to (turns on) a given scanning line (referred to as a scanning line α), the transistors Tr connected to the scanning line α are turned on, and change can be stored in the capacitor C of each of the pixels P arranged on the scanning line α (active state). That is, as such, in the active state of the scanning line α by the gate driver 2, the source driver 2 drives each signal line with a signal value corresponding to an input video signal to write a desired signal value to each of the pixels P arranged on the scanning line α.

As shown in FIG. 1, each scanning line is also referred to as a gate line. The scanning line is also referred to as a horizontal line.

The scanning lines in the pixel array 1 are numbered such that the uppermost scanning line is given No. 0.

Although not shown in FIG. 1, the signal line is also referred to as a source line or a vertical line. The signal lines are numbered such that the leftmost signal line in the plane of FIG. 1 is given No. 0.

1-2. One Line Sequential Driving by Shift Clock

Figure 2:
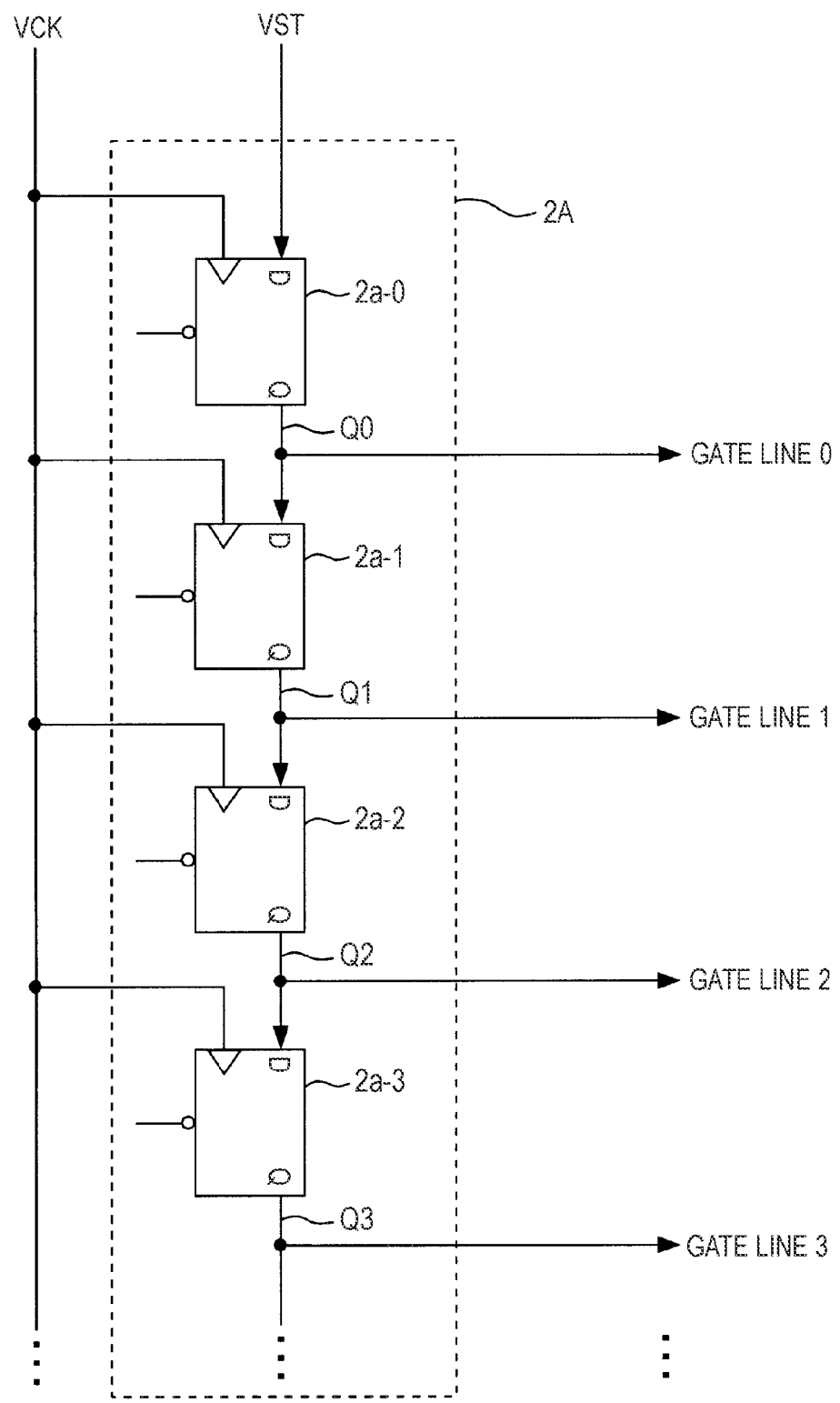
FIG. 2 is a diagram illustrating the structure of a shift register included in a gate driver (scanning line driving unit) according to the embodiment.

FIG. 2 is a diagram illustrating the structure of a shift register 2A included in the gate driver 2 shown in FIG. 1.

As shown in FIG. 2, the shift register 2A includes a plurality of flip-flops 2a (2a-0, 2a-1, 2a-2, 2a-3, . . . from the upper side of the plane of FIG. 2). In this case, a D flip-flop is used as the flip-flop 2a.

A vertical direction start instruction signal VST is given as an input signal to the shift register 2A in FIG. 2. The vertical direction start instruction signal VST is input to an input terminal D of the uppermost flip-flop 2a-0. In addition, a vertical direction clock VCK is input as a common shift clock to each flip-flop 2a in FIG. 2.

An output signal from an output terminal Q of each flip-flop 2a is input to the input terminal D of the next flip-flop 2a and is branched and input to the corresponding gate line.

The gate driver 2 having the shift register 2A drives each scanning line of the pixel array 1 at the timing corresponding to the vertical direction start instruction signal VST and the vertical direction clock VCK.

FIG. 3 is a timing chart illustrating the relationship among the vertical direction start instruction signal VST, the vertical direction clock VCK, and the output signals (only Q0 to Q2) from each flip-flop 2a when general one line sequential scanning is performed.

First, in FIG. 3, one horizontal line period means a period for which an image signal corresponding to one horizontal line is displayed and output. In addition, one frame period means a period for which an image signal corresponding to one frame is displayed and output.

As shown in FIG. 3, the vertical direction start instruction signal VST is changed to an H level after a predetermined period has elapsed from the start timing of one frame period. That is, the vertical direction start instruction signal VST is a signal with a frame period.

As shown in FIG. 3, the vertical direction clock VCK is a signal with a horizontal line period.

The flip-flop 2a shown in FIG. 2 changes the output signal from the output terminal Q to an H level when an H-level signal is input to the input terminal D at the rising timing of the vertical direction clock VCK, and changes the output signal from the output terminal Q to an L level when an L-level signal is input to the input terminal D at the rising timing of the vertical direction clock VCK.

As shown in FIG. 3, at the start timing of one frame period (the start timing of a first one horizontal line period), the vertical direction start instruction signal VST and the vertical direction clock VCK are both changed to the H levels. Then, the output Q0 of the first flip-flop 2a-0 is changed to an H level. That is, in this way, the gate line 0, which is the first gate line, is driven.

At the start timing of the second horizontal line period, when the vertical direction clock VCK is changed to an H level, the output Q0 of the first flip-flop 2a-0 is changed to an L level, but the output Q1 of the second flip-flop 2a-1 is changed to an H level. During the third horizontal line period, the output Q1 of the flip-flop 2a-1 is changed to an L level and the output Q2 of the third flip-flop 2a-2 is changed to an H level according to the rising of the vertical direction clock VCK.

In this way, at each rising timing of the vertical direction clock VCK, each flip-flop 2a in the shift register 2A sequentially shifts an input value (vertical direction start instruction signal), and the scanning lines are sequentially driven during one horizontal line period.

The H pulse of the vertical direction start instruction signal VST is also referred to as a start pulse. It is necessary to set the length of the start pulse to a value that is less than at least one horizontal line period. If the length of the start pulse is more than one horizontal line period, the start pulse is at the second rising timing of the vertical direction clock VCK. As a result, the application of a driving voltage corresponding to the line 0, which is the first scanning line, does not end during the first horizontal line period, but is continuously performed during the second horizontal line period. That is, as a result, during the second horizontal line period, both the second line 1 and the first line 0 are driven and it is difficult to perform one line sequential scanning.

1-3. Two Line Simultaneous Driving by Adjustment of Shift Clock

Figure 4A:
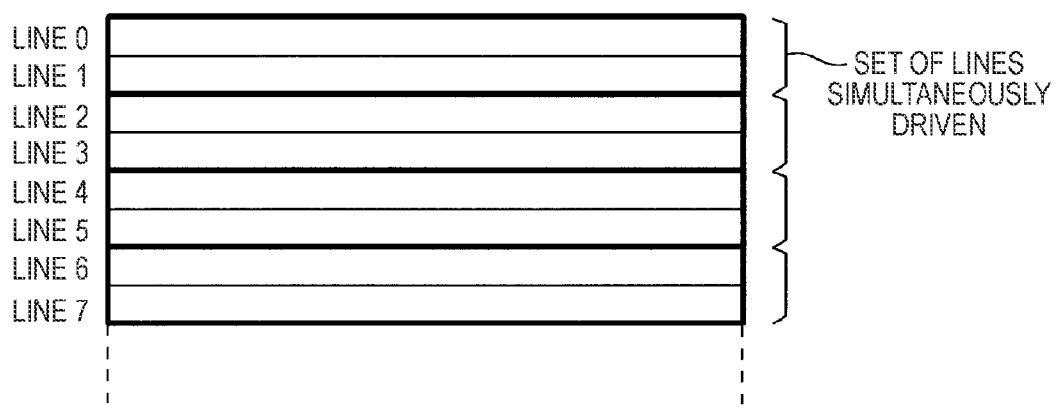
FIGS. 4A and 4B are diagrams illustrating the detailed aspect of the simultaneous driving of a plurality of lines.
Figure 4B:
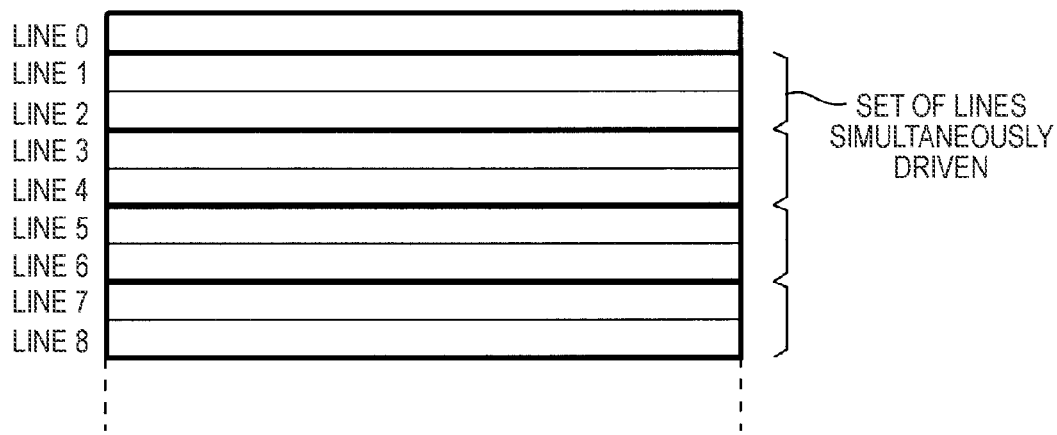

FIGS. 4A and 4B are diagrams illustrating the detailed structure of the simultaneous driving of a plurality of lines.

In FIGS. 4A and 4B, FIG. 4A shows gate lines (horizontal lines) 0 to 7 formed in the pixel array 1 shown in FIG. 1, and FIG. 4B shows gate lines 0 to 8.

In the following description, two lines are simultaneously driven.

In the structure in which two lines are simultaneously driven, for example, if it is assumed that the number of effective pixels arranged in the pixel array 1 in the vertical direction is an even number, the following two driving methods are considered: a driving method in which the gate lines are combined such that no remaining line occurs, as shown in FIG. 4A; and a driving method in which the gate lines are combined such that the remaining line occurs, as shown in FIG. 4B.

Specifically, in the driving method shown in FIG. 4A, a set of 'the line 0 and the line 1', a set of 'the line 2 and the line 3', a set of 'the line 4 and the line 5', a set of 'the line 6 and the line 7', . . . are simultaneously driven, and the line sets are sequentially driven one by one.

In the driving method shown in FIG. 4B, a set of 'the line 1 and the line 2', a set of 'the line 3 and the line 4', a set of 'the line 5 and the line 6', a set of 'the line 7 and the line 8', . . . are simultaneously driven, and the line sets are sequentially driven one by one.

In this embodiment, the simultaneous driving of a plurality of lines shown in FIGS. 4A and 4B is implemented by adjusting the waveform of the vertical direction clock VCK (shift clock) input to the shift register 2A of the gate driver 2.

FIGS. 5 and 6 are diagrams illustrating a method of adjusting the vertical direction clock VCK in order to implement the two line simultaneous driving. FIG. 5 shows a case in which simultaneous driving is implemented by the combination of gate lines shown in FIG. 4A in which no remaining line occurs, and FIG. 6 shows a case in which simultaneous driving is implemented by the combination of gate lines shown in FIG. 4B in which the remaining line occurs.

First, when simultaneous driving is implemented by the combination of gate lines shown in FIG. 4A in which no remaining line occurs, the vertical direction clock VCK is adjusted to the waveform shown in FIG. 5.

Specifically, in this case, the waveform of the vertical direction clock VCK is adjusted such that two rising edges are formed during one horizontal line period.

As such, when the waveform of the vertical direction clock VCK is adjusted such that two rising edges are formed during one horizontal line period, it is possible to obtain the period for which two lines are simultaneously driven for each horizontal line period shown in FIG. 5.

Specifically, at the start timing of the first horizontal line period, the vertical direction start instruction signal VST is at an H level, and the vertical direction clock VCK is at an H level. Therefore, the output Q0 of the first flip-flop 2*a*-0 is changed to an H level. At the second rising timing of the vertical direction clock VCK during the first horizontal line period, since the vertical direction start instruction signal VST is at an H level, the output Q0 of the first flip-flop 2*a*-0 is maintained at the H level. In addition, the output Q1 of the second flip-flop 2*a*-1 is changed to an H level since the output Q0 is at the H level.

During the second horizontal line period, at the first rising timing of the vertical direction clock VCK, since the vertical direction start instruction signal VST is at an L level, the output Q0 is changed to an L level. In addition, at the first rising timing of the vertical direction clock VCK during the second horizontal line period, since the output Q0 is at the H level, the output Q1 is maintained at the H level, as shown in FIG. 5. At the second rising timing of the vertical direction clock VCK during the second horizontal line period, since the output Q0 is at the L level, the output Q1 is changed to an L level.

In this way, the period for which the set of 'the line 0 and the line 1' is simultaneously driven is obtained from the second rising timing of the vertical direction clock VCK during the first horizontal line period to the first rising timing of the vertical direction clock VCK during the second horizontal line period.

At the start timing of the second horizontal line period (the first rising timing of the vertical direction clock VCK), since the output Q1 is at an H, the output Q2 of the third flip-flop 2*a*-2 is changed to an H level.

At the second rising timing of the vertical direction clock VCK during the second horizontal line period, since the output Q1 is maintained at the H level, the output Q2 is maintained at an H level. In addition, since the output Q2 is at the H level, the output Q3 of the third flip-flop 2*a*-3 is changed to an H level.

At the start timing of the third horizontal line period, since the output Q1 is at an L level, the output Q2 is changed to an L level. In addition, at the start timing, since the output Q2 is at the H level, the output Q3 is maintained at the H level. At the second rising timing of the vertical direction clock VCK during the third horizontal line period, since the output Q2 is at an L level, the output Q3 is changed to an L level.

In this way, during the second horizontal line period, the set of 'the line 2 and the line 3' is simultaneously driven during the period from the rising timing of the second vertical direction clock VCK during the second horizontal line period to the end timing of the second horizontal line period.

Sets of two adjacent lines from and after 'the line 4 and the line 5' are sequentially driven at the same time from and after the third horizontal line period by the same principle as described above. As a result, the simultaneous driving of two lines by the combination of gate lines shown in FIG. 4A in which no remaining line occurs is achieved.

When simultaneous driving is implemented by the combination of gate lines shown in FIG. 4B in which the remaining line occurs, the vertical direction clock VCK is adjusted to the waveform shown in FIG. 6.

Specifically, in this case, the waveform of the vertical direction clock VCK is adjusted such that the first one horizontal line period has the same waveform as that during general one line sequential scanning and two rising edges are formed during each horizontal line period from and after the second horizontal line period.

When the waveform of the vertical direction clock VCK is adjusted in this way, only the output Q1 is changed to an H level during the first one horizontal line period, as shown in FIG. 6. As a result, only the line 0 is driven.

During each horizontal line period from and after the second horizontal line period, the sets of two adjacent lines are sequentially driven at the same time by the same principle as that shown in FIG. 5. Specifically, in this case, the set of 'the line 1 and the line 2', the set of 'the line 3 and the line 4', . . . are sequentially driven at the same time.

As can be seen from FIGS. 5 and 6, when the vertical direction clock VCK has two rising edges during one horizontal line period, it is possible to obtain the period for which two adjacent lines are simultaneously driven during each horizontal line period.

However, it is noted that, as represented by colored portions in FIGS. 5 and 6, when the simultaneous driving of a set of two lines is changed to the simultaneous driving of the next set of two lines, the period for which a set of two lines that should not be simultaneously driven is simultaneously driven is formed by only the adjustment of the vertical direction clock VCK.

Specifically, in FIG. 5, when the simultaneous driving of the set of 'the line 0 and the line 1' is changed to the simultaneous driving of the set of 'the line 2 and the line 3' and when the simultaneous driving of the set of 'the line 2 and the line 3' is changed to the simultaneous driving of the set of 'the line 4 and the line 5', the period for which unintended sets of two lines, such as the set of 'the line 1 and the line 2' and the set of 'the line 3 and the line 4', are simultaneously driven is formed.

Similarly, in FIG. 6, when the simultaneous driving of the set of 'the line 1 and the line 2' is changed to the simultaneous driving of the set of 'the line 3 and the line 4', the period for which an unintended set of two lines, such as the set of 'the line 2 and the line 3', is simultaneously driven is formed.

When a signal value is written to the signal line during the period for which an intended set of two lines is simultaneously driven (the periods other than the colored portion in FIGS. 5 and 6), it is possible to display an image on the intended sets of two lines.

However, in the colored portion in FIGS. 5 and 6, a lower line (referred to as a first line) in the intended set of two lines and a line (referred to as a second line) arranged immediately below the lower line are simultaneously driven. Therefore, during this period, the second line to which a signal value is not written yet is turned on by the influence of charge stored in the first line to which a signal value has already been written. In addition, the influence causes the difference between the written signal value (brightness) and the actual brightness of light in the first line.

As described above, when the second line is turned on, three lines (the first and second lines and a line immediately above the first line) are simultaneously turned on during the period. As described above, when there is the difference between the written brightness and the actual brightness of light, it is difficult to appropriately perform image display on the first line.

In this embodiment, a mask signal shown in the lowest side of FIGS. 5 and 6 is generated, and the output Q supplied to the gate line is masked on the basis of the mask signal, thereby preventing an unintended set of two lines from being simultaneously driven.

As can be seen from FIGS. 5 and 6, the period for which an unintended set of two lines is simultaneously driven is equal to the period from the first rising timing to the second rising timing of the vertical direction clock VCK within one horizontal line period. Therefore, as the mask signal, a masking instruction signal may be generated during the period from the first rising timing to the second rising timing of the vertical direction clock VCK within one horizontal line period. During a mask period indicated by the mask signal, the output Q supplied to the corresponding gate line (that is, at least one of the first line and the second line) is masked. In this way, it is possible to prevent the generation of the period for which an unintended set of two lines is simultaneously driven.

In this case, when the generation of the period for which an unintended set of two lines is simultaneously driven is prevented, masking by the mask signal may be performed on at least one of the first line and the second line (that is, two lines disposed at the boundary between sets of two lines that are simultaneously driven).

For confirmation, the masking of the output Q is not performed on the input side to the next flip-flop 2a, but is performed only on the output Q supplied to the gate line.

1-4. For Source Division Driving

The outline of the method of simultaneously driving a plurality of lines by the adjustment of the shift clock according to this embodiment has been described above.

Next, the detailed structure of the display device according to this embodiment will be described in consideration of the description of the outline. First, source division driving used in the display device according to this embodiment will be described with reference to FIGS. 7 and 8.

FIG. 7 is a diagram illustrating an example of the number of pixels of the pixel array 1 included in the display device according to this embodiment.

As shown in FIG. 7, the number of pixels in the horizontal direction in the pixel array 1 is 1968, and the number of pixels in the vertical direction is 1104.

In this embodiment, 48 pixels in the horizontal direction are set to one unit (1H-unit) in terms of source division driving. That is, the number of pixels in the horizontal direction is divided into 41 H-units (=1968/48).

Figure 8:
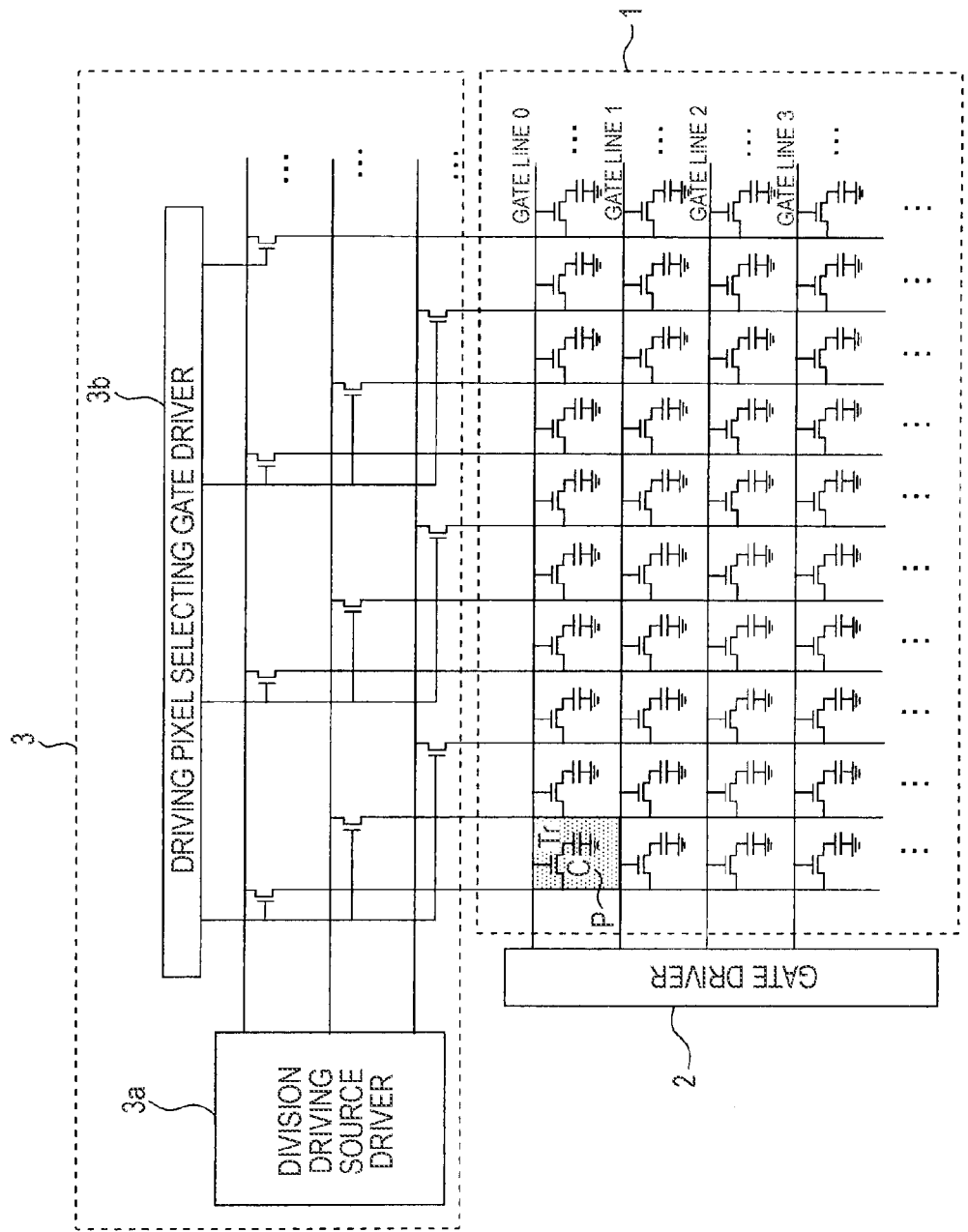
FIG. 8 is a diagram illustrating the internal structure of a source driver in the structure of the display panel included in the display device according to the embodiment.

FIG. 8 is a diagram illustrating the structure of the display panel which is the same as that shown in FIG. 1. In particular, FIG. 8 shows the internal structure of the source driver 3.

In FIG. 8 and the following drawings illustrating the structure, the same components are denoted by the same reference numerals and a description thereof will be omitted.

As shown in FIG. 8, the source driver 3 includes a division driving source driver 3a, a driving pixel selecting gate driver 3b, and a plurality of transistors Tr as components for performing source division driving.

A general signal line driving method is performed by collectively inputting signal values to the signal lines during one horizontal line period. In a source division driving method, the signal lines are divided into sets of a predetermined number of signal lines, and the signal lines in each set of the signal lines are sequentially driven. The source division driving method is used in, for example, an SXRD (Silicon X-tal Reflective Display: registered trademark) panel or an LCOS (Liquid Crystal On Silicon) panel.

In this case, in order to sequentially driving each set of a predetermined number of signal lines (m signal lines: m=3 in FIG. 8 for simplicity of illustration) using the division driving source driver 3a and the driving pixel selecting gate driver 3b, the transistors Tr (in this case, FETs) for selecting a set of m signal lines to which signals can be written (that is, for activating/deactivating the set of m signal lines) are inserted into each signal line. As shown in FIG. 8, the transistor Tr has a drain connected to the signal line and a source connected to the division driving source driver 3a. In this case, as shown in FIG. 8, the source of each transistor Tr and the division driving source driver 3a are connected to each other by a line common to a first transistor Tr, a second transistor Tr, ..., an m-th transistor Tr in each set of m transistors Tr which is provided in each set of m signal lines.

As shown in FIG. 8, the gate of the transistor Tr is connected to the driving pixel selecting gate driver 3b through a line common to each set of m transistors Tr.

In the above-mentioned structure, the signal lines are driven during one horizontal line period as follows. That is, the driving pixel selecting gate driver 3b turns on each set of m transistors Tr provided for each set of m signal lines to sequentially select the sets of the signal lines to which signal values are written by the division driving source driver 3a. Then, the division driving source driver 3a drives each of the m signal lines using the signal values of the pixels corresponding to the m signal lines selected by the driving pixel selecting gate driver 3b, for an image signal corresponding to one horizontal line. In this way, the signal values are sequentially written to each set of the m signal lines.

According to the above-mentioned structure, it is not necessary that the number of wiring lines from the source driver is equal to the number of signal lines provided in the pixel array 1, but m common lines are provided. Therefore, for example, this structure is effective in a wiring layout.

In FIG. 8, m is 3 for simplicity of illustration. However, as can be understood from the description of FIG. 7, in this embodiment, m is 48 since 1H-unit is 48 pixels.

1-5. Detailed Structure for Two Line Simultaneous Driving

The display device according to this embodiment has a structure for implementing two line simultaneous driving corresponding to the case in which it is premised that the source division driving is performed.

Next, the structure for implementing two line simultaneous driving corresponding to the case in which the source division driving is performed will be described.

—Structure of Gate Driver—

Figure 9:
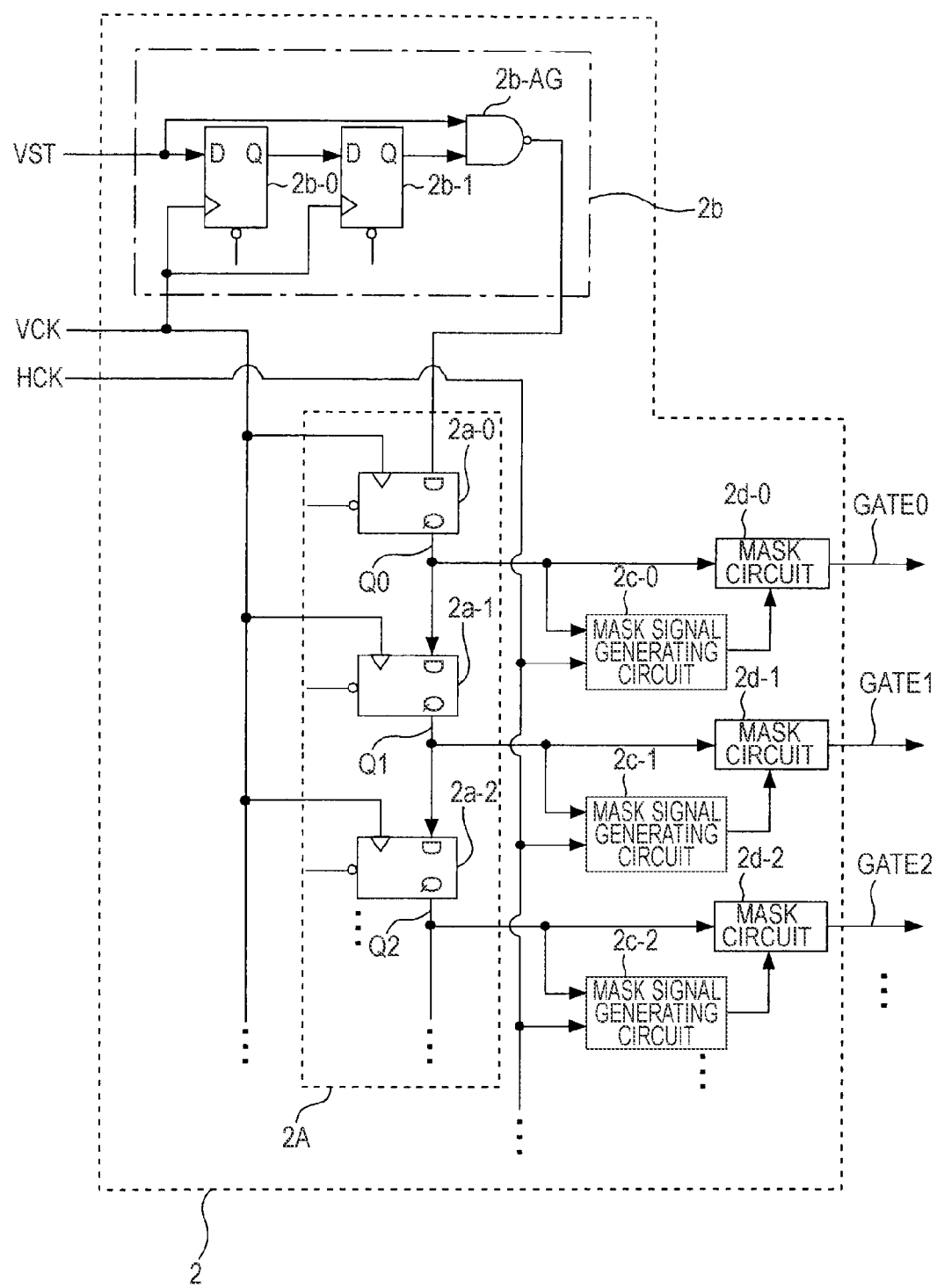
FIG. 9 is a diagram illustrating the internal structure of a gate driver of the display panel included in the display device according to the embodiment.

FIG. 9 is a diagram illustrating the internal structure of the gate driver 2 shown in FIG. 1.

As shown in FIG. 9, similar to the shift register 2A shown in FIG. 2, the gate driver 2 includes an erroneous scanning start preventing unit 2b, and a set of a mask signal generating circuit 2c and a mask circuit 2d that is inserted into each gate line.

In the following description, a signal output to a given gate line No. in the pixel array 1 is represented in the form of 'GATE No.'. For example, a signal output to the gate line 0 is represented by a signal GATE0.

In order to discriminate the mask signal generating circuits 2c and the mask circuit 2d provided for each gate line, the same numbers as those given to the gate lines are added to the mask signal generating circuits 2c and the mask circuit 2d. That is, for example, the mask signal generating circuit 2c and the mask circuit 2d inserted into the gate line 0 are represented by a mask signal generating circuit 2c-0 and a mask circuit 2d-0.

In FIG. 9, the vertical direction start instruction signal VST is input to the erroneous scanning start preventing unit 2b. The erroneous scanning start preventing unit 2b instructs the shift register 2A to start scanning only when the start of scanning is certainly instructed by the vertical direction start instruction signal VST (specifically, only when a sufficiently long start pulse is supplied). The erroneous scanning start preventing unit 2b is provided in order to prevent the scanning lines from starting to be driven at an incorrect timing due to, for example, noise.

As shown in FIG. 9, the erroneous scanning start preventing unit 2b includes a delay circuit including a flip-flop 2b-0 and a flip-flop 2b-1, and an AND gate circuit 2b-AG. In this case, the flip-flops 2b-0 and 2b-1 are D flip-flops. The vertical direction start instruction signal VST is input to an input terminal D of the flip-flop 2b-0, and the vertical direction clock VCK is input as a shift clock to the flip-flops 2b-0 and 2b-1. As shown in FIG. 9, the output from the output terminal Q of the flip-flop 2b-0 is transmitted to the input terminal Q of the flip-flop 2b-1, and the output from the output terminal Q of the flip-flop 2b-1 is transmitted to the AND gate circuit 2b-AG.

In the erroneous scanning start preventing unit 2b, the vertical direction start instruction signal VST is input to the flip-flop 2b-0 and is also input to the AND gate circuit 2b-AG. The output of the AND gate circuit 2b-AG is input to the shift register 2A (flip-flop 2a-0).

The mask signal generating circuit 2c and the mask circuit 2d are provided in order to mask the output Q shown in FIGS. 5 and 6.

As shown in FIG. 9, the output Q from the flip-flop 2a with the same number as that given to the end of the reference numeral is input to the mask signal generating circuit 2c. In addition, the horizontal direction clock HCK is also input to each mask signal generating circuit 2c.

When the source division driving (that is, division driving for each H-unit) shown in FIG. 8 is performed, the horizontal direction clock HCK serves as a signal indicating the period for which the H-units are sequentially selected.

The mask signal generating circuit 2c generates the mask signal shown in FIGS. 5 and 6, and supplies the mask circuit 2d with the same number.

The internal structure of the mask signal generating circuit 2c will be described below.

The output Q from the flip-flop 2a with the same number as that given to the end of the reference numeral of each mask circuit 2d is input to the relevant mask circuit 2d. The mask circuit 2d masks the output Q at the timing indicated by the mask signal input from the mask signal generating circuit 2c. The output Q (represented by GATE in FIG. 9) input through the mask circuit 2d is supplied to the gate line (scanning line) with the corresponding number in the pixel array 1 shown in FIG. 1.

Figure 10:
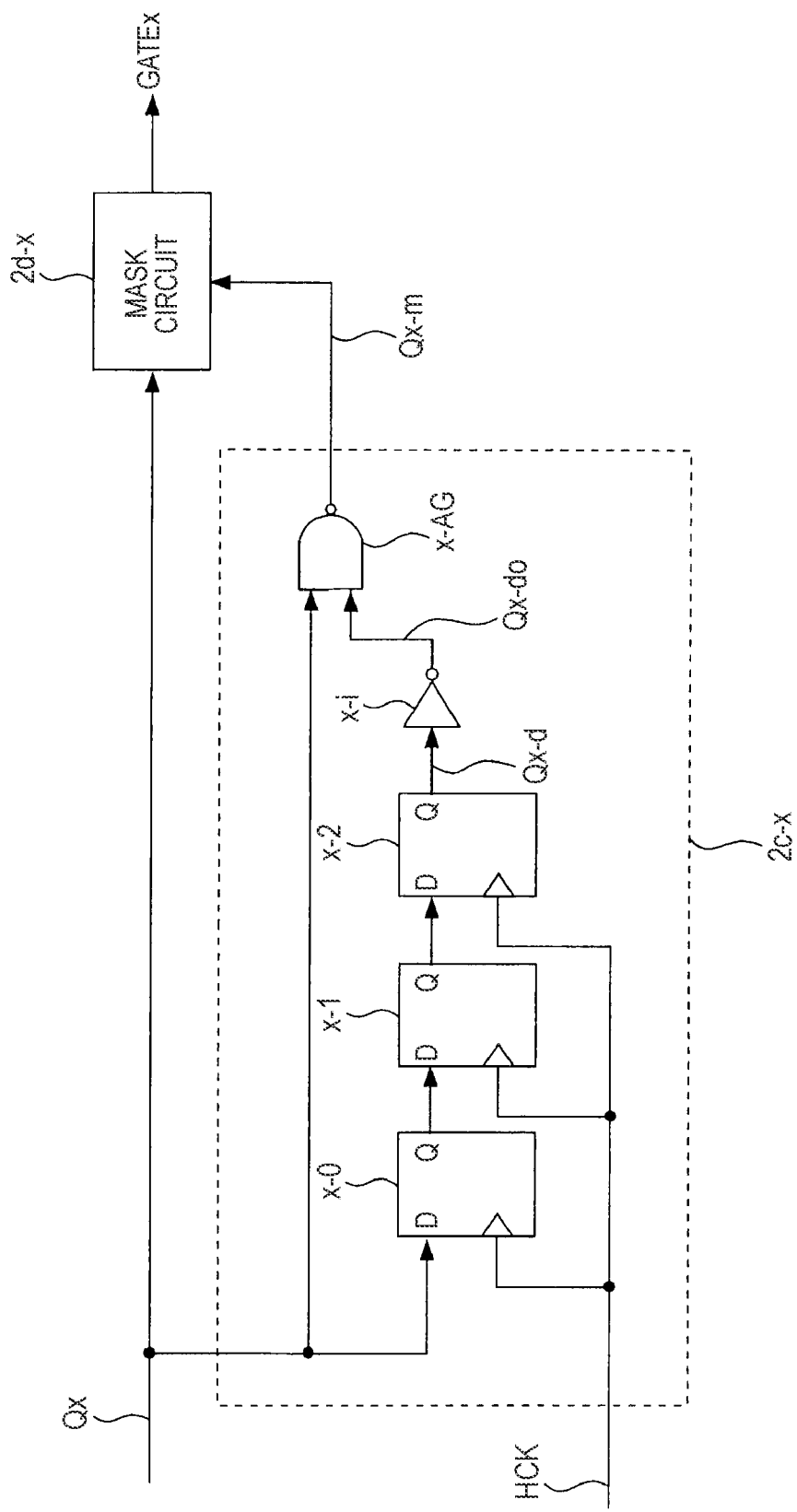
FIG. 10 is a diagram illustrating the internal structure of a mask signal generating circuit.

FIG. 10 is a diagram illustrating the internal structure of the mask signal generating circuit 2c.

In FIG. 10, the mask signal generating circuit 2c provided in a given gate line number (referred to as a gate line x) is represented by a mask signal generating circuit '2c-x'. FIG. 10 shows the representative internal structure of the mask signal generating circuit 2c-x.

In the following description, similar to the above, the mask circuit 2d inserted into the gate line x is represented by a mask circuit '2d-x', and a signal output from the mask circuit 2d-x is represented by a signal 'GATEx'. In addition, an x-th flip-flop 2a input to the mask signal generating circuit 2c-x and the mask circuit 2d-x is represented by a flip-flop '2a-x', and the output Q of the flip-flop 2a-x is presented by an output 'Qx'. The mask signal generated by the mask signal generating circuit 2c-x is represented by a mask signal 'Qx-m'.

The mask signal generating circuit 2c-x includes a delay circuit including a flip-flop x-0, a flip-flop x-1, and a flip-flop x-2, an inverting circuit x-i to which the output from the delay circuit is input, and a NAND gate circuit x-AG to which the output from the inverting circuit x-i and the output Qx from the flip-flop 2a-x are input.

The horizontal direction clock HCK is input as a shift clock to each of the flip-flops x-0, x-1, and x-2 of the delay circuit. The delay circuit delays the output Qx input to the flip-flop x-0 by three clocks according to the horizontal direction clock HCK and outputs the delayed signal.

The signal output from the delay circuit is represented by a delay signal Qx-d.

The polarity of the delay signal Qx-d is inverted by the inverting circuit x-i, and the inverted delay signal Qx-d is input to the NAND gate circuit x-AG. The signal output from the inverting circuit x-i is represented by an inverted signal Qx-do.

The NAND gate circuit x-AG outputs an L-level signal (that is, an L-level mask signal Qx-m) only when the inverted signal Qx-do and the output Qx input from the flip-flop 2a-x are both at H levels, and outputs an H-level signal in the other cases.

—Timing Chart—

Next, the waveform of each signal when two line simultaneous driving is performed by the gate driver 2 having the above-mentioned structure will be described with reference to the timing charts shown in FIGS. 11 to 15.

First, the waveform of each signal when general one line sequential driving is performed will be described with reference to FIG. 11.

Figure 11:
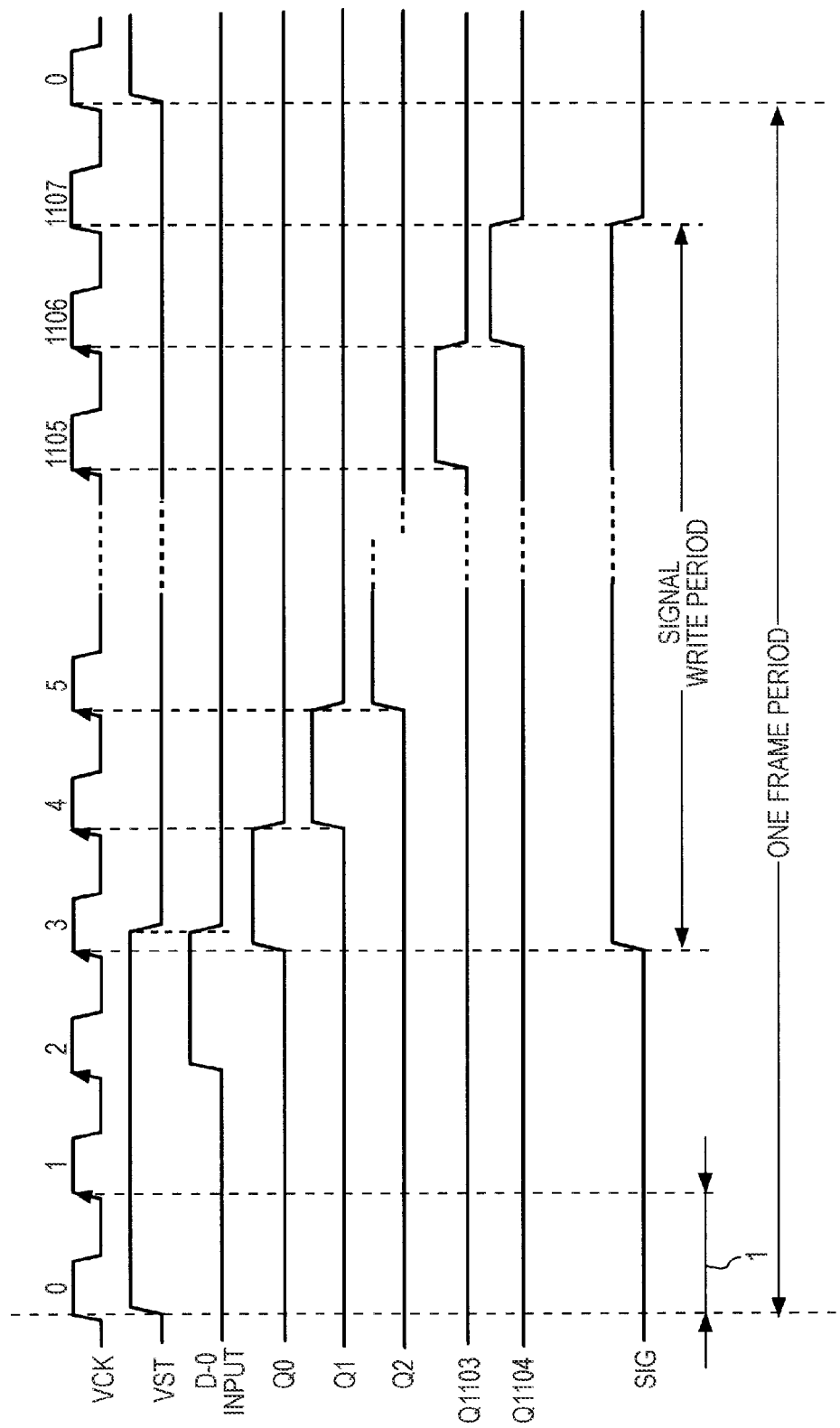
FIG. 11 is a timing chart illustrating a one line sequential scanning operation.

As shown in FIG. 11, when general one line sequential driving is performed, the vertical direction clock VCK has one rising timing during one horizontal line period.

It is noted that the number of clocks (the number of H pulses) of the vertical direction clock VCK within one frame period is 1108 (0 to 1107) that is four more than 1104, which is the number of pixels in the vertical direction in the pixel array 1 (that is, the number of horizontal lines). In this embodiment, during the period corresponding to a total of 1104 clocks from a 3rd clock to a 1106th clock of the vertical direction clock VCK within one frame period, a signal write operation is performed for each one horizontal line period to write signals to 1104 horizontal lines in the pixel array 1. That is, the period corresponding to four clocks, that is, a 1107th clock and a 0-th clock to a second clock is set to a blank period for which no signal is written (the blank period in the vertical direction).

The erroneous scanning start preventing unit 2b shown in FIG. 9 performs an erroneous scanning start preventing operation in response to the input of the vertical direction start instruction signal VST shown in FIG. 11.

In this case, as shown in FIG. 11, the vertical direction start instruction signal VST is changed to an H level at the timing corresponding to the start timing of one frame period (the rising timing of the 0th clock of the vertical direction clock VCK), and is changed to an L level at the timing between the 3rd clock to the 4th clock of the vertical direction clock VCK.

When the vertical direction start instruction signal VST is input, the signal that is output from the AND gate circuit 2b-AG shown in FIG. 9 and is then input to the flip-flop 2a-0 is changed to an H level at the rising timing of the 2nd clock and is changed to an L level at the same timing as the falling timing of the vertical direction start instruction signal VST, as represented by 'D-0 input' in FIG. 11.

As shown in FIG. 11, the output Q0 is changed to an H level at the rising timing of the 3rd clock according to the 'D-0 input'. Then, an output Q1, an output Q2, . . . , an output Q1103, and an output Q1104 are sequentially changed to an H level for each clock. As a result, one line sequential scanning is achieved.

As can be understood from the above description, in this case, when the gate driver 2 starts to drive the scanning lines, it is necessary to input an H pulse with a length corresponding to at least three clocks as the vertical direction start instruction signal VST. That is, in order to start scanning, it is necessary to input a sufficiently long start pulse. The input of a sufficiently long start pulse prevents scanning from starting at an incorrect timing due to, for example, noise.

Figure 12:
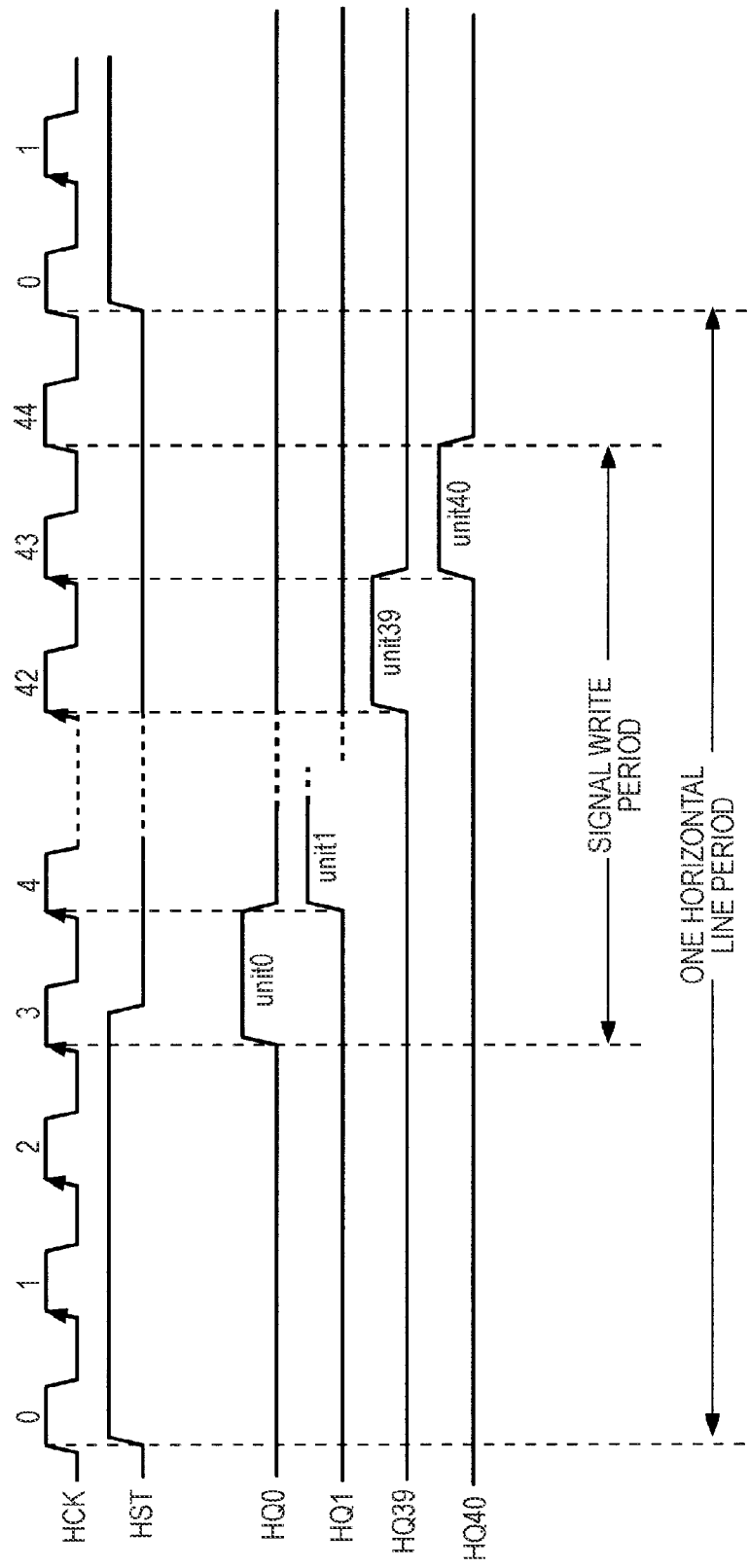
FIG. 12 is a timing chart illustrating an operation during one horizontal line period.

FIG. 12 shows the waveform of each signal during one horizontal line period. FIG. 12 shows the horizontal direction clock HCK, the horizontal direction start instruction signal HST, and a driving signal HQ0 output to a set of transistors Tr corresponding to H-unit0, a driving signal HQ1 output to a set of transistors Tr corresponding to H-unit1, a driving signal HQ39 output to a set of transistors Tr corresponding to H-unit39, and a driving signal HQ40 output to a set of transistors Tr corresponding to H-unit40, among the gate driving signals HQ output to each set of m transistors Tr (that is, each H-unit) output from the driving pixel selecting gate driver 3b shown in FIG. 8.

Although not shown in the drawings, in this embodiment, similar to the gate driver 2, the driving pixel selecting gate driver 3b includes a shift register (in this case, 41 stages). In addition, the driving pixel selecting gate driver 3b is provided with the same erroneous scanning start preventing unit as that provided in the gate driver 2. Similar to the shift register 2A, the shift register starts its operation on the basis of a start instruction signal (in this case, the horizontal direction start instruction signal HST) input through the erroneous scanning start preventing unit.

For confirmation, the horizontal direction clock HCK is input as a shift clock to the shift register in the driving pixel selecting gate driver 3b. Therefore, the H-units are sequentially selected in synchronization with the horizontal direction clock HCK.

As shown in FIG. 12, in this embodiment, the blank period (the blank period in the horizontal direction) is also provided in one horizontal line period. Specifically, in this case, one horizontal line period corresponds to 45 (0 to 44) clocks of the horizontal direction clock HCK. In the period corresponding to 45 clocks, a signal write period is from the 3rd clock to the 43rd clock, and the period corresponding to a total of 4 clocks, that is, the 44th clock and the 0th clock to the 2nd clock is the blank period.

In this case, since the erroneous scanning start preventing unit is provided, as shown in FIG. 12, a signal that is changed to an H level at the rising timing of the 0th clock (in the horizontal direction clock HCK) and is changed to an L level at the timing between the 3rd clock and the 4th clock is output as the horizontal direction start instruction signal HST. In this way, similar to the vertical direction, each line starts to be selected from the 3rd clock. That is, a signal write period from the 3rd clock to the 43rd clock is formed in this way.

Figure 13:
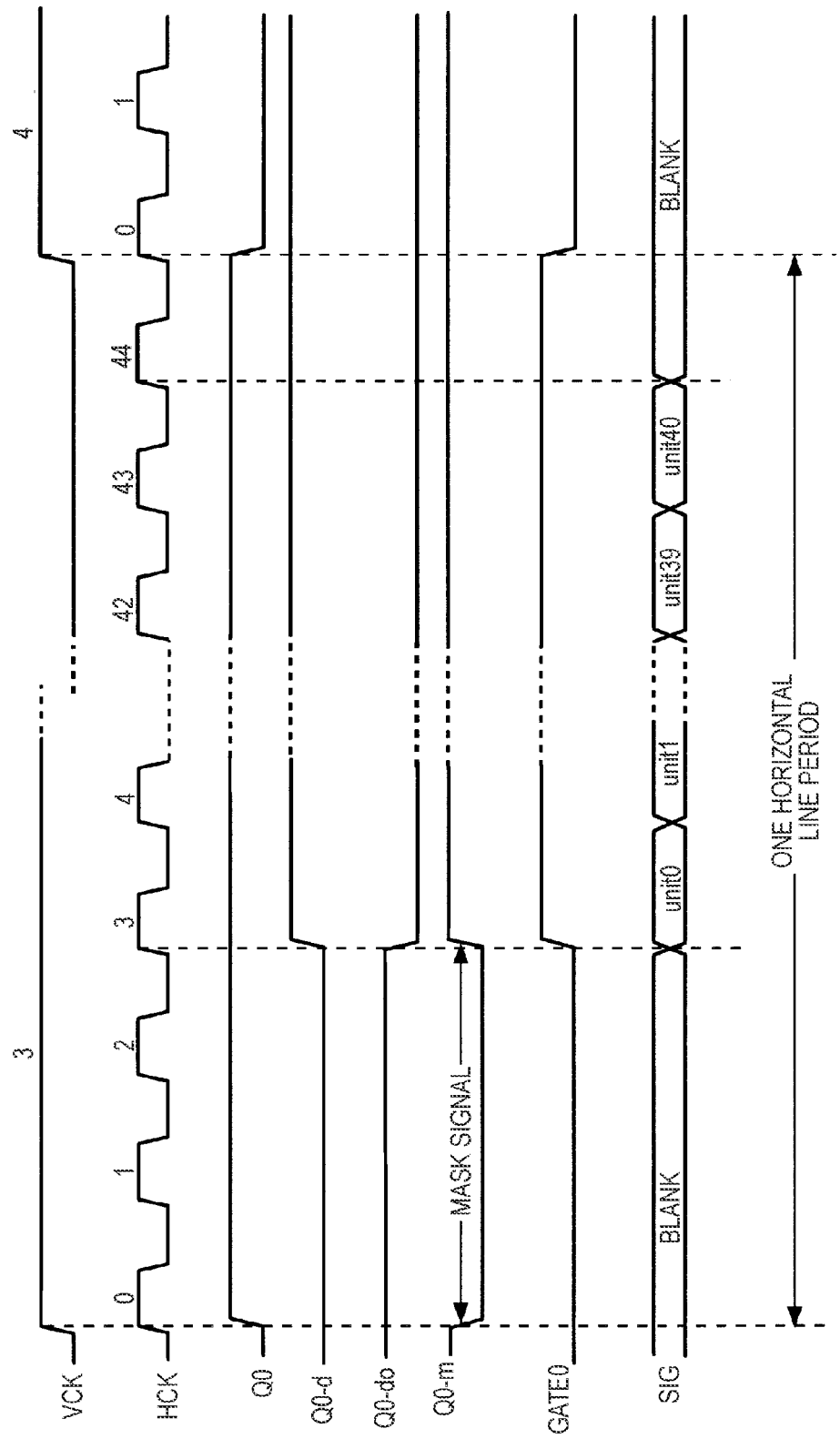
FIG. 13 is a timing chart illustrating a mask signal.

FIG. 13 is a timing chart illustrating the mask signal.

FIG. 13 shows the relationship between the waveforms of the vertical direction clock VCK, the horizontal direction clock HCK, the output Q0, a delay signal Q0-$d$, an inverted signal Q0-$do$, a mask signal Q0-$m$, and the signal GATE0 within one horizontal line period when one line sequential scanning is performed.

FIG. 13 also shows the relationship between the signals within one horizontal line period (that is, the period for which the first line 0 needs to be driven) of the third clock of the vertical direction clock VCK.

In FIG. 13, 'SIG' indicates the period for which signals are written to each H-unit and the blank period.

As can be seen from FIG. 10, the delay signal Q0-$d$ is obtained by delaying the output Q0 from the flip-flop 2$a$-0 by three clocks of the horizontal direction clock HCK.

The inverted signal Q0-$do$ is obtained by inverting the polarity of the delay signal Q0-$d$ as shown in FIG. 13.

As shown in FIG. 10, the mask signal Qx-$m$ is changed to an L level only when the output Qx and the inverted signal Qx-do are both at H levels, and is changed to an H level in the other cases. As shown in FIG. 13, the mask signal Q0-$m$ is at an L level only the period from the 0th clock to the 2nd clock of the horizontal direction clock HCK, and is at an H level in the other periods.

The mask circuit 2$d$-$x$ masks the output Qx during the mask period indicated by the mask signal Qx-$m$. Specifically, the mask circuit 2$d$-$x$ masks the output Qx during the period for which the mask signal Qx-$m$ is at an L level.

In this way, as shown in FIG. 13, the output Qx is masked during the period from the 0th clock to the 2nd clock of the horizontal direction clock HCK. As a result, the rising timing of the signal GATE0 that is finally supplied to the gate line 0 is the rising timing of the third clock of the horizontal direction clock HCK, as shown in FIG. 13.

As such, when the mask circuit 2$d$-$x$ performs the mask process on the basis of the mask signal Qx-$m$, the rising timing of the output Qx is delayed by the time corresponding to three clocks of the horizontal direction clock HCK and the delayed output Qx is output to the gate line x.

According to the structure shown in FIGS. 9 and 10, even when one line sequential scanning is performed, the mask process is performed by the mask signal. As can be understood from the above description, even when the mask process is performed during one line sequential scanning, the signal GATEx supplied to the gate line x can be changed to an H level during the signal write period from the 3rd clock to the 43rd clock. Therefore, the signal write operation can be normally performed.

That is, as can be understood from the above description, according to the structure shown in FIGS. 9 and 10, the structure of one line sequential driving is the same as that of two line simultaneous driving.

(Example of Two Line Simultaneous Driving by Adjustment of Vertical Direction Clock VCK)

An example of a method of implementing two line simultaneous driving by the adjustment of the vertical direction clock VCK will be described in consideration of the operation during one line sequential driving.

Figure 14:
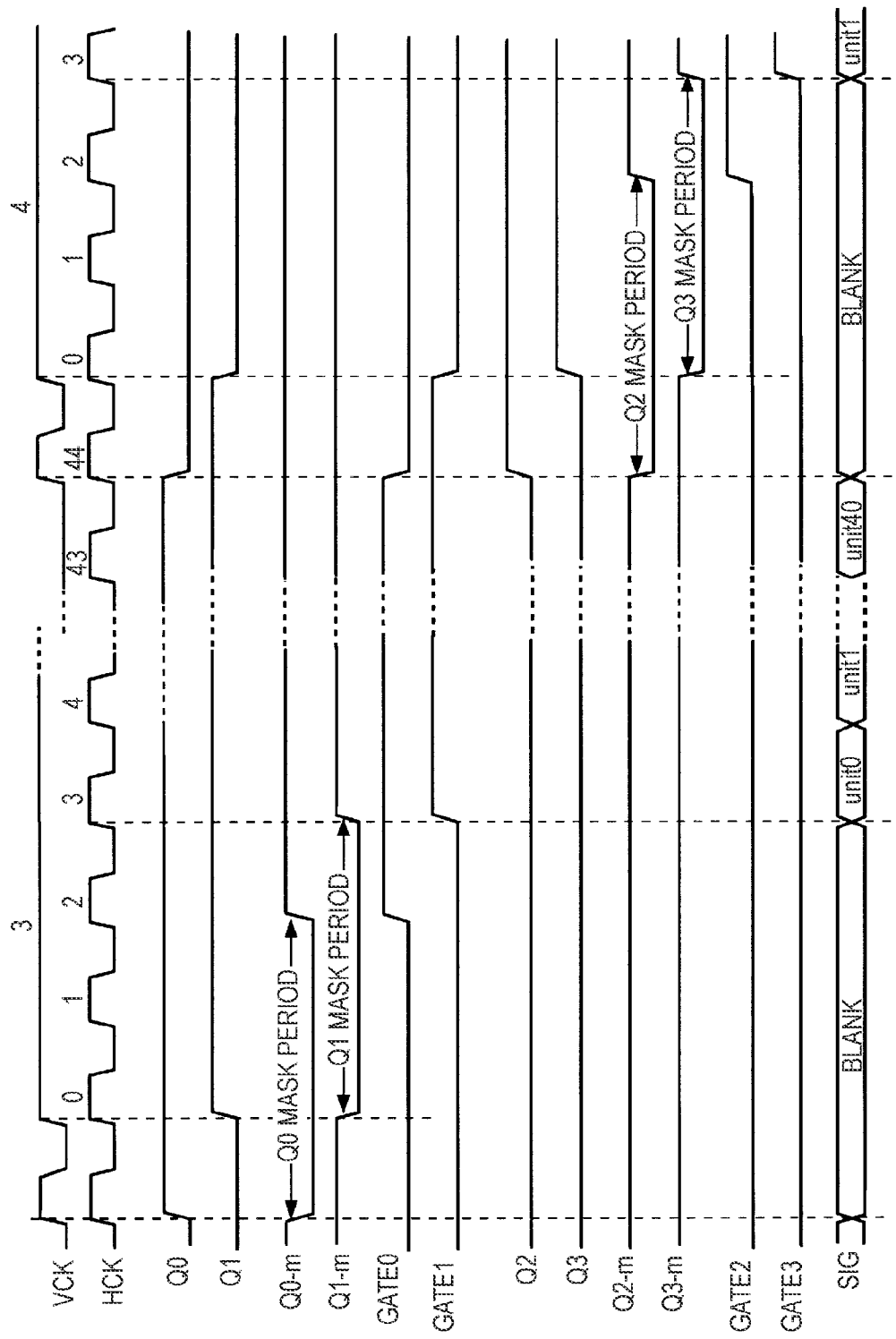
FIG. 14 is a timing chart illustrating a method of adjusting the vertical direction clock (shift clock) to implement two line simultaneous driving (sets of lines in which there is no remaining line)
Figure 15:
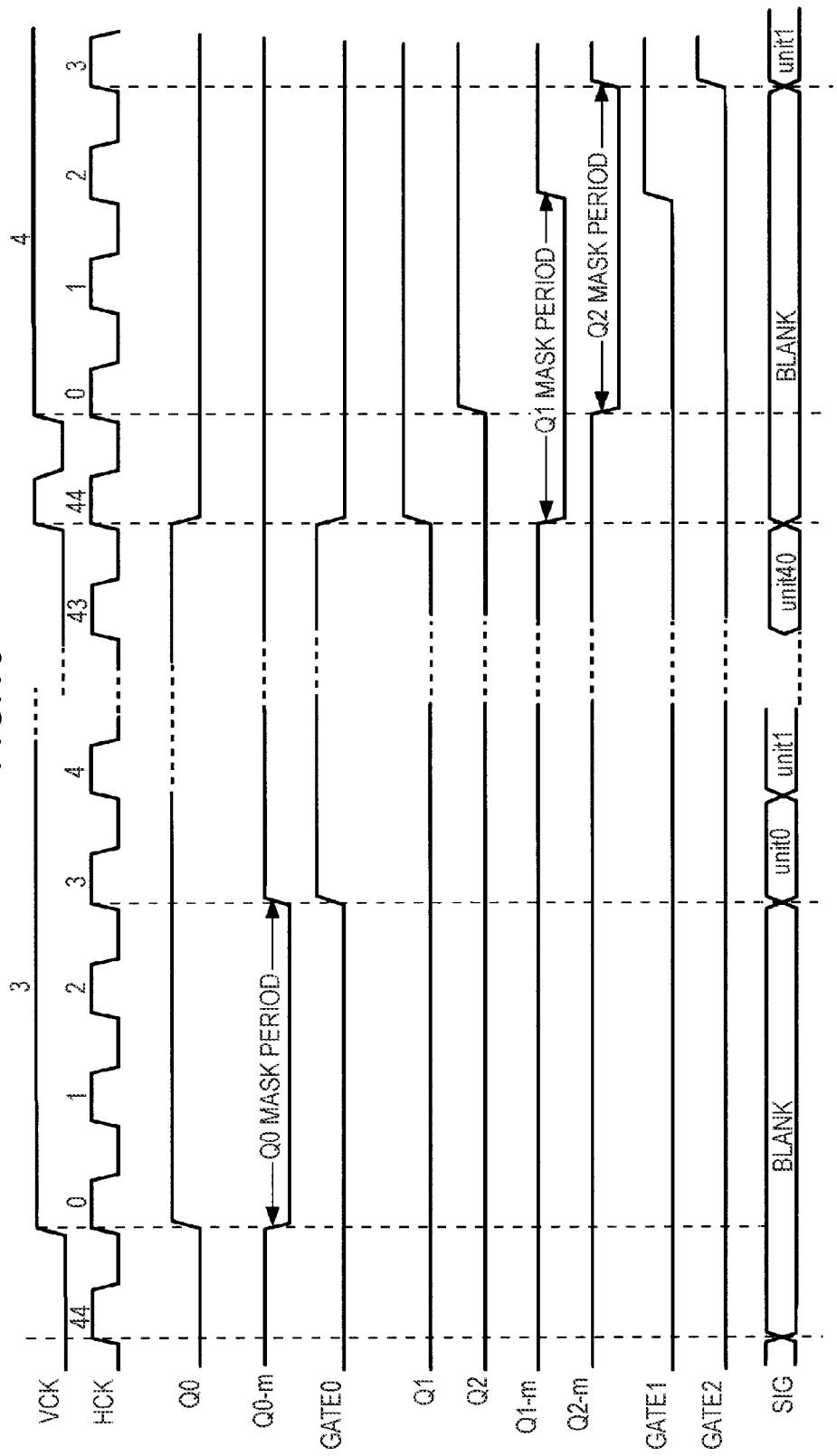
FIG. 15 is a timing chart illustrating a method of adjusting the vertical direction clock to implement two line simultaneous driving (sets of lines in which there is the remaining line)

FIGS. 14 and 15 are timing charts illustrating an example of a method of implementing two line simultaneous driving by the adjustment of the vertical direction clock VCK according to this embodiment. FIG. 14 is a timing chart when sets of two lines that are simultaneously driven are formed as shown in FIG. 4A, and FIG. 15 is a timing chart when sets of two lines that are simultaneously driven are formed as shown in FIG. 4B.

FIG. 14 shows the relationship among the waveforms of the vertical direction clock VCK, the horizontal direction clock HCK, the output Q0, the output Q1, the delay signal Q0-$d$, the delay signal Q1-$d$, the inverted signal Q0-$do$, the inverted signal Q1-$do$, the mask signal Q0-$m$, the mask signal Q1-$m$, the signal GATE0, the signal GATE1, the output Q2, the output Q3, the delay signal Q2-$d$, the delay signal Q3-$d$, the inverted signal Q2-*do*, the inverted signal Q3-*do*, the mask signal Q2-*m*, the mask signal Q3-*m*, the signal GATE2, and the signal GATE3 within the period from the fourth horizontal line period (corresponding to the third clock of the vertical direction clock VCK shown in FIG. 11 or FIG. 13: the period for which the scanning of the line 0 needs to be performed) to around the start timing of the next horizontal line period within one frame period.

FIG. 15 shows the relationship among the waveforms of the vertical direction clock VCK, the horizontal direction clock HCK, the output Q0, the delay signal Q0-*d*, the inverted signal Q0-*do*, the mask signal Q0-*m*, the signal GATE0, the output Q1, the output Q2, the delay signal Q1-*d*, the delay signal Q2-*d*, the inverted signal Q1-*do*, the inverted signal Q2-*do*, the mask signal Q1-*m*, the mask signal Q2-*m*, the signal GATE1, and the signal GATE1 within the same period as described above.

In FIGS. 14 and 15, 'SIG' indicates the discrimination between the period for which signals are written to each H-unit and the blank period.

For confirmation, although not shown in the drawings, in this case, the waveform of the vertical direction clock VCK from the first horizontal line period to the third horizontal line period within one frame period is the same as that shown in FIG. 11.

However, when two line simultaneous driving is performed, the number of scanning operations required for one frame is half of that when one line sequential scanning is performed (in the sets shown in FIG. 4B, half+1 since there is one remaining line). In this embodiment, since the number of effective pixels in the vertical direction in the pixel array 1 is 1104, 552 scanning operations (=1104/2) may be performed.

In this case, in this embodiment, as can be seen from FIG. 11, four horizontal line periods, that is, the first to third horizontal line periods and the last horizontal line period, within one frame period are the blank periods in the vertical direction. Therefore, when two line simultaneous driving is performed, the scanning time of one frame has a time length corresponding to 556 horizontal line periods (=552+4).

First, in FIG. 14, when two line simultaneous driving is implemented by the sets shown in FIG. 4A, as shown in FIG. 14, in addition to the H pulse of the horizontal line period shown in FIG. 11, an H pulse that is changed to an H level in synchronization with the rising timing of the 44th clock of the horizontal direction clock HCK and is changed to an L level in synchronization with the falling timing of the 44th clock is added to the vertical direction clock VCK, (hereinafter, the H pulse is referred to as an adjustment pulse).

In this case, as described above, when considering the number of scanning operations is half, the signal write period within one frame period is from the 4th horizontal line period to the 555th horizontal line period. Therefore, the addition of the adjustment pulse is performed from the 4th horizontal line period to the 555th horizontal line period. That is, when the general one line sequential driving shown in FIG. 11 is performed, the addition of the adjustment pulse to the vertical direction clock VCK is performed from the 3rd clock to the 554th clock.

When the period from the 0-th clock to the 44th clock of the horizontal direction clock HCK is 'one horizontal line period', the rising timing of the adjustment pulse of the vertical direction clock VCK is earlier than the start timing of the 'one horizontal line period', but the rising timing of the adjustment pulse is within the horizontal line period. Therefore, similar to the vertical direction clock VCK shown in FIG. 5 or FIG. 6, the vertical direction clock VCK shown in FIG. 14 includes two rising timings within one horizontal line 'period'.

When the vertical direction clock VCK shown in FIG. 14 is obtained, as shown in FIG. 14, the output Q0 is changed to an H level at the rising timing (the rising timing of the adjustment pulse) of the 44th clock of the horizontal direction clock HCK within the third horizontal line period (corresponding to the second clock of the vertical direction clock VCK shown in FIG. 11). Then, the output Q1 is changed to an H level at the rising timing of the 0th clock of the horizontal direction clock HCK within the fourth horizontal line period (the rising timing of the next H pulse of the adjustment pulse of the vertical direction clock VCK).

The mask signal Q0-*m* is at an L level during the period corresponding to three clocks of the horizontal direction clock HCK from the rising timing of the output Q0, and is at an H level in the other periods. Similarly, the mask signal Q1-*m* is at an L level during the period corresponding to three clocks of the horizontal direction clock HCK from the rising timing of the output Q1, and is at an H level in the other periods.

As a result, the signal GATE0 and the signal GATE1 are changed to H levels at the rising timing of the second clock and the rising timing of the third clock of the horizontal direction clock HCK within the fourth horizontal line period, respectively.

In this case, the falling timing of the output Q0 (that is, the falling timing of the signal GATE0) is matched with the rising timing of the adjustment pulse added in the last portion of the fourth horizontal line period. The falling timing of the output Q1 (the falling timing of the signal GATE1) is matched with the next rising timing of the adjustment pulse added within the fourth horizontal line period.

At the rising timing of the adjustment pulse added in the last portion of the fourth horizontal line period, since the output Q1 is at an H level, the output Q2 is changed to an H level. At the next rising timing of the adjustment pulse added to the vertical direction clock VCK within the fourth horizontal line period, since the output Q2 is at the H level, the output Q3 is changed to an H level.

In this case, the mask signal Q2-*m* is at an L level during the period corresponding to three clocks of the horizontal direction clock HCK from the rising timing of the output Q2, and is at an H level in the other periods. The mask signal Q3-*m* is at an L level during the period corresponding to three clocks of the horizontal direction clock HCK from the rising timing of the output Q3, and is at an H level in the other periods.

As a result, the signal GATE2 and the signal GATE3 are changed to H levels at the rising timing of the second clock and the rising timing of the third clock of the horizontal direction clock HCK within the fifth horizontal line period, respectively.

In FIG. 14, according to the adjustment of the vertical direction clock VCK and the masking of the output Qx according to this embodiment, it is possible to simultaneously drive two adjacent lines during the period from the 3rd clock to the 43rd clock of the horizontal direction clock HCK, which is set as the signal write period within one horizontal line period. In addition, it is possible to prevent the generation of the period for which an unintended set of two lines is simultaneously driven.

When two line simultaneous driving is performed by the sets shown in FIG. 4B, the vertical direction clock VCK is adjusted as shown in FIG. 15.

Specifically, in this case, the vertical direction clock VCK is adjusted such that there is one rising timing for one horizontal line period from the first horizontal line period to the fourth horizontal line period within one frame period, similar to FIG. 11 (that is, the adjustment pulse is not added), and the same adjustment pulse as that shown in FIG. 14 is added after the fifth horizontal line period.

In this embodiment, when two line simultaneous driving is performed by the sets shown in FIG. 4B, the line 0 and the line 551 in the pixel array 1 are the remaining lines. That is, in this case, the number of scanning operations needs to be one more than the number of times the two line simultaneous driving by the set shown in FIG. 4A is performed.

As can be understood from this point, the addition of the adjustment pulse is performed from the 5th horizontal line period to the 556-th horizontal line period. That is, the adjustment pulse is added from the 3rd clock to the 555th clock of the general vertical direction clock VCK shown in FIG. 11.

As can be understood from this point, in this case, the last horizontal line period within one frame period is not the blank period.

When the vertical direction clock VCK shown in FIG. 15 is obtained, the output Q0, the mask signal Q0-$m$, and the signal GATE0 have the same waveforms as those shown in FIG. 13.

However, in this case, since the adjustment pulse is added to the last portion of the fourth horizontal line period, the falling timing of the output Q0 and the mask signal Q0-$m$ is matched with the rising timing of the adjustment pulse (that is, the rising timing of the 44th clock of the horizontal direction clock HCK within the fourth horizontal line period).

When the adjustment pulse is added, the output Q1 is changed to an H level at the rising timing of the adjustment pulse, as shown in FIG. 15. In addition, since the output Q1 is at the H level, the output Q2 is changed to an H level at the next rising timing (the start timing of the fifth horizontal line period) of the adjustment pulse of the vertical direction clock VSK.

In this case, the mask signal Q1-$m$ is at an L level during the period corresponding to three clocks of the horizontal direction clock HCK from the rising timing of the output Q1, and is at an H level in the other periods. The mask signal Q2-$m$ is at an L level during the period corresponding to three clocks of the horizontal direction clock HCK from the rising timing of the output Q2, and is at an H level in the other periods.

As a result, the signal GATE1 and the signal GATE2 are changed to H levels at the rising timing of the second clock and the rising timing of the third clock of the horizontal direction clock HCK within the fifth horizontal line period, respectively, as shown in FIG. 15.

In this way, even when two line simultaneous driving is performed by the sets shown in FIG. 4B, according to the adjustment of the vertical direction clock VCK and the masking of the output Qx according to this embodiment, it is possible to simultaneously drive two adjacent lines during the period from the 3rd clock to the 43rd clock of the horizontal direction clock HCK, which is set as the signal write period within one horizontal line period. In addition, it is possible to prevent the generation of the period for which an unintended set of two lines is simultaneously driven.

—Description of Structure Related to Adjustment of Shift Clock—

Figure 16:
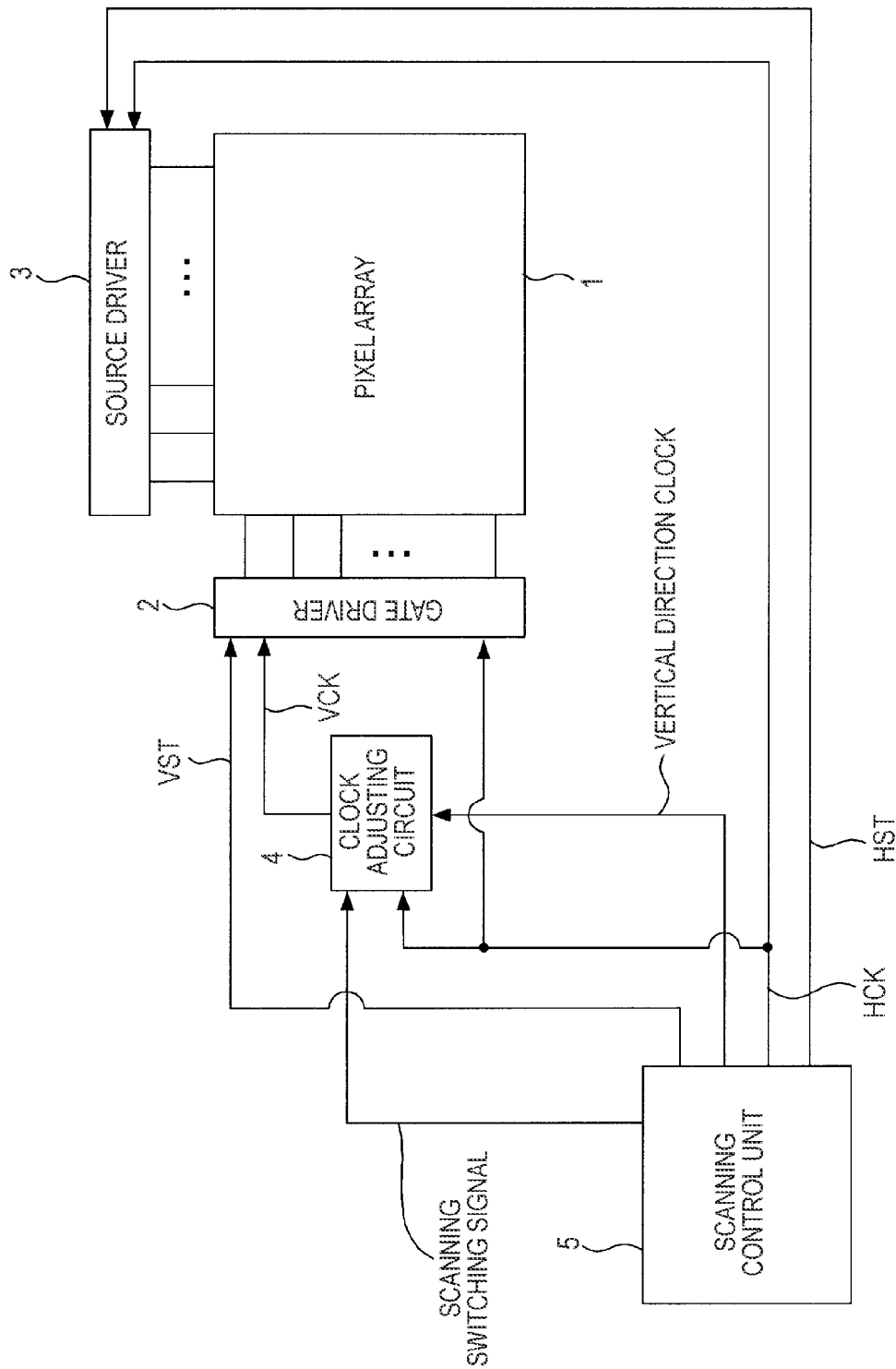
FIG. 16 is a diagram illustrating a structure for implementing the method of adjusting the vertical direction clock according to an embodiment of the invention.

FIG. 16 is a diagram illustrating a structure for adjusting the vertical direction clock VCK.

FIG. 16 shows only the display panel including the pixel array 1, the gate driver 2, and the source driver 3, and components related to clock adjustment in the internal structure of the display device according to this embodiment.

In the display device according to this embodiment, the components for clock adjustment correspond to a scanning control unit 5 and a clock adjusting circuit 4 in FIG. 16.

The scanning control unit 5 outputs a vertical direction clock, a vertical direction start instruction signal VST, the horizontal direction clock HCK, and a horizontal direction start instruction signal HST as timing signals for instructing the sequential driving timing of the scanning lines of the display panel and the sequential writing timing of signal values to each H-unit.

The vertical direction clock is a general vertical direction clock (that is, to which no adjustment pulse is added) for implementing one line sequential scanning shown in FIG. 11, and is discriminated from the vertical direction clock VCK output from the clock adjusting circuit 4.

The scanning control unit 5 generates and outputs the timing signals on the basis of the synchronization signals (a vertical synchronization signal and a horizontal synchronization signal) obtained from an input video signal, which will be described below.

The scanning control unit 5 outputs a scanning switching signal.

In the first embodiment, two line simultaneous driving is performed by switching the driving by the sets shown in FIG. 4A and the driving by the sets shown in FIG. 4B, which will be described below. The scanning switching signal is for instructing to switch a set of two lines that are simultaneously driven between the sets shown in FIG. 4A and the sets shown in FIG. 4B.

As shown in FIG. 16, the vertical direction clock, the horizontal direction clock HCK, and the scanning switching signal output from the scanning control unit 5 are supplied to the clock adjusting circuit 4.

The horizontal direction clock HCK is also supplied to the gate driver 2 and the source driver 3.

The vertical direction start instruction signal VST is supplied to the gate driver 2.

The horizontal direction start instruction signal HST is supplied to the source driver 3.

As described in FIG. 12, in this embodiment, similar to the gate driver 2, the source driver 3 includes a shift register (in this case, 41 stages) and an erroneous scanning start preventing unit. The horizontal direction clock HCK is input as a shift clock to the shift register. In this way, the H-units are sequentially selected in synchronization with the horizontal direction clock HCK.

The horizontal direction start instruction signal HST is given as an input signal and the horizontal direction clock HCK is given as a shift clock to the erroneous scanning start preventing unit. The output of the erroneous scanning start preventing unit is given as an input signal to the shift register. According to this structure, signals are written to each H-unit at the timing shown in FIG. 12.

The clock adjusting circuit 4 generates the vertical direction clock VCK shown in FIG. 14 for implementing the two line simultaneous driving by the sets shown in FIG. 4A or the vertical direction clock VCK shown in FIG. 15 for implementing two line simultaneous driving by the sets shown in FIG. 4B, on the basis of the vertical direction clock, the horizontal direction clock HCK, and the scanning switching signal supplied from the scanning control unit 5.

Specifically, when the scanning switching signal indicates the two line simultaneous driving by the sets shown in FIG. 4A in which there is no remaining line, the clock adjusting circuit 4 does not add the adjustment pulse to three clocks from the head of each period corresponding to 556 clocks of the vertical direction clock that is output from the scanning control unit 5, but adds the adjustment pulse to the 3rd clock (4th clock) to the 554th clock (555th clock).

When the scanning switching signal indicates the two line simultaneous driving by the sets shown in FIG. 4B in which there is the remaining line, similarly, the clock adjusting circuit 4 does not add the adjustment pulse to three clocks from the head of each period corresponding to 556 clocks of the vertical direction clock that is output from the scanning control unit 5, but adds the adjustment pulse to the 3rd clock (4th clock) to the 555th clock (556th clock).

The vertical direction clock passing through the clock adjusting circuit 4 is supplied as the vertical direction clock VCK to the gate driver 2.

According to the above-mentioned structure, it is possible to perform the switching between the driving of each line shown in FIG. 14 corresponding to the sets of the lines simultaneously driven shown in FIG. 4A and the driving of each line shown in FIG. 15 corresponding to the sets of the lines simultaneously driven shown in FIG. 4B, in response to the instructions of the scanning switching signal.

1-6. For Bipolar Driving

In the display device according to this embodiment, the display panel is driven by a so-called bipolar driving method.

The bipolar driving method is used in, for example, an LCOS panel or an SXRD panel and is performed for the DC balance of a write voltage.

Figure 17:
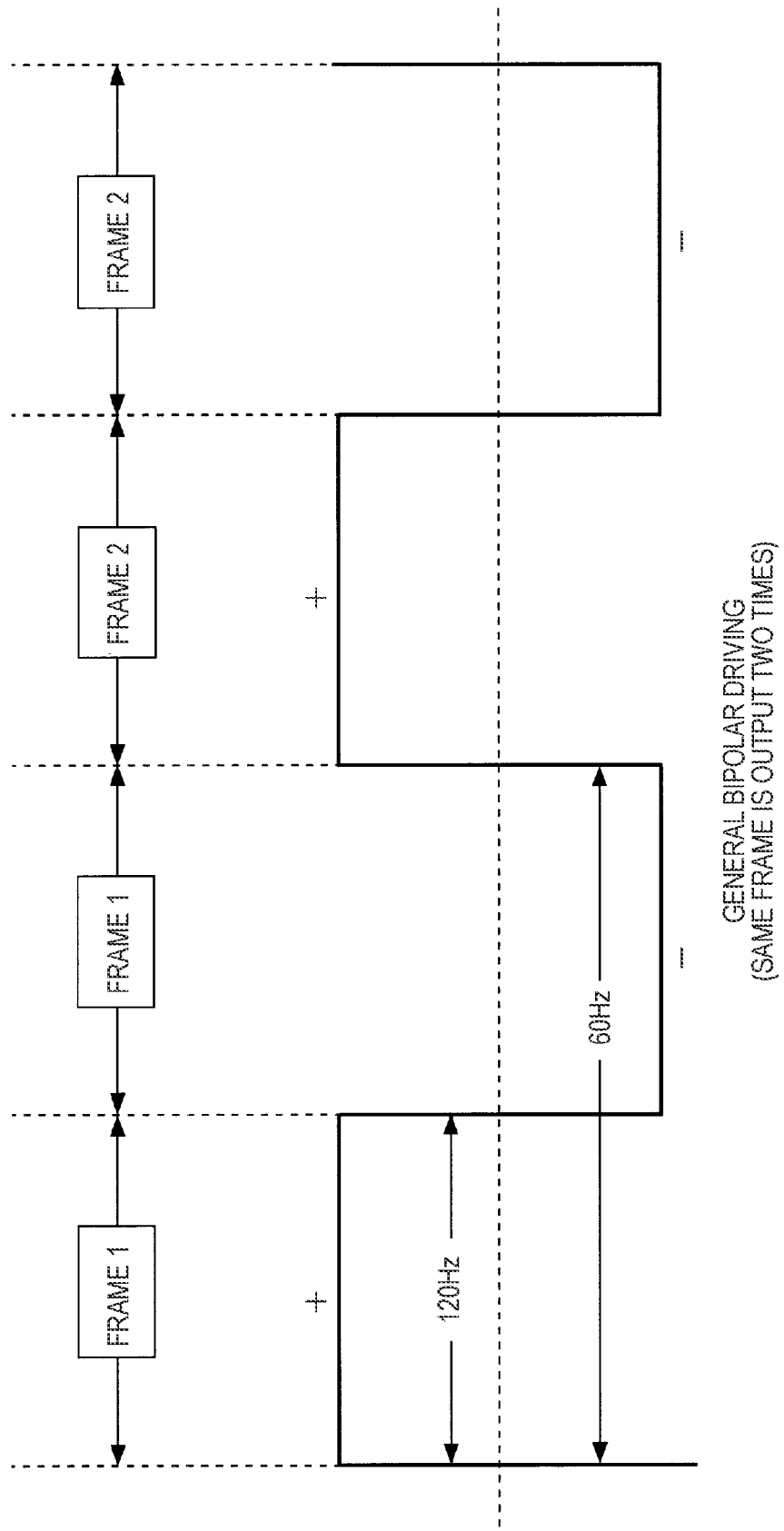
FIG. 17 is a conceptual diagram illustrating general bipolar driving (bipolar driving according to the related art)

FIG. 17 is a conceptual diagram illustrating a general bipolar driving (bipolar driving) method.

For example, when the frame rate of the input video signal is 60 Hz (fps), as shown in FIG. 17, in the bipolar driving, the polarity of a write voltage is inverted with a period of 120 Hz. The, the same frame is output two times to obtain the DC balance of the write voltage.

Specifically, for a frame 1 in FIG. 17, a positive image signal of the frame 1 is written within the first half of one frame period (about 16.6 msec) of 60 Hz, and a negative image signal of the frame 1 is written within the second half. In this way, the positive and negative image signals are written to the same frame image. As a result, the positive and negative polarities of the write voltage are cancelled and the DC balance is ensured.

1-7. EVEN/ODD Display

As can be understood from the above description, in this embodiment, in order to increase the frame rate and improve the quality of a moving picture, a method of simultaneously driving a plurality of lines is used.

However, this embodiment uses a method of sequentially changes sets of a plurality of lines that are simultaneously driven in addition to simultaneously driving a plurality of lines. Specifically, in this embodiment, two lines are simultaneously driven within one horizontal line period, and a set of lines that are simultaneously driven is changed with a frame period (whenever the same frame image is displayed).

For confirmation, when a method of simultaneously driving a plurality of lines is used, there may be the remaining lines that are not simultaneously driven (that is, some lines that are not simultaneously driven among the lines that are set to be simultaneously driven) according to the setting of the number of pixel horizontal lines in the array 1 or the number of lines that are simultaneously driven. In this embodiment, the number of horizontal lines in the pixel array 1 is an even number and the number of lines that are simultaneously driven is '2'. When the driving shown in FIG. 4B is performed, there are lines that are not simultaneously driven (the line 0 in FIG. 4B and the line 1103 (not shown)). The remaining lines are individually driven. When three or more lines are simultaneously driven and the number of remaining lines is 2 or more, it is possible to simultaneously driving the remaining lines.

As can be understood from the above description, in particular, when the number of horizontal lines is an odd number, there may be no set of lines that are simultaneously driven in which 'there is no remaining line'. Therefore, in this case, all sets of lines that are simultaneously driven are 'the sets of the lines in which there is the remaining line'. That is, in this case, a set of lines that are simultaneously driven is changed between 'the sets of the lines in which there is the remaining line'.

When the method simultaneously driving a plurality of lines is used, a reduction in resolution in the vertical direction is inevitable. For example, when two line simultaneous driving is performed, the resolution in the vertical direction is reduced by half.

In this embodiment, in order to supplement the reduction in resolution in the vertical direction during two line simultaneous driving, as described above, the sets of the lines that are simultaneously driven are sequentially changed with the frame period, and studies on improvement in the quality of images to be displayed have been conducted.

Figure 18:
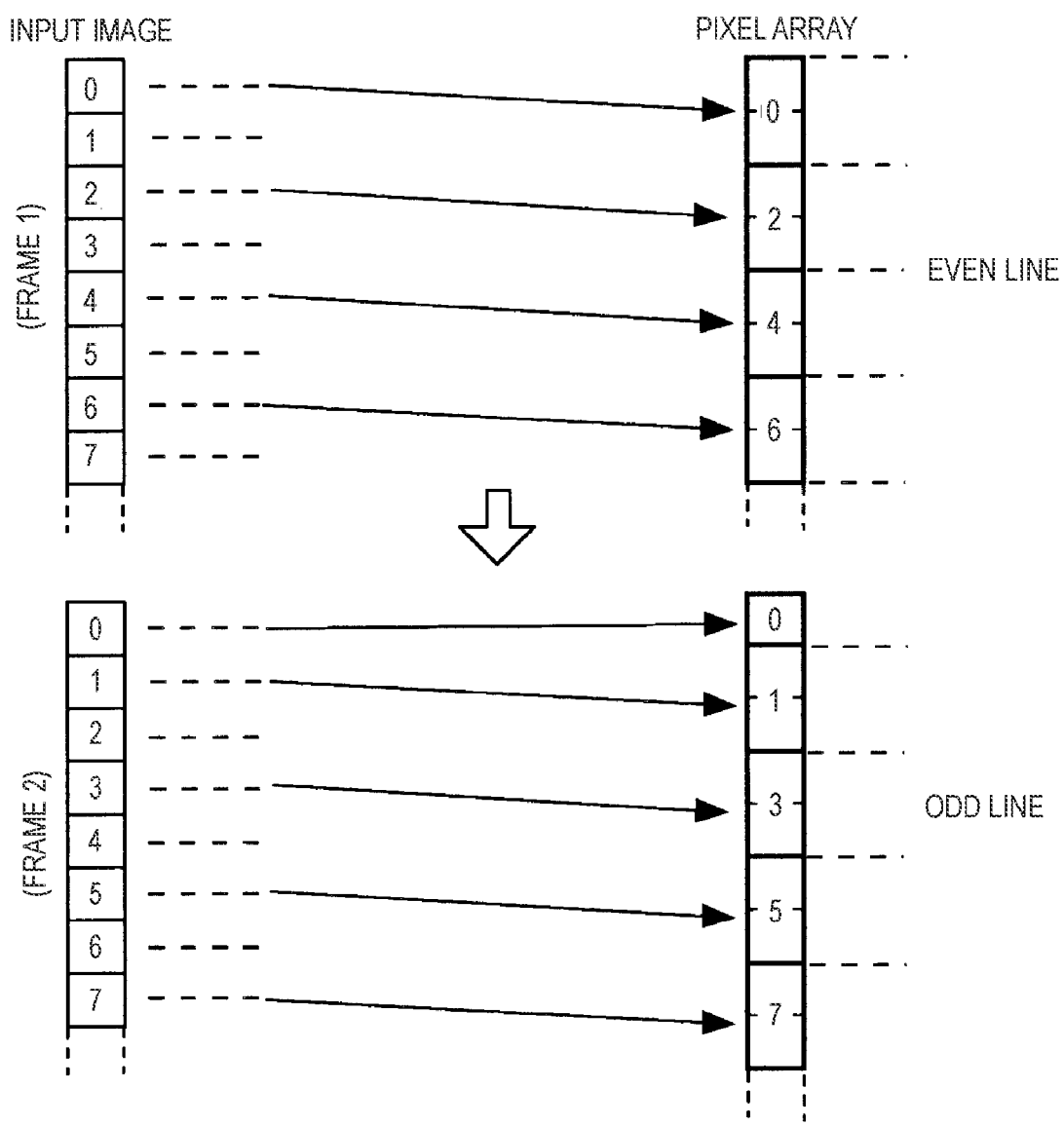
FIG. 18 is a diagram illustrating a display method according to a first embodiment.

FIG. 18 is a diagram illustrating the details of the display method.

As shown in FIG. 18, in this embodiment, even-numbered (EVEN) lines are thinned out from a first frame image (frame 1), and the signal value of each of the thinned EVEN lines is applied to each set of two lines that are simultaneously driven, thereby performing display. Specifically, the simultaneous driving timing of each line corresponds to the write timing of a signal value to each line such that the consistency of the order of the lines in the vertical direction is ensured between an input image side and a display image side in such a way that the image signal of the line 0 obtained by the thinning-out process is applied to a set of 'the line 0 and the line 1' and the image signal of the line 2 is applied to a set of 'the line 2 and the line 3'.

Basically, odd-numbered (ODD) lines are thinned out from a second frame image (frame 2), and the signal value of each of the thinned ODD lines is applied to each set of two lines that are simultaneously driven, thereby performing display. During the output of the ODD lines, the driving timing of each line (scanning line) corresponds to the write timing of a signal value to each line such that the consistency of the order of the lines in the vertical direction is ensured between the input image side and the display image side.

Similarly, the thinning-out of the EVEN lines, the thinning-out of the ODD lines, and the thinning-out of the EVEN lines are alternately repeated for the subsequent frame images in this order.

In FIG. 18, the line 0 and the line 1103 are the remaining lines during the period for which simultaneous driving is performed on the sets of the lines in which there is the remaining line, which is the frame period for which the thinned-out image of the ODD lines is displayed. In this case, as described above, when the signal value of each ODD line is applied to each set of lines that are simultaneously driven, the signal value of the last line 1103 is applied only to scanning line No. 1103, which is the remaining line. Therefore, in this way, the signal value of the ODD line with the largest number in the input frame image is written when the last remaining line (the scanning line with the largest number) is driven.

In this case, there is no signal value to be applied to the line 0, which is the remaining line. That is, the line 0 is considered as a non-display line.

As such, when two line simultaneous driving is performed by the sets of the lines in which there is the remaining line, the ODD lines are thinned out from an input image and the signal value of the line 0 is output. Then, as shown in FIG. 18, the output signal value of the line 0 is written to the line 0.

In the first embodiment, the writing (display) of signals only to the EVEN lines of an input frame image and the writing of signals to the ODD lines are alternately switched with the frame period while the sets of the lines that are simultaneously driven are alternately changed with the frame period. In this way, it is possible to displace the center of the pixel within the storage time of an image to the retina, and it is possible to achieve the same display method as an interface method. That is, in this way, it is possible to supplement the resolution in the vertical direction that is reduced by half in the method of simply simultaneously driving a plurality of lines. In other words, it is possible to improve the resolution in the vertical direction, as compared to the method of simply simultaneously driving a plurality of lines. As a result, it is possible to improve image quality.

The supplement of the resolution in the vertical direction by the display method shown in FIG. 18 will be described with reference to FIGS. 19A to 19C and FIG. 20.

For example, for an input image shown in FIG. 19A, when the sets of the lines that are simultaneously driven are changed with the frame period shown in FIG. 18 and the display of the EVEN lines and the display of the ODD lines are switched with the frame period, a display image shown in FIG. 19B and a display image shown in FIG. 19C are generated.

Specifically, FIG. 19B shows a display image when no remaining line is generated in the sets of two lines that are simultaneously driven and each signal line is driven on the basis of the thinning-out of the EVEN lines. FIG. 19C shows a display image when the remaining line is generated in the sets of two lines that are simultaneously driven and each signal line is driven on the basis of the thinning-out of the ODD lines (in this embodiment, the signal value of the line 0 of the input image is written to the line 0).

In FIGS. 19A to 19C, for simplicity of description, the number of pixels in the vertical direction is 20 (0 to 19).

In the following description, the frame in which each signal is driven on the basis of the thinning-out of the EVEN lines as shown in FIG. 19B is referred to as an 'EVEN frame'.

In addition, the frame in which each signal is driven on the basis of the thinning-out of the ODD lines as shown in FIG. 19C is referred to as an 'ODD frame'.

Figure 20:
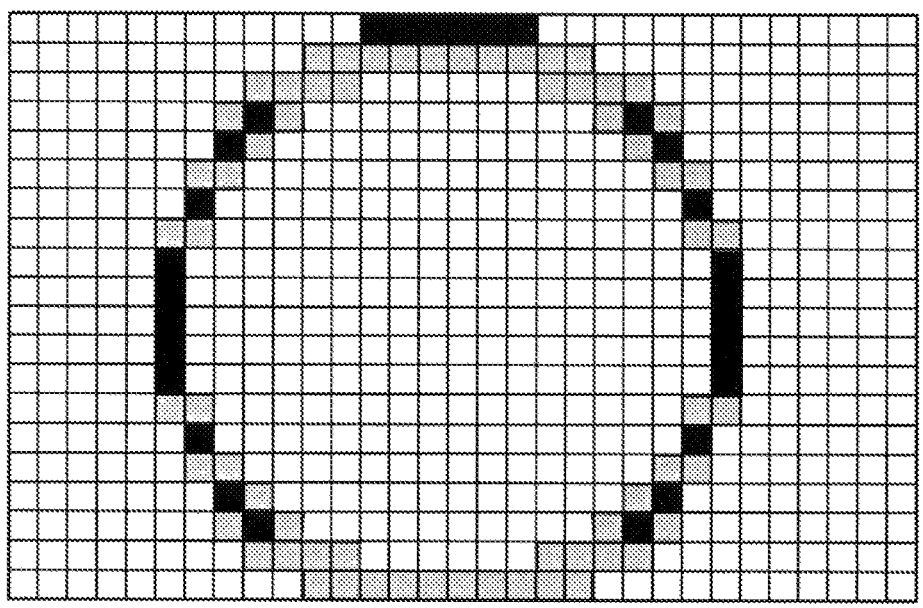
FIG. 20 is a diagram illustrating the supplement of the resolution in the vertical direction by the display method according to the first embodiment.

FIG. 20 is a diagram illustrating an overlap image between the EVEN frame shown in FIG. 19B and the ODD frame shown in FIG. 19C.

As can be seen from the comparison between FIG. 20 and FIGS. 19B and 19C, the resolution of the overlap image shown in FIG. 20 (that is, an actually observed image) in the vertical direction is higher than those of the EVEN frame and the ODD frame obtained by two line simultaneous driving.

In this way, when the sets of the lines that are simultaneously driven are changed with the frame period shown in FIG. 18 and the display of the EVEN lines and the display of the ODD lines are switched with the frame period, it is possible to improve the resolution in the vertical direction as compared to the structure in which two line sequential driving is simply performed.

In this embodiment, a bipolar driving method is used to drive the display panel. As described above, the bipolar driving method writes positive and negative image signals to the same frame image to ensure the DC balance.

Figure 21:
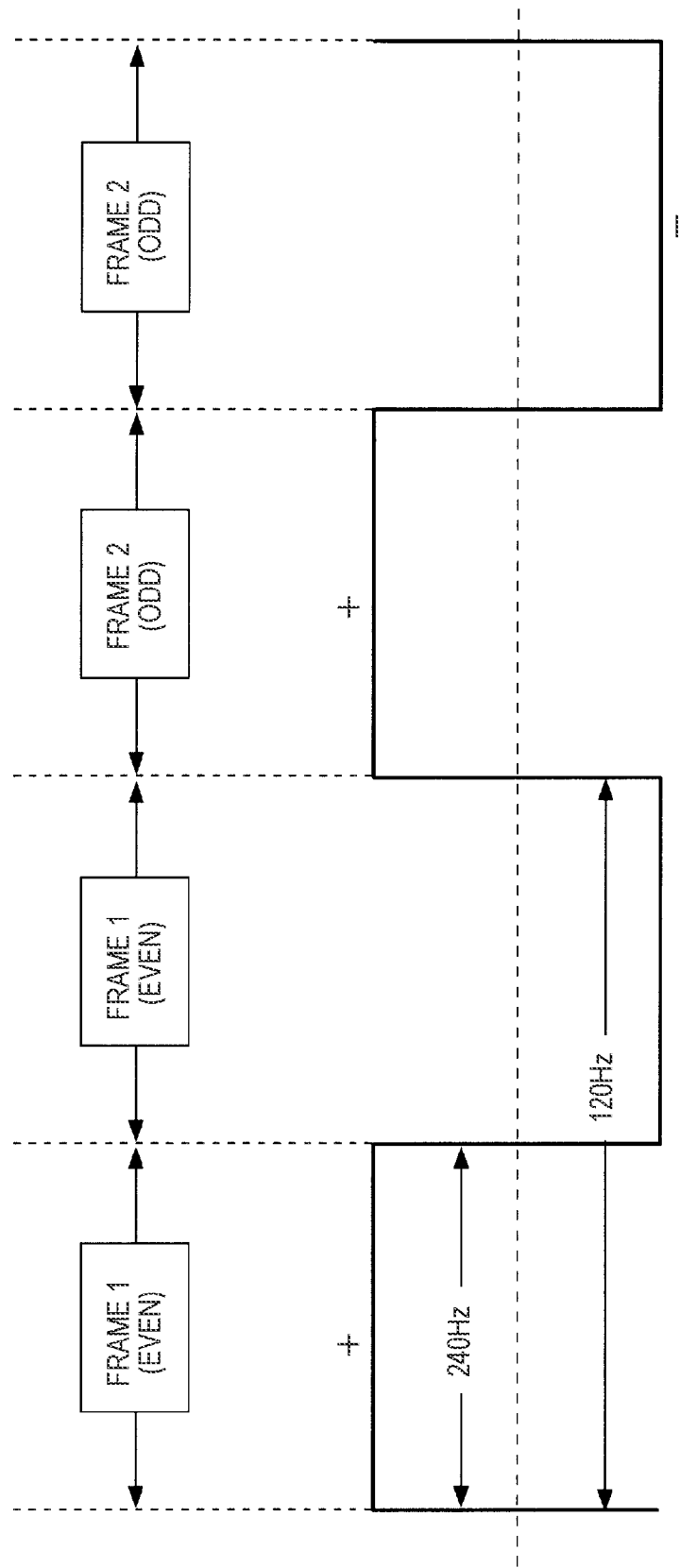
FIG. 21 is a diagram illustrating a change in the display image of each frame when the display method according to the first embodiment is used and a driving polarity for each frame.

For confirmation, FIG. 21 shows a change in the display image of each frame when the switching between the EVEN frame and the ODD frame is performed with the frame period as shown in FIG. 18 and the driving polarity of each frame in the bipolar driving method.

First, in this example, since a method of simultaneously driving two lines is used, it is possible to improve the frame rate to be two times more than that in the general bipolar driving method (FIG. 17). That is, when the frame rate is 60 fps in the general bipolar driving method, the frame rate can be improved to 120 fps in this embodiment.

That is, in this case, an input video signal of 120 fps is input to the display device. That is, in this case, the frame period is 120 Hz.

As can be seen from FIG. 17, the driving polarity is changed with half the frame period. That is, in this case, the driving polarity is changed with a period of 240 Hz, as shown in FIG. 21.

Then, in this case, since the EVEN frame and the ODD frame are alternately displayed with the frame period, as shown in FIG. 21, the EVEN frame is displayed by writing the positive and negative image signals for the frame 1, and the ODD frame is displayed by writing the positive and negative image signals for the frame 2.

Although not shown in FIG. 21, similarly, the switching between the display of the EVEN frame and the display of the ODD frame is repeatedly performed with the frame period shown in FIG. 21 for the frame 3 and the frames after the frame 3.

The EVEN frame and the ODD frame are output as follows. As shown in FIG. 21, the switching between the display of the EVEN frame and the display of the ODD frame is not performed during the period for which the same frame image is displayed (a scanning period corresponding to one frame× 2), but the switching between the display of the EVEN frame and the display of the ODD frame is performed when the display of the frame is changed. It may be considered that the switching between the display of the EVEN frame and the display of the ODD frame is performed whenever scanning is performed on the same frame image two times, in terms of 'scanning'.

That is, in the driving method (display method) according to the first embodiment, scanning corresponding to one frame is performed on the same frame image two times with the positive and negative driving polarities, and the switching between the display of the EVEN frame and the display of the ODD frame is performed whenever scanning corresponding to one frame is performed on the same frame image two times.

1-8. Structure of Display Device According to First Embodiment

Figure 22:
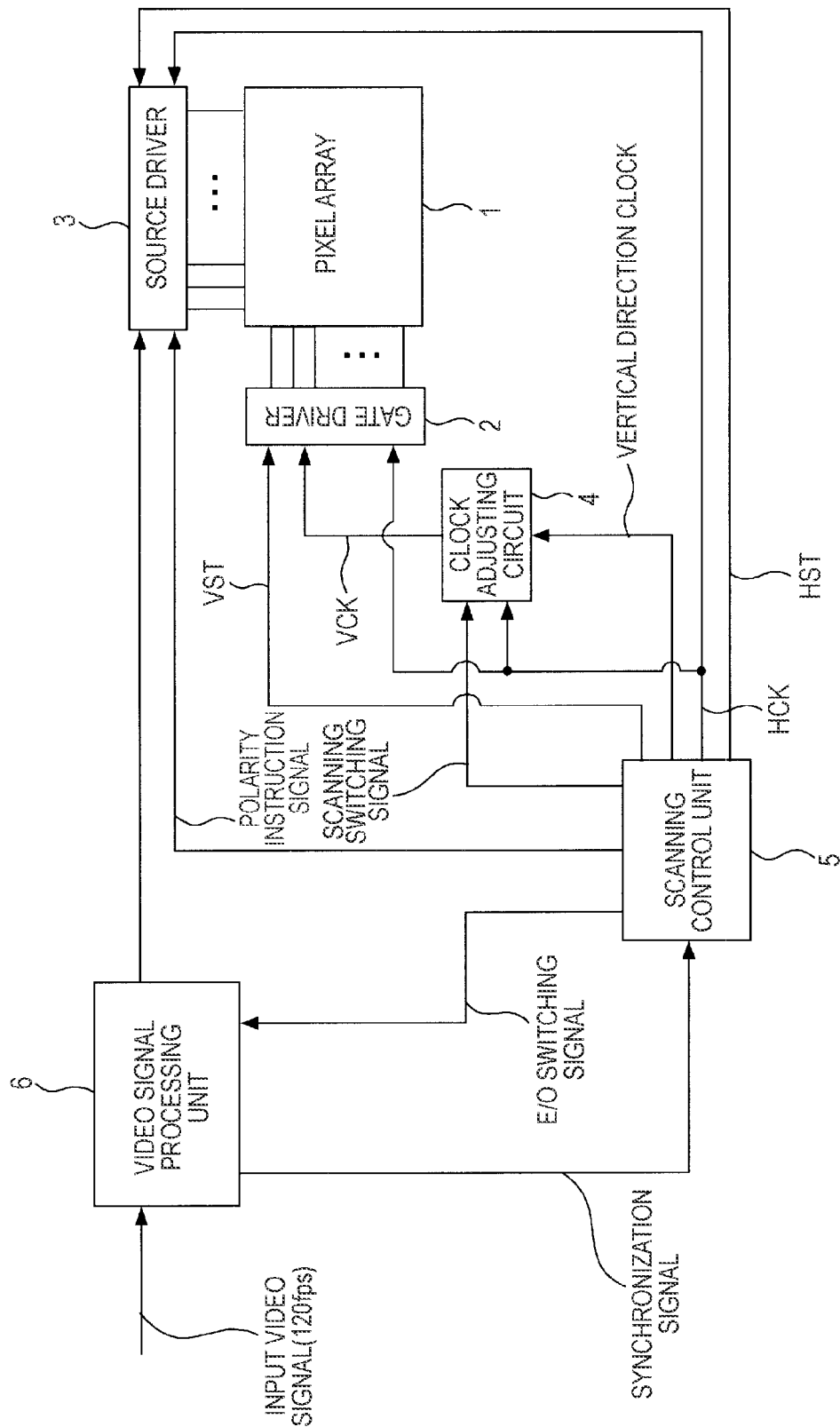
FIG. 22 is a diagram illustrating the internal structure of the display device according to the first embodiment.

FIG. 22 is a diagram illustrating the internal structure of the display device according to the first embodiment.

As shown in FIG. 22, the display device according to this embodiment includes a video signal processing unit 6, and the pixel array 1, the gate driver 2, the source driver 3, the clock adjusting circuit 4, and the scanning control unit 5 shown in FIG. 16.

As described above, in this embodiment, the display panel is driven by the bipolar driving method. In this case, the source driver 3 is configured that the signal values are written to each signal line by a driving polarity corresponding to a polarity instruction signal shown in FIG. 22.

As shown in FIG. 22, the scanning control unit 5 generates and outputs the polarity driving signal.

The scanning control unit 5 generates the polarity instruction signal and an E/O switching signal (EVEN/ODD switching signal) in addition to the various kinds of timing signals and the scanning switching signal described with reference to FIG. 16.

The detailed operation of the scanning control unit 5 generating the signals will be described below.

An input video signal is given to the video signal processing unit 6.

As shown in FIG. 21, in this embodiment, as the input video signal, a signal with a frame rate of 120 fps is input.

The video signal processing unit 6 performs a synchronizing separation process on the input video signal, and performs a process of thinning out the EVEN lines or the ODD lines on the basis of the E/O switching signal that is generated and output by the scanning control unit 5.

Figure 23:
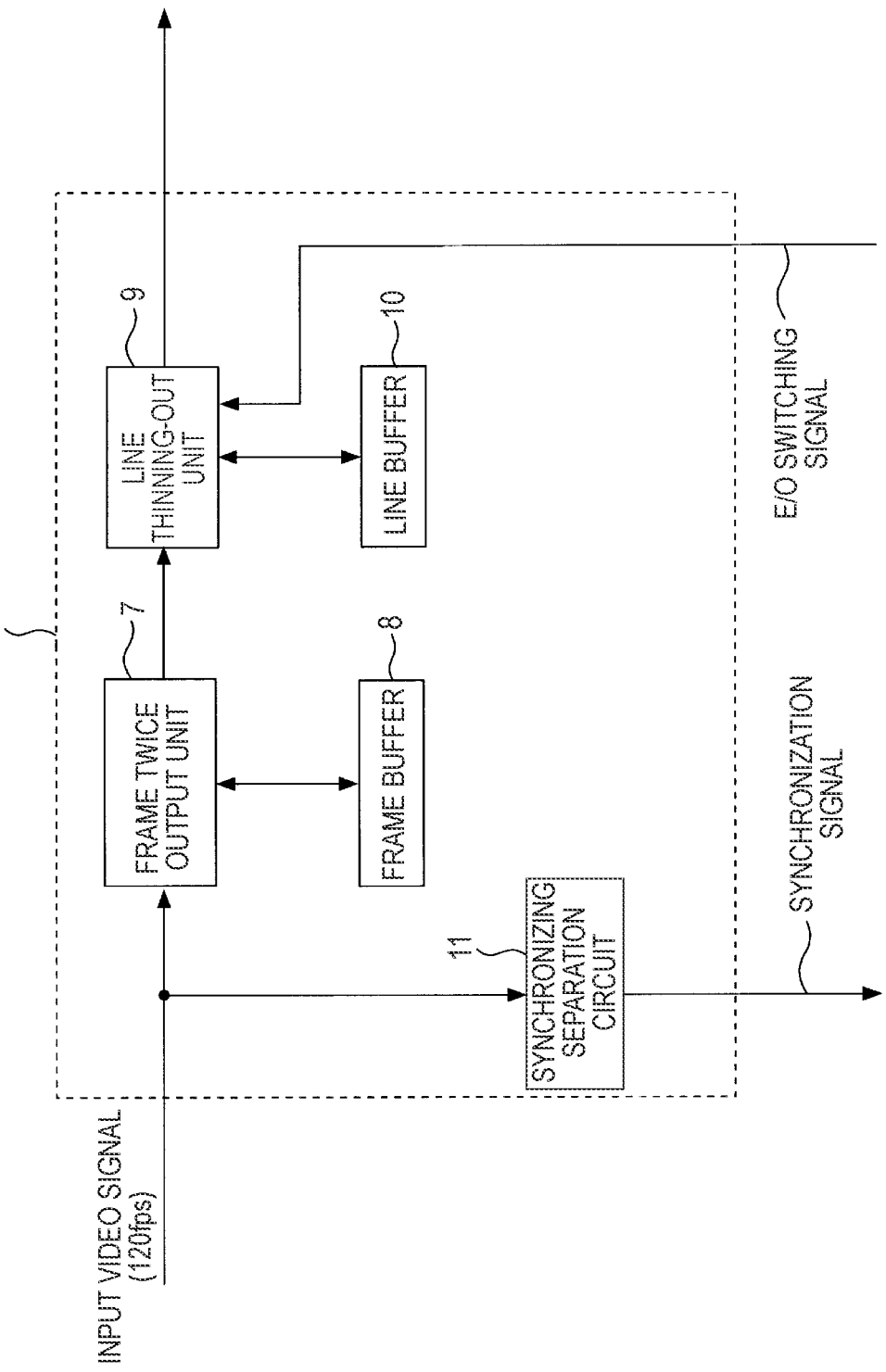
FIG. 23 is a diagram illustrating the internal structure of a video signal processing unit included in the display device according to the first embodiment.

FIG. 23 is a diagram illustrating the internal structure of the video signal processing unit 6.

As shown in FIG. 23, the video signal processing unit 6 includes a frame twice output unit 7, a frame buffer 8, a line thinning-out unit 9, a line buffer 10, and a synchronizing separation circuit 11.

In the video signal processing unit 6, the input video signal is supplied to the synchronizing separation circuit 11 and the frame twice output unit 7.

The synchronizing separation circuit 11 separates the vertical synchronization signal and the horizontal synchronization signal from the input video signal. The synchronization signals separated by the synchronizing separation circuit 11 are supplied to the scanning control unit 5 shown in FIG. 22.

The frame twice output unit 7, the frame buffer 8, the line thinning-out unit 9, and the line buffer 10 serve as a line thinning-out/twice output unit that thins out even-numbered horizontal lines or odd-numbered horizontal lines from the frame image signal obtained from the input video signal and continuously outputs the thinning result two times.

Specifically, the frame twice output unit 7 stores the frame image signals obtained from the input video signal in the frame buffer 8 and outputs the same frame image signal two times. The frame image signal that is output two times by the frame twice output unit 7 is supplied to the line thinning-out unit 9.

The line thinning-out unit 9 selectively outputs the image signals of the even-numbered horizontal line, or the image signals of the odd-numbered horizontal lines and the line 0 of the frame image signal on the basis of the E/O switching signal supplied from the scanning control unit 5.

Specifically, when the E/O switching signal indicates EVEN, the line buffer 10 shown in FIG. 23 is used to sequentially output the image signals of the line 0, the line 2, the line 4, . . . , the line 1102 of the input frame image. In addition, when the E/O switching signal indicates ODD, the line buffer 10 is used to sequentially output the image signals of the line 0, the line 1, the line 3, the line 5, . . . , the line 1103 of the input frame image.

FIG. 22 is referred to again.

As described with reference to FIG. 16, the scanning control unit 5 generates various timing signals, such as the vertical direction clock, the vertical direction start instruction signal VST, the horizontal direction clock HCK, and the horizontal direction start instruction signal HST, and the scanning switching signal.

The scanning control unit 5 generates the timing signals and the scanning switching signal on the basis of the synchronization signal supplied from the synchronizing separation circuit 11 of the video signal processing unit 6. In this embodiment, as the vertical direction start instruction signal VST, a signal in which a start pulse is output with half the frame period (one period of the vertical synchronization signal) is generated such that scanning can be performed two times within one frame period shown in FIG. 21.

In addition, the scanning control unit 5 generates the scanning switching signal and the E/O switching signal on the basis of the synchronization signal from the synchronizing separation circuit 11.

Specifically, as the scanning switching signal, a signal is generated which instructs to alternately change the sets of the two lines that are simultaneously driven with the frame period based on the synchronization signal. In addition, as the E/O switching signal, a signal is generated which instructs to alternately change the EVEN and ODD with the frame period based on the synchronization signal.

In addition, the scanning control unit 5 generates a polarity instruction signal on the basis of the synchronization signal. As the polarity instruction signal, a signal is generated which instructs to alternately change the positive polarity and the negative polarity with half the frame period based on the synchronization signal.

Figure 24:
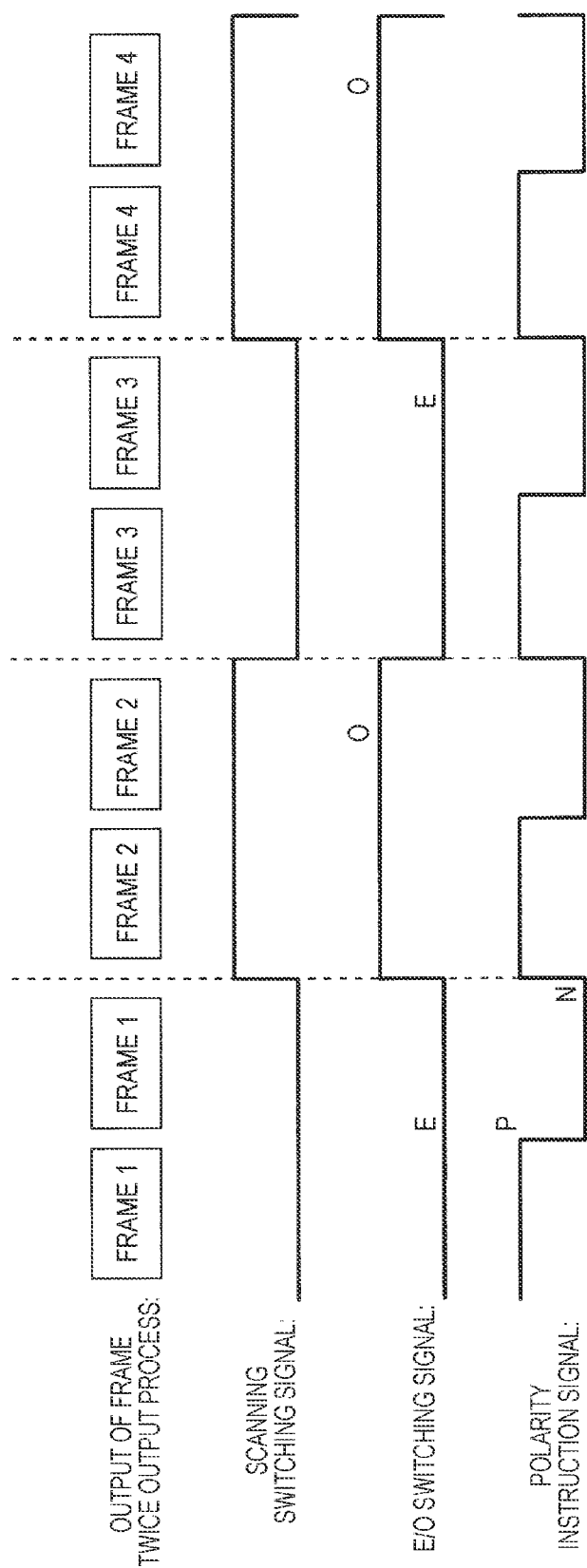
FIG. 24 is a diagram illustrating the relationship between the display timing (frame twice output) of each frame, and an E/O switching signal, a scanning switching signal, and a polarity instruction signal according to the first embodiment.

For confirmation, FIG. 24 shows the relationship between the display timing (the output of a frame twice output process) of each frame when driving is performed under the control of the scanning control unit 5, and the E/O switching signal, the scanning switching signal, and the polarity instruction signal.

For simplicity of illustration, FIG. 24 shows the relationship between each frame and each signal within four frame periods from the frame 1 to the frame 4.

As shown in FIG. 24, in this case, the E/O switching signal and the scanning switching signal instruct the switching between EVEN and ODD and a change in the sets of the lines that are simultaneously driven whenever scanning corresponding to one frame is performed two times for each of the same frame images of 'the frame 1 and the frame 1', 'the frame 2 and the frame 2', 'the frame 3 and the frame 3', and 'the frame 4 and the frame 4', respectively.

The polarity instruction signal instructs the switching between the positive polarity and the negative polarity with half the period of the E/O switching signal or the scanning switching signal.

1-9. Outline of First Embodiment

According to this embodiment, a method of adjusting the shift clock input to the gate driver 2 is used as a method of simultaneously driving a plurality of scanning lines for one horizontal line period to improve the frame rate. Therefore, it is possible to freely change the number of lines that are simultaneously driven or sets of the lines.

According to this embodiment, it is possible to perform the switching between the simultaneous scanning of a plurality of lines and general one line sequential scanning by switching the adjustment and the non-adjustment of the shift clock input to the gate driver 2. As such, since the switching between the simultaneous scanning of a plurality of lines and general one line sequential scanning is performed by switching the adjustment and the non-adjustment of the shift clock input, it is possible to configure the display panel with parts common to one line sequential scanning and the simultaneous driving of a plurality of lines. As a result, it is possible to reduce the manufacturing costs of a product.

In this embodiment, the mask unit including the mask signal generating circuit 2c and the mask circuit 2d is inserted into each gate line (scanning line). Therefore, when a plurality of lines are simultaneously driven by the adjustment of the shift clock, it is possible to prevent an unintended set of lines from being simultaneously driven. That is, in this way, it is possible to appropriately display images as the EVEN frame and the ODD frame.

In this embodiment, during the display of the ODD frame, when the line 0, which is the remaining line, is driven, the signal value of the line 0 of the input image is written. In this way, it is possible to prevent the remaining line from not being displayed.

2. Second Embodiment

2-1. Dynamic Switching of One Line Sequential Driving

Next, a second embodiment will be described.

The second embodiment relates to the dynamic switching between the display of the EVEN frame and the ODD frame by the two line simultaneous driving according to the first embodiment and general bipolar driving (one line sequential driving and the display of all lines of an input image).

According to the two line simultaneous driving according to the first embodiment, it is possible to improve the quality of a moving picture by improving the frame rate. For example, when an image in which the correlation between frame images, such as still pictures, is relatively low is input, a reduction in the resolution in the vertical direction is remarkable. As a result, a reduction in image quality is inevitable.

In the second embodiment, it is estimated whether an image is considered as a still picture (an image with high correlation between frames) or a moving picture (an image with low correlation between frames). Then, general bipolar driving is performed on the still picture and the two line simultaneous driving (the display of the EVEN frame and the ODD frame) according to the first embodiment is performed on the moving picture, on the basis of the evaluation result.

As such, since the switching between general driving and two line simultaneous driving is performed according to the type of image (the still picture and the moving picture), it is possible to prevent a reduction in the resolution of the still picture and improve the quality of a moving picture by improving the frame rate.

2-2. Structure of Display Device

Figure 25:
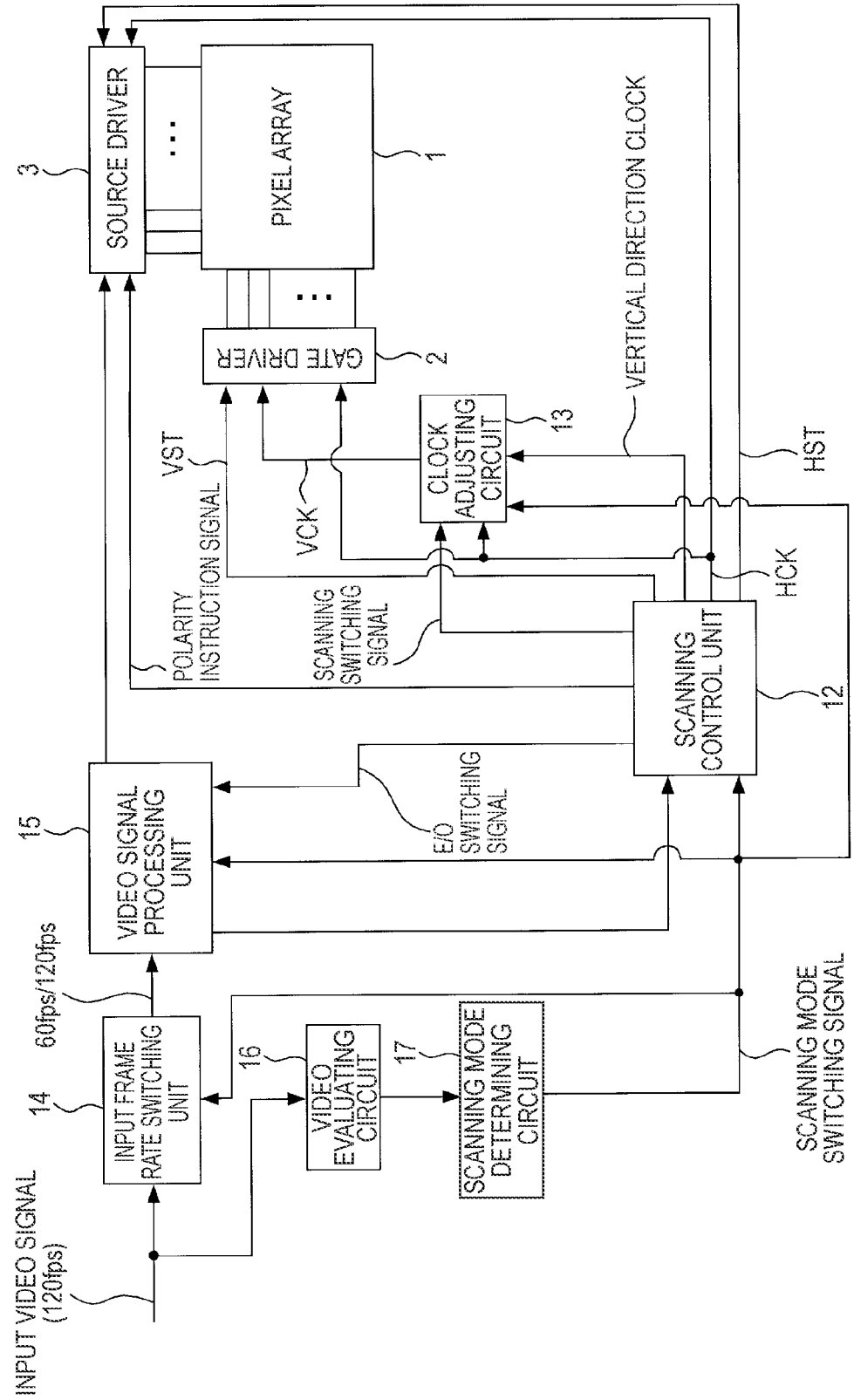
FIG. 25 is a diagram illustrating the internal structure of a display device according to a second embodiment.

FIG. 25 is a diagram illustrating the internal structure of a display device according to the second embodiment for implementing the driving method according to the second embodiment.

As shown in FIG. 25, the display device according to the second embodiment includes a pixel array 1, a gate driver 2, a source driver 3, a scanning control unit 12, a clock adjusting circuit 13, an input frame rate switching unit 14, a video signal processing unit 15, a video evaluating circuit 16, and a scanning mode determining circuit 17. The pixel array 1, the gate driver 2, and the source driver 3 are the same as those in the display device according to the first embodiment shown in FIG. 22.

For example, when the frame rate is 60 Hz during general bipolar driving, the switching between general bipolar driving and the driving according to the first embodiment means that the frame rate is switched between 60 Hz and 120 Hz (see FIGS. 17 and 21).

Therefore, the display device according to the second embodiment includes the input frame rate switching unit 14 that switches the frame rate of an input video signal.

In this case, the frame rate of the input video signal is set to a high value, and the input video signal with a frame rate of 120 fps is input, as shown in FIG. 25.

The display device according to the second embodiment includes the video evaluating circuit 16 and the scanning mode determining circuit 17 for evaluating whether an image is a still picture or a moving picture and determining the scanning mode on the basis of the evaluation result.

The video evaluating circuit 16 calculates an evaluation value indicating the correlation between a plurality of frame images for the input video signal and outputs the result to the scanning mode determining circuit 17. For example, the evaluation value may be calculated by calculating the difference between the frame images in each set of two adjacent frame images and summing the calculated differences of each set. The closer the calculated evaluation value is to '0', the higher the correlation becomes.

The scanning mode determining circuit 17 generates a scanning mode switching signal that instructs the switching between 'general scanning mode' and 'two line simultaneous scanning mode' on the basis of the evaluation value calculated by the video evaluating circuit 16 and outputs it. That is, if it is determined that an input image is a still picture on the basis of the evaluation value, the scanning mode determining circuit 17 outputs a signal indicating 'general scanning mode' as the scanning mode switching signal. If it is determined that an input image is a moving picture, the scanning mode determining circuit 17 outputs a signal indicating 'two line simultaneous scanning mode' as the scanning mode switching signal.

Specifically, as described above, when an evaluation value indicating that the correlation is the highest at '0' is input, a predetermined threshold value Th for determining whether an image is a still picture or a moving picture is set. When the evaluation value is equal to or less than the threshold value Th, the scanning mode determining circuit 17 outputs the scanning mode switching signal indicating the 'general scanning mode'. On the other hand, when the evaluation value is more than the threshold value Th, the scanning mode determining circuit 17 outputs the scanning mode switching signal indicating the 'two line simultaneous scanning mode'.

As shown in FIG. 25, the scanning mode switching signal output from the scanning mode determining circuit 17 is supplied to the scanning control unit 12, the input frame rate switching unit 14, the video signal processing unit 15, and the clock adjusting circuit 13.

The input frame rate switching unit 14 switches the frame rate of the input video signal on the basis of the scanning mode switching signal supplied from the scanning mode determining circuit 17.

Specifically, when the scanning mode switching signal indicates the 'general scanning mode', the input frame rate switching unit 14 calculates the average value of every two frame images adjacent to each other in the time axis direction in the input video signal, and obtains each frame image from each set of two frame images on the basis of the average value. That is, in this way, the frame rate of the input video signal is reduced by half (120 fps→60 fps).

The input frame rate switching unit 14 adjusts the synchronization signal according to the switching of the frame rate.

When the scanning mode switching signal indicates the 'two line simultaneous scanning mode', the input frame rate switching unit 14 outputs the input video signal without any change.

The input video signal is input the video signal processing unit 15 through the input frame rate switching unit 14.

Figure 26:
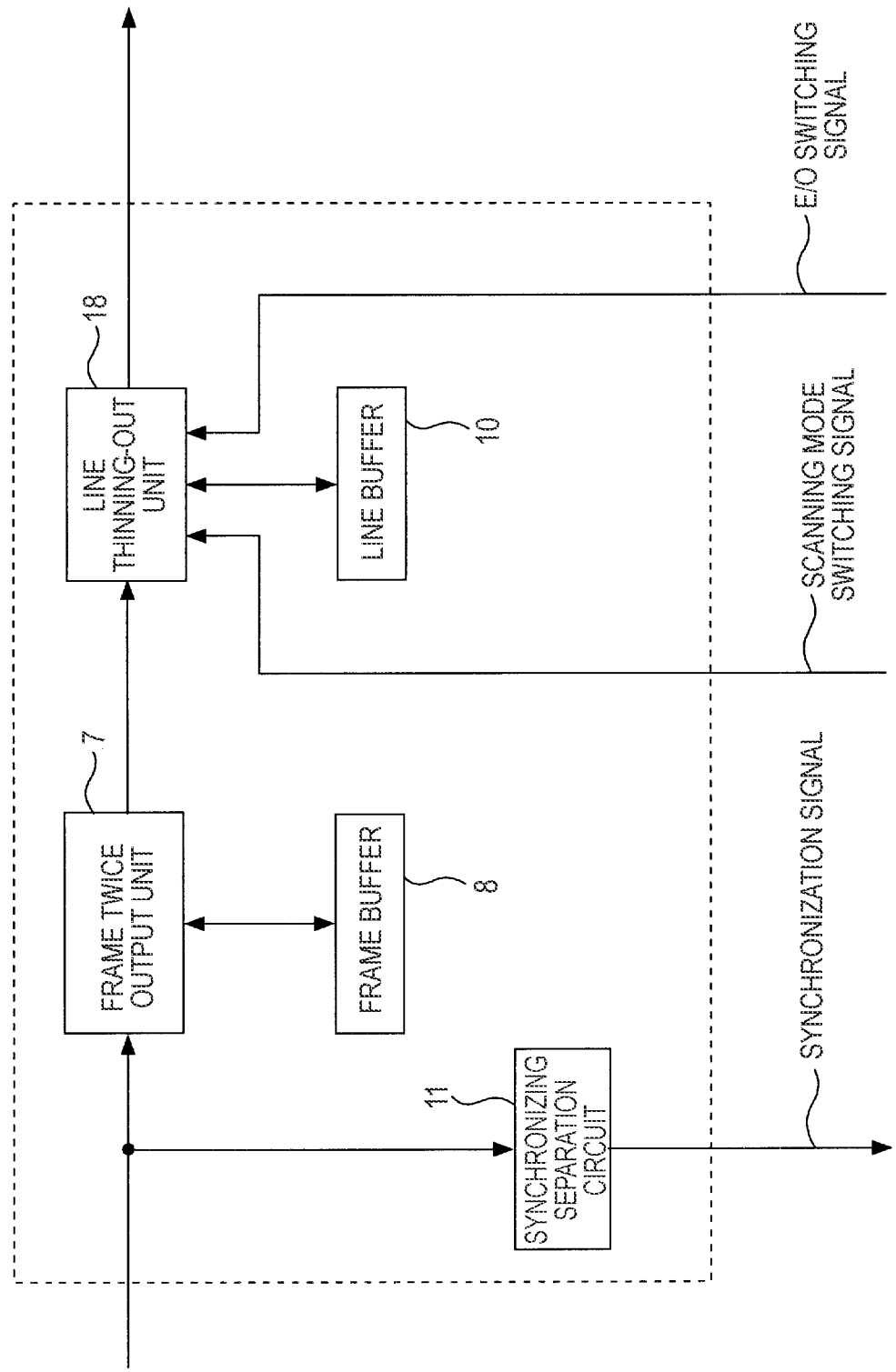
FIG. 26 is a diagram illustrating the internal structure of a video signal processing unit included in the display device according to the second embodiment.

FIG. 26 is a diagram illustrating the internal structure of the video signal processing unit 15.

As shown in FIG. 26, the video signal processing unit 15 includes the synchronizing separation circuit 11, the frame twice output unit 7, the frame buffer 8, and the line buffer 10 that are described in the first embodiment (FIG. 23). In this case, a line thinning-out unit 18 is provided instead of the line thinning-out unit 9 included in the video signal processing unit 6 shown in FIG. 23.

As shown in FIG. 26, the output from the frame twice output unit 7 and the scanning mode switching signal are input to the line thinning-out unit 18.

The line thinning-out unit 18 is the same as the line thinning-out unit 9 shown in FIG. 23 in that it thins out the EVEN lines and the ODD lines (+ the line 0) using the line buffer 10 on the basis of the E/O switching signal, but is different from the line thinning-out unit 9 in that it performs the thinning-out of the lines and the switching of a general output on the basis of the scanning mode switching signal from the scanning mode determining circuit 17 shown in FIG. 25. That is, when the scanning mode switching signal indicates the 'two line simultaneous scanning mode', the line thinning-out unit 18 thins out the EVEN lines and the ODD lines (+ the line 0) on the basis of the E/O switching signal.

On the other hand, when the scanning mode switching signal indicates the 'general scanning mode', the line thinning-out unit 18 outputs the input frame image as a general output without any change.

Returning to FIG. 25, when the scanning mode switching signal from the scanning mode determining circuit 17 indicates 'two line simultaneous scanning mode', the scanning control unit 12 performs the same operation as that of the scanning control unit 5 according to the first embodiment. That is, the scanning control unit 12 is different from the scanning control unit 5 according to the first embodiment in that it performs an operation corresponding to when the scanning mode switching signal indicates the 'general scanning mode'.

When the frame rate is changed according to the switching between the 'two line simultaneous scanning mode' and the 'general scanning mode', the periods of the vertical direction start instruction signal VST, the polarity instruction signal, and the E/O switching signal need to be changed between the modes.

However, as described above, in this case, when the frame rate is adjusted, the frame rate switching unit 14 adjusts the synchronization signal. When the frame rate switching unit 14 performs the same signal generating process as that of the scanning control unit 5 according to the first embodiment according to the frame period based on the adjusted synchronization signal, the period is changed according to the switching between the 'two line simultaneous scanning mode' and the 'general scanning mode' of each signal.

That is, in this case, the scanning control unit 12 may generate and output a signal in which a start pulse is output with half the frame period (one period of the vertical synchronization signal) based on the synchronization signal in response to the vertical direction start instruction signal VST, and may generate and output a signal that instructs to alternately change the positive polarity and the negative polarity with half the frame period based on the synchronization signal in response to the polarity instruction signal.

As the E/O switching signal, a signal is generated and output which instructs to alternately change EVEN and ODD with the frame period based on the synchronization signal.

In the 'two line simultaneous scanning mode' and the 'general scanning mode', when the number of scanning operations corresponding to one frame is changed, the output aspect of the start pulse by the horizontal direction start instruction signal HST needs to be changed.

Specifically, in the 'two line simultaneous scanning mode', if the number of pixels in the vertical direction in the pixel array 1 is 1104, a scanning operation corresponding to one frame, which is performed two times on the same frame image, is performed 552 (EVEN frame) times or 553 (ODD frame) times by the bipolar driving. In the 'general scanning mode', a scanning operation corresponding to one frame, which is performed two times on the same frame image, is performed 1104 times.

In this case, the blank period shown in FIG. 11 is set in the period for which 'scanning corresponding to one frame' needs to be performed. Therefore, in the 'two line simultaneous scanning mode', the start pulse of the horizontal direction start instruction signal HST is continuously output 552 times or 553 times, is not output during the blank period, and is continuously output 552 times or 553 times. These operations are repeatedly performed. On the other hand, in the 'general scanning mode', the start pulse of the horizontal direction start instruction signal HST is continuously output 1104 times, is not output during the blank period, and is continuously output 1104 times. These operations are repeatedly performed.

In this case, the scanning control unit 12 switches the output aspect of the horizontal direction start instruction signal HST according to whether the 'two line simultaneous scanning mode' or the 'general scanning mode' is instructed.

In FIG. 25, when the scanning mode switching signal indicates the 'two line simultaneous scanning mode', the clock adjusting circuit 13 adds the adjustment pulse to the vertical direction clock according to the type of instruction for the sets of the lines that are simultaneously driven, which is indicated by the scanning switching signal, and outputs the vertical direction clock VCK, similar to the clock adjusting circuit 4 according to the first embodiment.

On the other hand, when the scanning mode switching signal indicates the 'general scanning mode', the clock adjusting circuit 13 does not add the adjustment pulse to the vertical direction clock, but outputs the vertical direction clock VCK to the gate driver 2.

3. Third Embodiment 3-1. Application to 3D System

Next, a third embodiment will be described.

In the third embodiment, a technique for reducing the scanning time by two line simultaneous driving is applied to a 3D system (3D display system).

Figure 27:
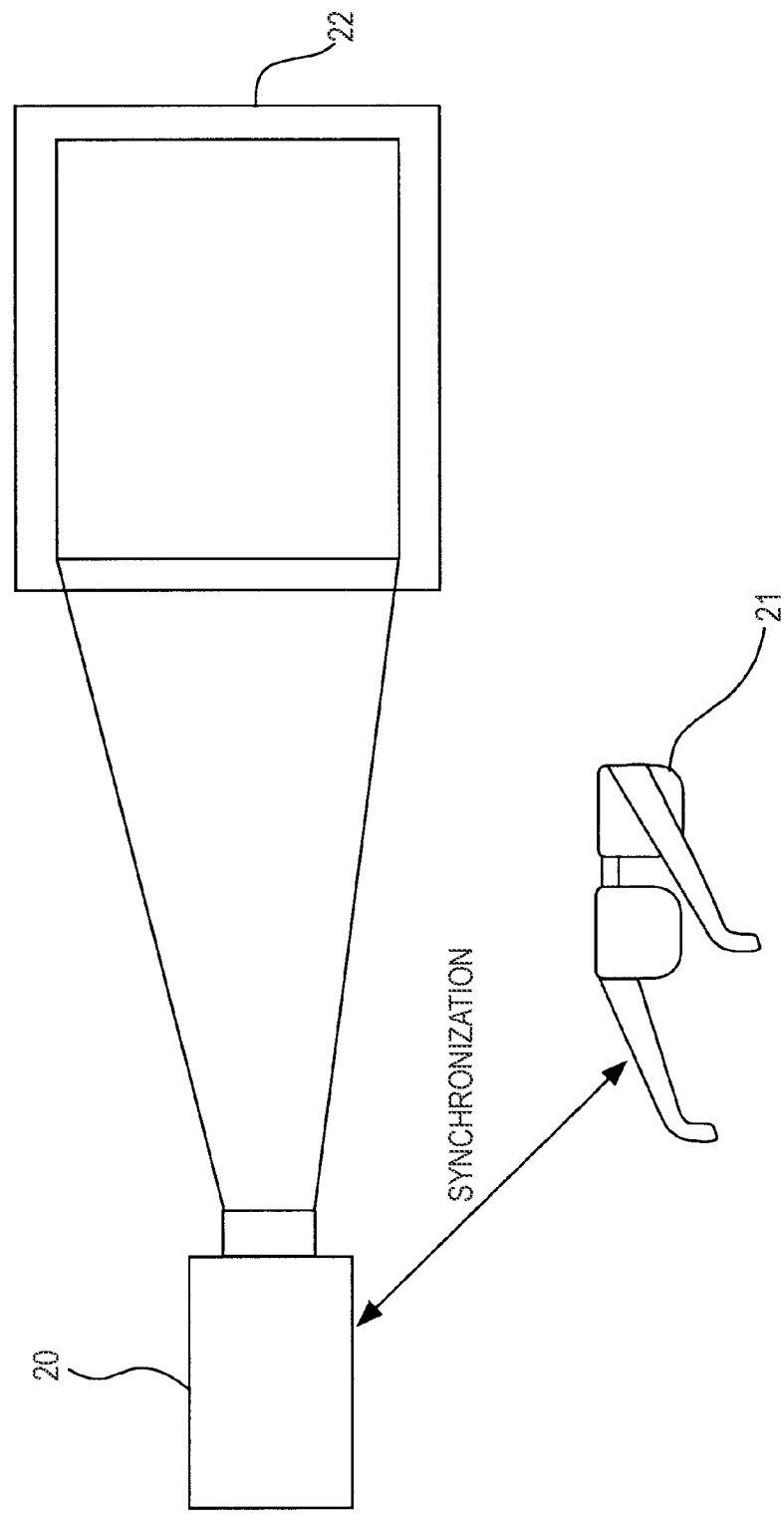
FIG. 27 is a diagram illustrating the outline of a 3D system according to a third embodiment.

FIG. 27 is a diagram illustrating the outline of a 3D system according to the third embodiment.

In FIG. 27, the 3D system according to the third embodiment includes at least a display device 20 and active glasses 21. The display device 20 is a projector. In the 3D system, a screen 22 onto which a projection image formed by the display device 20 is projected is used.

Figure 29:
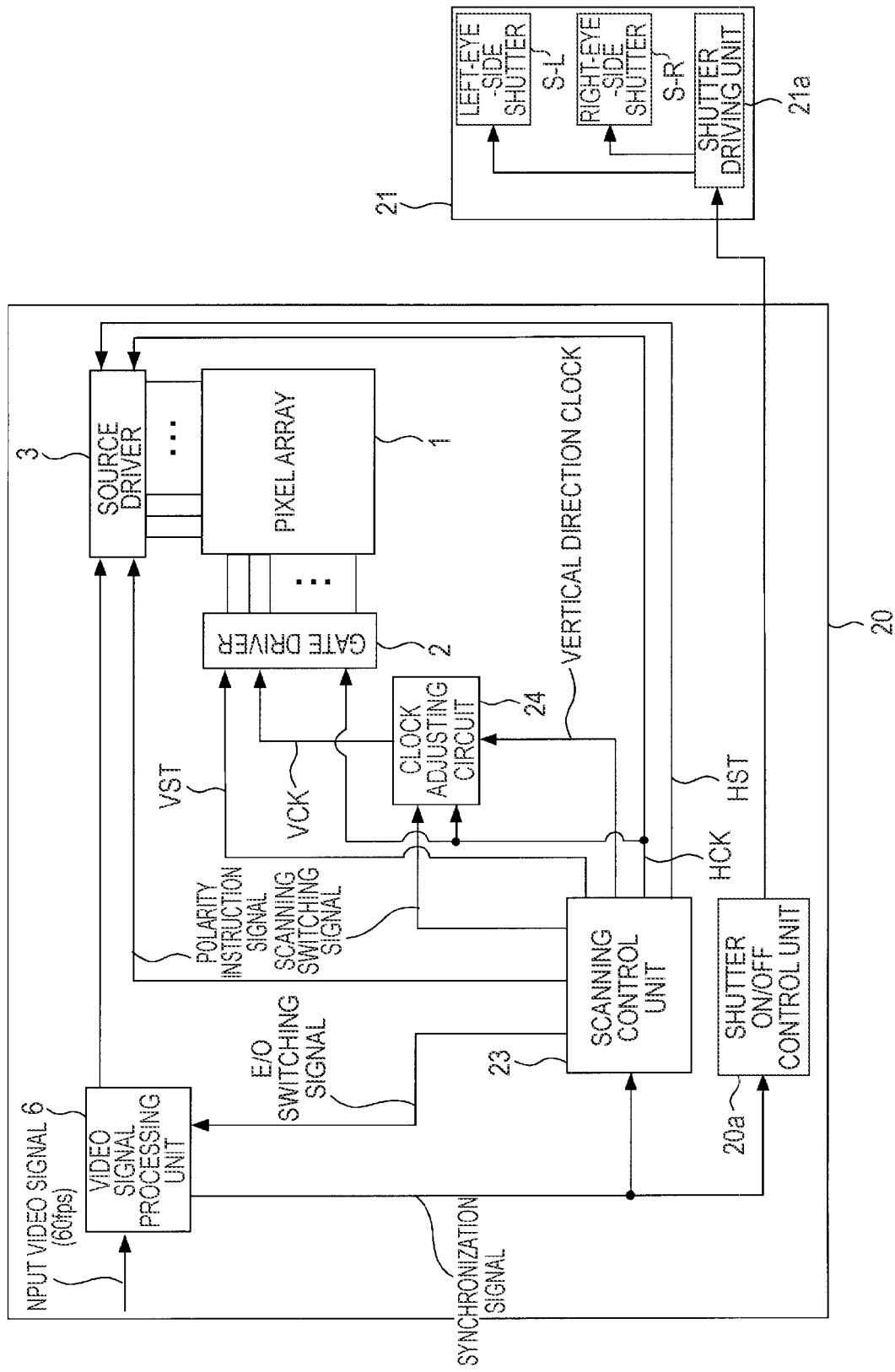
FIG. 29 is a diagram illustrating the structure of a display device according to the third embodiment.

In the active glasses 21, shutters (a right-eye-side shutter S-R and a left-eye-side shutter S-L: see FIG. 29) are provided in a lens portion for the right eye and a lens portion for the left eye. The right-eye-side shutter S-R and the left-eye-side shutter S-L are turned on or off at the timing indicated by a shutter control signal from the display device 20.

Figure 28:
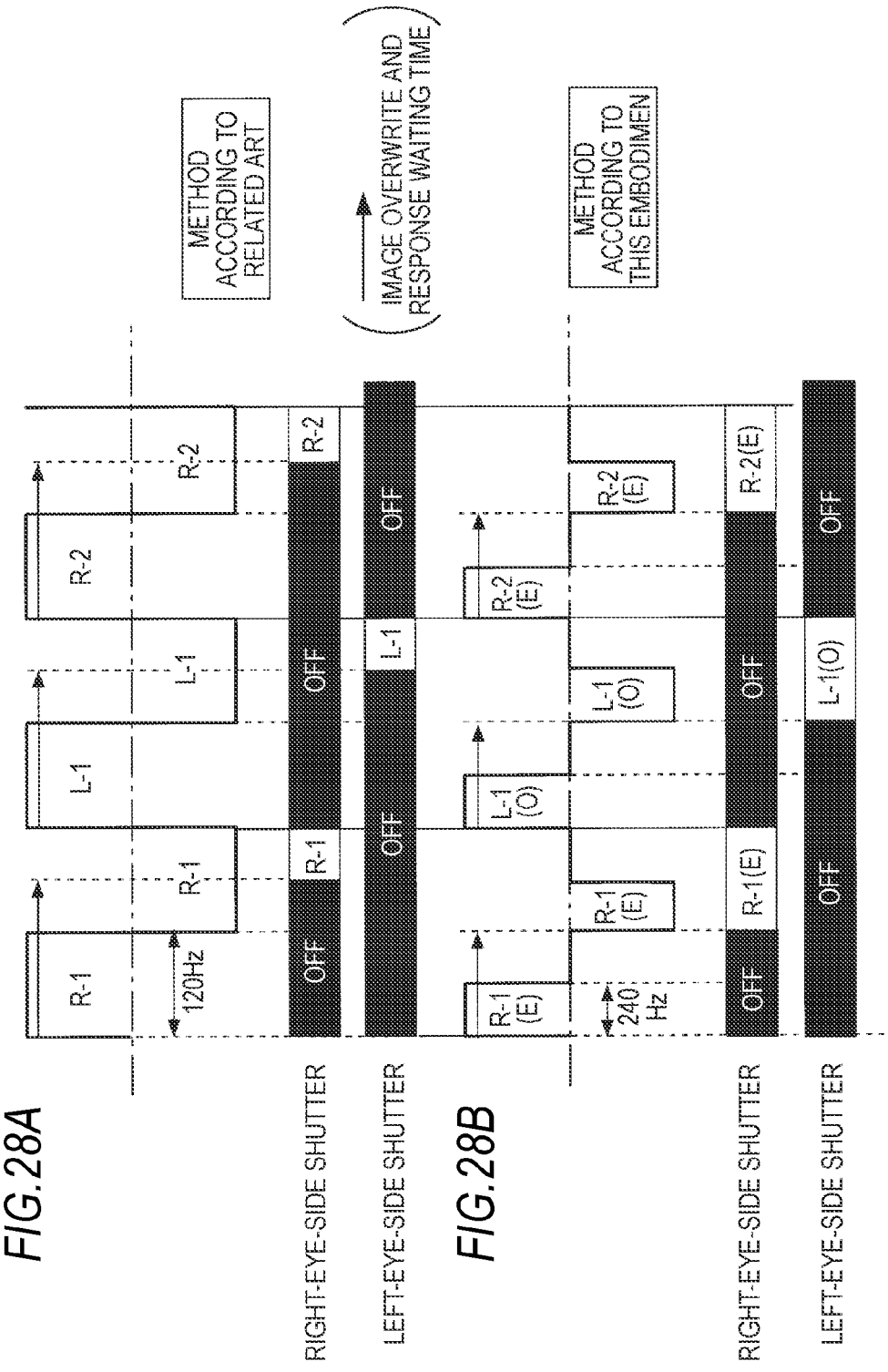
FIGS. 28A and 28B are diagrams illustrating a display method of a 3D system according to the related art to which general bipolar driving is applied and a display method of a 3D system according to the third embodiment to which two line simultaneous driving is applied.

FIGS. 28A and 28B are diagrams illustrating a display method of the 3D system. FIG. 28A shows the display method according to the related art to which the general bipolar driving method is applied, and FIG. 28B shows a display method according to the third embodiment when the two line simultaneous driving method according to this embodiment is applied.

In the 3D system shown in FIG. 27, the display device 20 alternately displays a frame image (R) for the right eye and a frame image (L) for the left eye as a 3D image. In this case, in the active glasses 21, when the frame image for the right eye is displayed, the right-eye-side shutter S-R is turned on. When the frame image for the left eye is displayed, the left-eye-side shutter S-L is turned on. In this way, a person who wears the active glasses 21 views a 3D image projected onto the screen 22.

On this premise, the method according to the related art shown in FIG. 28A will be described below.

In this case, the frame rate is 60 fps.

In the general bipolar driving method according to the related art, when the frame image R for the right eye and the frame image L for the left eye are alternately displayed, as shown in FIG. 28A, a first frame image R-1 for the right eye is sequentially written to each line with the positive and negative polarities. Similarly, a first frame image L-1 for the left eye is sequentially written to each line with the positive and negative polarities. Thereafter, similarly, a second frame image R-2 for the right eye, a second frame image L-2 for the left eye, . . . are sequentially written to each line with the positive and negative polarities.

The right-eye-side shutter S-R and the left-eye-side shutter S-L are turned on or off as shown in FIG. 28A. Specifically, the right-eye-side shutter S-R is turned on at a predetermined time after one scanning operation (that is, in this case, the scanning of the positive polarity) for one frame image R for the right eye is completed, and is turned off at the end timing of the display period of the frame image R for the right eye (in this case, the scanning end timing of the negative polarity: the scanning start timing of the next frame image L for the left eye to be displayed).

Similarly, the left-eye-side shutter S-L is turned on at a predetermined time after one scanning operation for one frame image L for the left eye is completed, and is turned off at the end timing of the display period of the frame image L for the left eye.

When scanning is performed by an active matrix method, a display image is gradually overwritten from the edge of the screen. Therefore, it is difficult to turn on or off the shutter during the overwrite period. As in this embodiment, when the display panel is a liquid crystal display panel, the response time of liquid crystal (in this case, about 2 msec) needs to be considered.

As a result, the shutter needs to be turned on after an image overwrite and liquid crystal response waiting time represented by a solid arrow in FIG. 28A has elapsed from the scanning start timing of a target image.

In this case, in the general bipolar driving method performing one line sequential scanning, the time required to scan the same frame image at a time is about 4.1 msec corresponding to 120 Hz shown in FIG. 28A. In this case, as described above, since the liquid crystal response time is about 2 msec, the shutter can be turned on for about 2.2 msec (=8.3 msec−(4.1 msec+2 msec) in the display period (about 8.3 msec) of the same frame image.

In the 3D system according to the related art, as described above, since the shutter-on period is relatively short, brightness is reduced.

In the third embodiment, the two line simultaneous driving method is used to reduce the time required to scan one frame, reduce the image overwrite period, and expand the shutter-on period.

As shown in FIG. 28B, in this case, the two line simultaneous driving method alternately displays the EVEN frame and the ODD frame to prevent a reduction in the resolution in the vertical direction.

Specifically, in this case, for the first frame image R-1 for the right eye, the positive and negative image signals are written to the EVEN frame. For the first frame image L-1 for the left eye, the positive and negative image signals are written to the ODD frame. Thereafter, similarly, whenever an input image is changed, the EVEN frame and the ODD frame are switched to write the positive and negative image signals to each frame.

In this case, it is noted that, in the third embodiment, the frame rate of an input image is not changed from the related art.

In the third embodiment, as shown in FIG. 28B, after scanning corresponding to one frame is performed, the blank period having the same length as the scanning period is set. That is, the time required to scan one frame is reduced by the two line simultaneous driving method using the EVEN frame and the ODD frame, but a total frame period of 60 Hz is the same as that in the related art by the insertion of the blank period.

For confirmation, in order to expand the shutter-on period, the display period of the same frame image is set to be equal to that of the related art.

In this case, the scanning time is reduced by the two line simultaneous driving method, which results in a reduction in the image overwrite period. Therefore, it is possible to turn on the shutter rapidly. In this case, as described above, since the display period of the same frame image is equal to that in the related art, it is possible to expand the shutter-on period, as compared to the related art.

Specifically, in this case, since the image overwrite period is half (about 2.1 msec) of that according to the related art, the shutter-on period is 4.1 msec (=8.3 msec−(2.1 msec+2 msec). That is, it is possible to ensure the shutter-on period that is about two times longer than the shutter-on period (=2.2 msec) according to the related art. As a result, it is possible to achieve bright 3D display.

3-2. Structure of Display Device

FIG. 29 is a diagram illustrating the structure of a display device 20 included in the 3D system according to the third embodiment.

FIG. 29 shows the internal structure of the display device 20 and the internal structure of the active glasses 21.

As described above, the display device 20 according to this embodiment is a projector apparatus. Therefore, actually, for example, a light source or an optical system that outputs light emitted from the light source through the pixel array 1 and a lens system is provided. However, since the components are not directly related to this embodiment of the invention, a description thereof is omitted.

First, the display device 20 will be described.

The display device 20 includes a shutter on/off control unit 21a that generates a shutter control signal for indicating the on/off timing of the right-eye-side shutter S-R and the left-eye-side shutter S-L provided in the active glasses 21, in addition to the structure of the display device (FIG. 22) according to the first embodiment.

In this case, the display device 20 differs from the display device shown in FIG. 22 in that the frame rate of the input video signal is reduced by half (120 fps→60 fps).

In addition, the display device 20 differs from the display device shown in FIG. 22 in that a scanning control unit 23 is provided instead of the scanning control unit 5 and a clock adjusting circuit 24 is provided as the clock adjusting circuit 4.

The scanning control unit 23 is the same as the scanning control unit 5 in that it generates the timing signals (the vertical direction clock, VST, HCK, and HST), the polarity instruction signal, the E/O switching signal, and the scanning switching signal on the basis of the synchronization signal input from the video signal processing unit 6.

As can be seen from FIG. 28B, in this case, the polarity instruction signal may instruct to alternately change the positive polarity and the negative polarity with half the frame period (the frame period based on the synchronization signal). Therefore, the scanning control unit 23 generates and outputs as the polarity switching signal a signal that instructs to alternately change the positive polarity and the negative polarity with half the frame period based on the synchronization signal.

As shown in FIG. 28B, in this case, the E/O switching signal may instruct to alternately change EVEN and ODD with the frame period. Therefore, the scanning control unit 23 generates and outputs as the E/O switching signal a signal that instructs to alternately change EVEN and ODD with the frame period based on the synchronization signal.

The scanning switching signal may instruct to change the sets of the lines that are simultaneously driven with the frame period. Therefore, the scanning control unit 23 generates and outputs as the scanning switching signal a signal that instructs to change the sets of the lines that are simultaneously driven with the frame period based on the synchronization signal.

As shown in FIG. 28B, in this case, the driving of each scanning line starts with half the frame period. Therefore, the scanning control unit 23 gives the start pulse with half the frame period based on the synchronization signal to generate the vertical direction start instruction signal VST, and outputs it.

Figure 30:
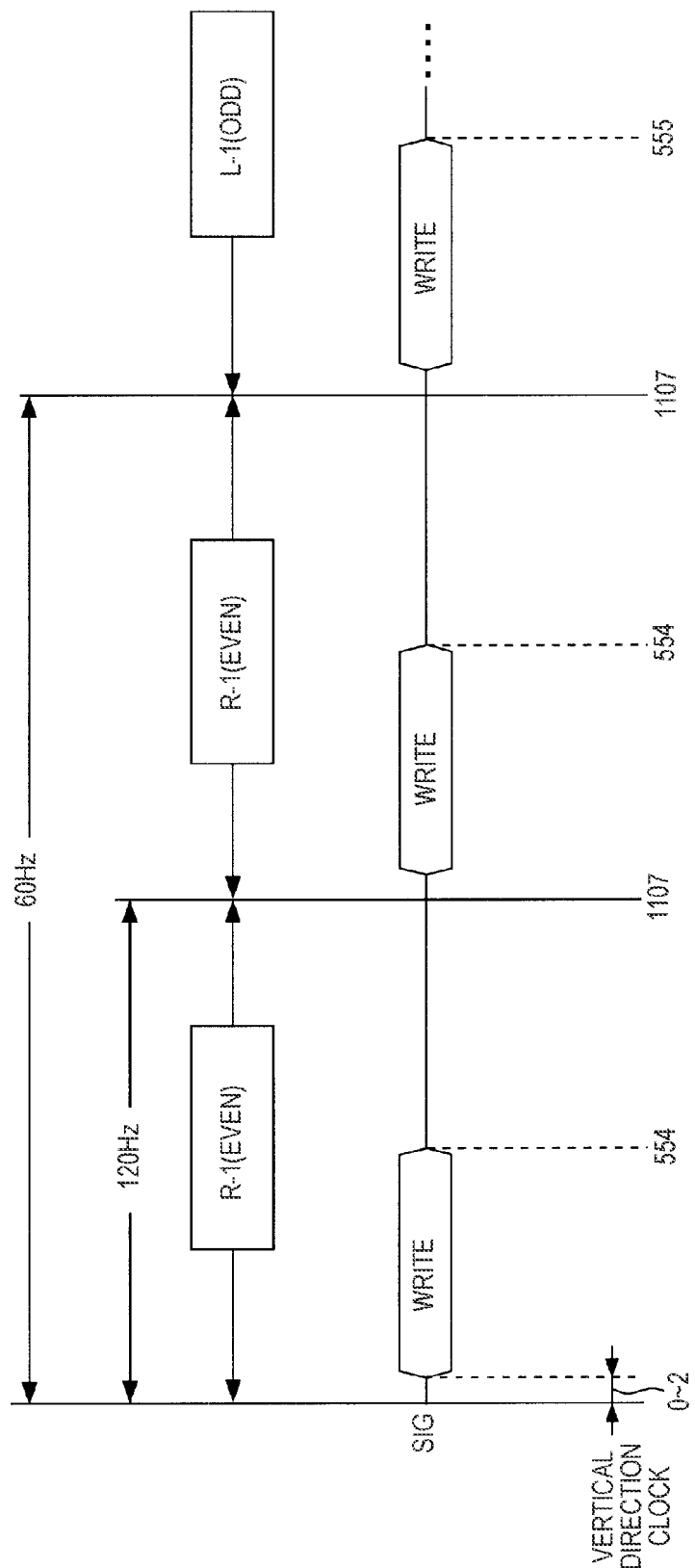
FIG. 30 is a diagram illustrating the correspondence among a display frame, a vertical direction clock, and an image write period (SIG) when the display method according to the third embodiment is used.

For confirmation, FIG. 30 shows the correspondence among a display frame, the vertical direction clock, and the image write period (SIG) when the display method shown in FIG. 28B is used.

As shown in FIG. 30, the period from a 0th clock to a 2nd clock of the vertical direction clock is set as the blank period.

In this case, during the display of the EVEN frame (when the sets shown in FIG. 4A are instructed), the period from the 3rd clock to the 554th clock is the write period. During the display of the ODD frame (when the sets shown in FIG. 4B are instructed), the period from 3rd clock to the 555th clock is the write period.

That is, since the period from the end timing of the write period to the 1107th clock of the vertical direction clock is the blank period, the blank period with the same length as the write period is given.

As can be seen from FIG. 30, when the scanning switching signal supplied from the scanning control unit 23 indicates the two line simultaneous driving by the sets shown in FIG. 4A in which there is no remaining line, the clock adjusting circuit 24 shown in FIG. 29 does not add the adjustment pulse to three clocks from the head of each period (that is, half the frame period based on the synchronization signal) corresponding to 1108 clocks of the vertical direction clock that is output from the scanning control unit 23, but adds the adjustment pulse to the 3rd clock (4th clock) to the 554th clock (555th clock).

When the scanning switching signal indicates the two line simultaneous driving by the sets shown in FIG. 4B in which there is the remaining line, similarly, the clock adjusting circuit 24 does not add the adjustment pulse to three clocks from the head of each period corresponding to 1108 clocks of the vertical direction clock, but adds the adjustment pulse to the 3rd clock (4th clock) to the 555th clock (556th clock).

During the blank period, no signal value is written to the signal line. Therefore, the start pulse in the horizontal direction does not need to be given during the blank period. That is, in order to meet the requirements, the scanning control unit 23 shown in FIG. 29 does not output the start pulse during the second half of the period (that is, half the frame period based on the synchronization signal) from the 0th clock to the 1107th clock of the vertical direction clock to generate the horizontal direction start instruction signal, and outputs it.

In FIG. 29, the shutter on/off control unit 20a generates a shutter control signal for turning on or off the right-eye-side shutter S-R and the left-eye-side shutter S-L at the timing shown in FIG. 28B on the basis of the synchronization signal from the video signal processing unit 6, and outputs the shutter control signal to the active glasses 21 arranged outside the display device 20.

Specifically, as the control signal for the right-eye-side shutter S-R, a signal is generated which instructs to turn on the right-eye-side shutter S-R after a predetermined time that is set as the image overwrite and response waiting time shown in FIG. 28B has elapsed from the start timing of the frame period (referred to as a display period for the right eye) for which the frame image R for the right eye needs to be displayed, and instructs to turn off the right-eye-side shutter S-R at the end timing of the display period for the right eye. In addition, as the control signal for the left-eye-side shutter S-L, a signal is generated which instructs to turn on the left-eye-side shutter S-L after a predetermined time that is set as the image overwrite and response waiting time has elapsed from the start timing of the frame period (referred to as a display period for the left eye) for which the frame image L for the left eye needs to be displayed, and instructs to turn off the left-eye-side shutter S-L at the end timing of the display period for the left eye.

FIG. 29 shows an example in which the shutter control signal is supplied to the active glasses 21 by wire. However, the shutter control signal may be wirelessly transmitted to the active glasses 21.

In FIG. 29, the active glasses 21 include the shutter driving unit 21a in addition to the right-eye-side shutter S-R and the left-eye-side shutter S-L.

The shutter driving unit 21a turns on or off the right-eye-side shutter S-R and the left-eye-side shutter S-L on the basis of the shutter control signal supplied from the shutter on/off control unit 20a in the display device 20.

4. Fourth Embodiment

4-1. Dynamic Switching to One Line Sequential Driving in 3D System

A fourth embodiment relates to the switching between the 3D display method by one line sequential driving according to the related art and the 3D display method according to the third embodiment to which two line simultaneous driving is applied in the 3D system according to the third embodiment. That is, the fourth embodiment relates to the dynamic switching between the display method shown in FIG. 28A and the display method shown in FIG. 28B.

In this case, switching to one line sequential driving is performed in order to prevent the resolution from being reduced when a still picture is input. That is, in this case, similar to the second embodiment, it is evaluated whether an input image is a still picture or a moving picture, and the switching between one line sequential driving and two line sequentially driving is performed on the basis of the evaluation result.

In this way, it is possible to prevent a reduction in resolution when a still picture is input and improve the quality of a moving picture by the display of the EVEN frame and the ODD frame (and prevent a reduction in resolution) when a moving picture is input.

4-2. Structure of Display Device

Figure 31:
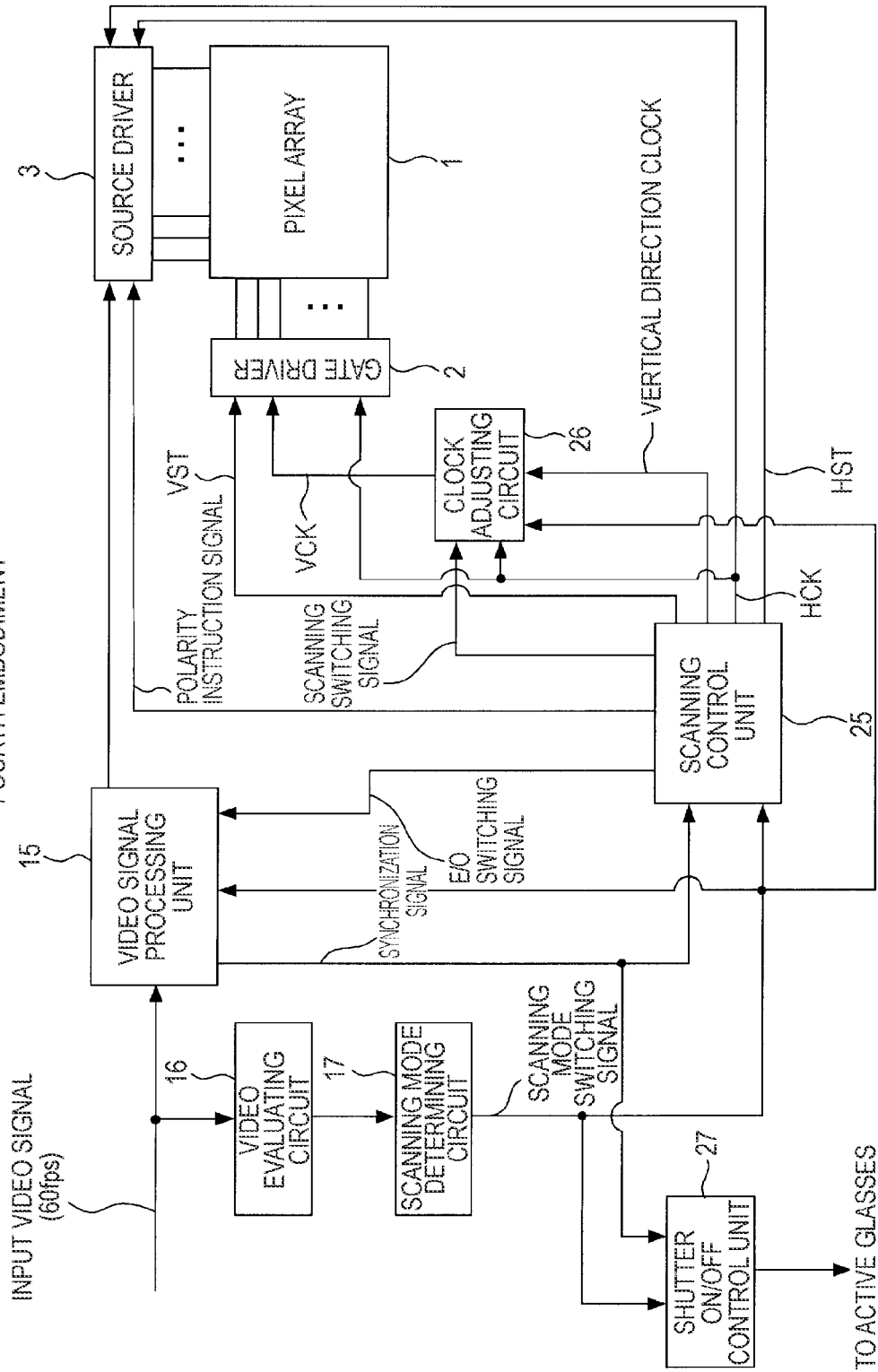
FIG. 31 is a diagram illustrating the internal structure of a display device according to a fourth embodiment.

FIG. 31 is a diagram illustrating the internal structure of a display device according to the fourth embodiment for implementing the display method according to the fourth embodiment.

The display device according to the fourth embodiment differs from the display device 20 according to the third embodiment in that it additionally includes the video evaluating circuit 16 and the scanning mode determining circuit 17 according to the second embodiment.

The video signal processing unit 15 which is the same as that according to the second embodiment (FIGS. 25 and 26) is provided instead of the video signal processing unit 6.

In addition, a scanning control unit 25 is provided as the scanning control unit 23, a clock adjusting circuit 26 is provided instead of the clock adjusting circuit 24, and a shutter on/off control unit 27 is provided instead of the shutter on/off control unit 20a.

In this case, the scanning mode switching signal output from the scanning mode determining circuit 17 is supplied to the scanning control unit 25, the video signal processing unit 15, the clock adjusting circuit 26, and the shutter on/off control unit 27.

When the scanning mode switching signal indicates the 'two line simultaneous scanning mode', the scanning control unit 25 performs the same operation as the scanning control unit 23 according to the third embodiment. That is, the scanning control unit 25 differs from the scanning control unit 23 in that it performs an operation corresponding to when the scanning mode switching signal indicates the 'general scanning mode'.

First, as can be seen from the comparison between FIG. 28A and FIG. 28B, even when the 'general scanning mode' is instructed, the scanning control unit 25 generates the same polarity instruction signal, E/O switching signal, and scanning switching signal (instruction to switch the lines simultaneously driven) as those when the 'two line simultaneous scanning mode' is instructed.

The scanning control unit 25 may generate the same vertical direction start instruction signal VST when the 'general scanning mode' is instructed and when the 'two line simultaneous scanning mode' is instructed.

In the 'general scanning mode', in this embodiment, 1104 horizontal lines are scanned during each scanning period of the positive and negative polarities. Therefore, each write period shown in FIG. 30 is expanded to the 1106th clock. That is, in this case, only the write period is expanded, and the driving start timing of the scanning line (the output timing of the start pulse in the vertical direction) may appear with half the frame period, similar to the 'two line simultaneous scanning mode'. As can be understood from the above, the same vertical direction start instruction signal VST is generated and output in the 'general scanning mode' and the 'two line simultaneous scanning mode'.

For the horizontal direction start instruction signal HST, as described above, since each write period shown in FIG. 30 is expanded to the 1106th clock, in the 'general scanning mode', it is necessary to generate signals different from those in the 'two line simultaneous scanning mode'.

Specifically, when the 'general scanning mode' is instructed, the scanning control unit 25 generates the horizontal direction start instruction signal HST in which the start pulse is output at the start timing of each horizontal direction line period from the 3rd clock to the 1106th clock of the vertical direction clock, and outputs it.

When the scanning mode switching signal indicates the 'two line simultaneous scanning mode', the clock adjusting circuit 26 shown in FIG. 31 adds the adjustment pulse to the input vertical direction clock by the same method as that of the clock adjusting circuit 24 according to the third embodiment on the basis of the scanning switching signal, and outputs the vertical direction clock VCK.

When the scanning mode switching signal indicates the 'general scanning mode', the clock adjusting circuit 26 outputs the vertical direction clock VCK without adding the adjustment pulse to the input vertical direction clock.

In FIG. 31, when the scanning mode switching signal indicates the 'two line simultaneous scanning mode', the shutter on/off control unit 27 generates and outputs the shutter control signal by the same operation as that of the shutter on/off control unit 20a according to the third embodiment.

When the scanning mode switching signal indicates the 'general scanning mode', the shutter on/off control unit 27 generates and outputs the shutter control signal using the information of an image overwrite and response waiting time in the 'general scanning mode', which is different from the image overwrite and response waiting time in the 'two line simultaneous scanning mode'. Specifically, in the 'general scanning mode', as the control signal for the right-eye-side shutter S-R, a signal is generated which instructs to turn on the right-eye-side shutter S-R after a predetermined time that is set as the image overwrite and response waiting time in the 'general scanning mode' has elapsed from the start timing of the display period for the right eye, and instructs to turn off the right-eye-side shutter S-R at the end timing of the display period for the right eye. In addition, as the control signal for the left-eye-side shutter S-L, a signal is generated which instructs to turn on the left-eye-side shutter S-L after a predetermined time that is set as the image overwrite and response waiting time in the 'general scanning mode' has elapsed from the start timing of the display period for the left eye, and instructs to turn off the left-eye-side shutter S-L at the end timing of the display period for the left eye.

5. Fifth Embodiment

5-1. Application to Single Panel Field Sequential Driving

In a fifth embodiment, the two line simultaneous driving method is applied to implement a single panel field sequential driving method.

Figure 32:
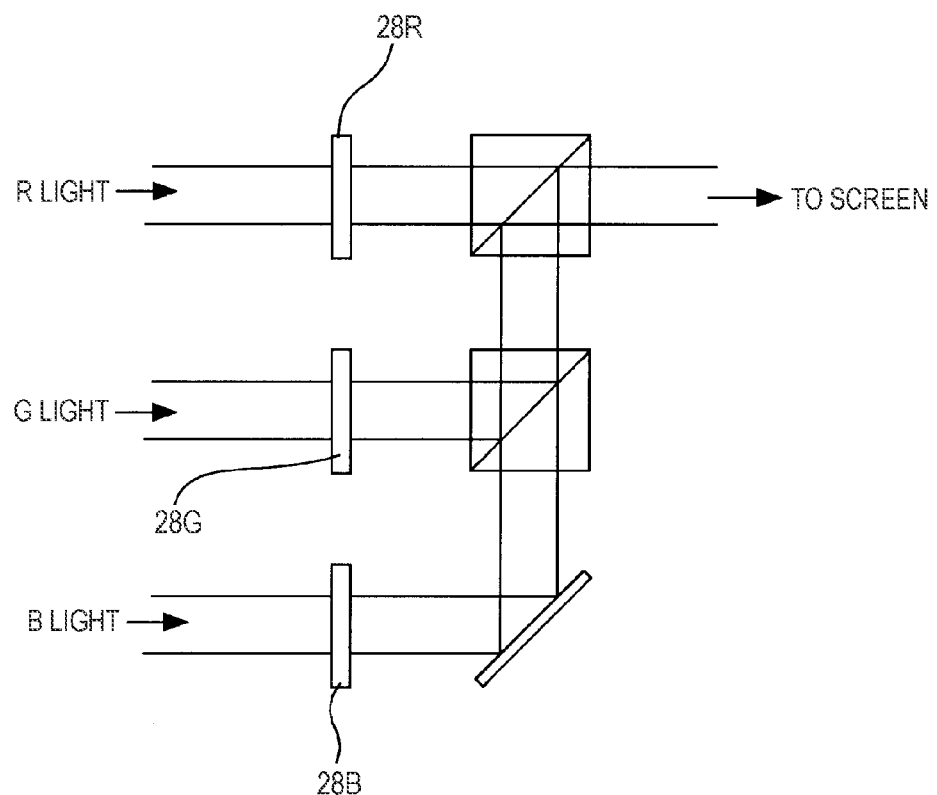
FIG. 32 is a diagram illustrating an example of the structure of an optical system of a three-panel-type projector that displays (projects) a color image.

FIG. 32 shows a projector that projects a color image. The projector includes an optical system that emits R (Red) light, G (Green) light, and B (Blue) light, an R liquid crystal panel 28R on which the R light is incident, a G liquid crystal panel 28G on which the G light is incident, and a B liquid crystal panel 28B on which the B light is incident (a so-called three-panel type).

As shown in FIG. 32, the R light passing through the R liquid crystal panel 28R, the G light passing through the G liquid crystal panel 28G, and the B light passing through the B liquid crystal panel 28B are composed and the composed light is projected onto the screen through a lens system (not shown).

Figure 33:
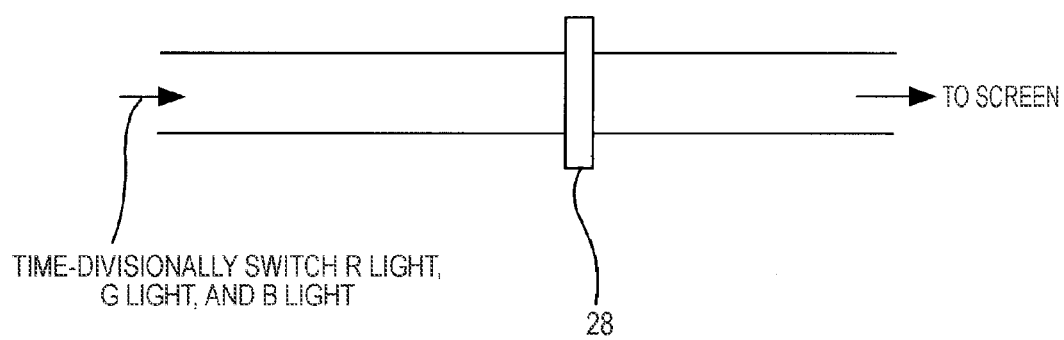
FIG. 33 is a diagram illustrating an example of the structure of an optical system that displays (projects) a color image using single panel field sequential driving.

In contrast, in the single panel field sequential driving method, the liquid crystal panels 28 are not individually provided for the R light, the G light, and the B light, but one liquid crystal panel 28 common to the R light, the G light, and the B light is provided as shown in FIG. 33. In the single panel field sequential driving method, the R light, the G light, and the B light are time-divisionally input to the common liquid crystal panel 28. The liquid crystal panel 28 time-divisionally displays R, G, and B images such that the R image is displayed when the R light is incident, the G image is displayed when the G light is incident, and the B image is displayed when the B light is incident. In this way, it is possible to project a color image onto the screen.

For confirmation, the liquid crystal panel 28 corresponds to the display panel including the pixel array 1, the gate driver 2, and the source driver 3 in the structure shown in FIG. 22.

The problem of the field sequential driving is color break-up. In order to prevent the color break-up, it is necessary to switch the R image, the G image, and the B image at least 180 Hz.

In this case, when bipolar driving is performed, it is necessary to perform scanning corresponding to one frame on each of the R, G, and B frame images two times at 360 Hz in order to switch the R image, the G image, and the B image at 180 Hz. However, it is very difficult to perform general one line sequential scanning to achieve the switching between the R, G, and B images.

In the fifth embodiment, when field sequential driving is performed, two line simultaneous driving is performed to reduce the scanning time and prevent the occurrence of the color break-up.

Figure 34:
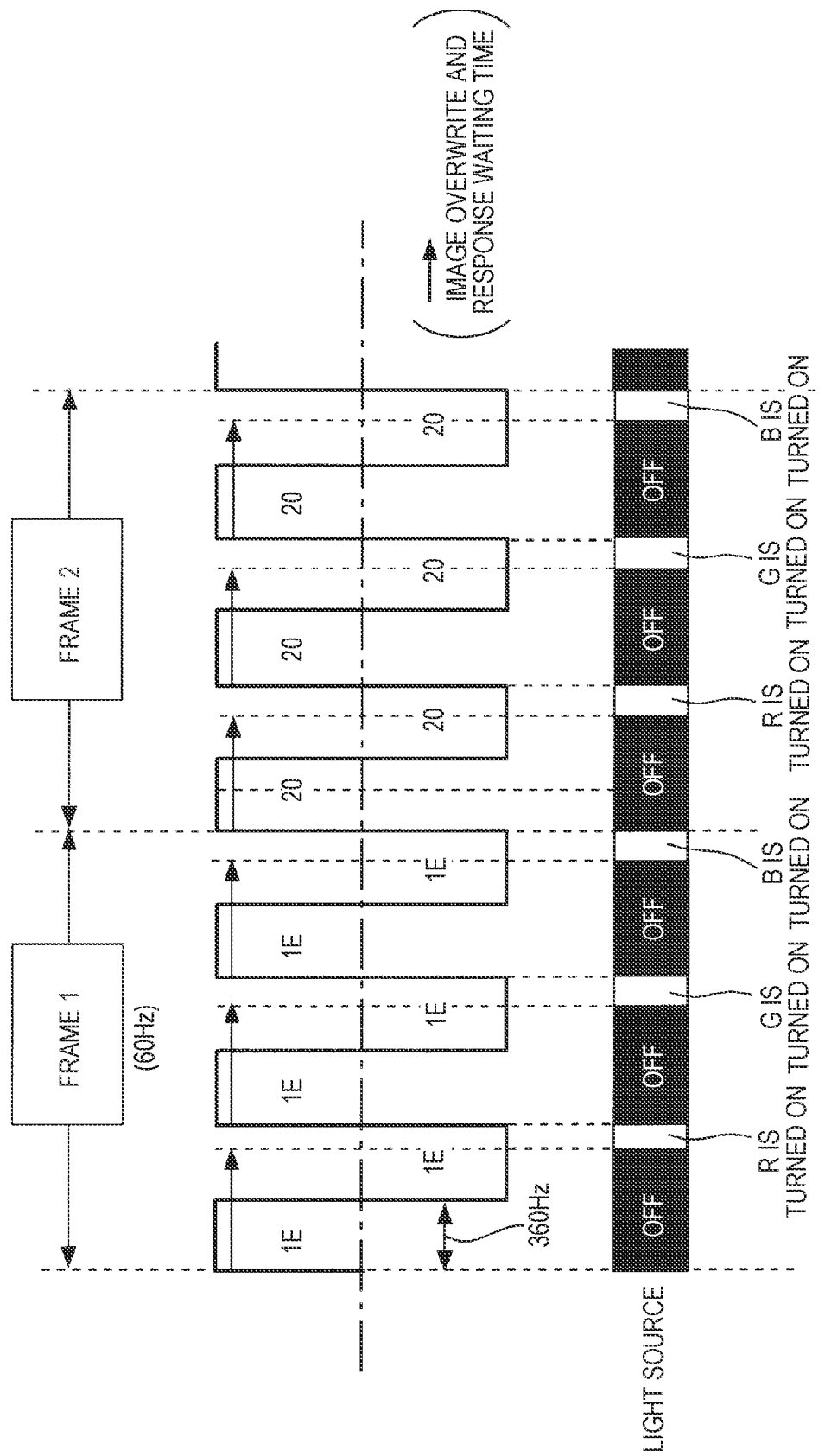
FIG. 34 is a diagram illustrating a display method according to a fifth embodiment.

FIG. 34 is a diagram illustrating a display method according to the fifth embodiment in which the display method of the EVEN frame and the ODD frame by two line simultaneous driving is applied when field sequential driving is performed.

FIG. 34 also shows the on/off timings of R, G, and B light sources.

In this case, it is assumed that a clock frequency (the frequency of the vertical direction clock) is set to be two-thirds of the clock frequency according to the embodiments so as to correspond to the switching between the R, G, and B images within one frame period (in FIG. 34, a period corresponding to 60 Hz).

Then, as shown in FIG. 34, the display of the EVEN frame and the ODD frame is applied to each of the R image, the G image, and the B image that need to be sequentially displayed within one frame period. Specifically, within the display period of the frame 1, the R image is written in the EVEN frame with the positive and negative polarities, the G image is written in the EVEN frame with the positive and negative polarities, and the B image is written in the EVEN frame with the positive and negative polarities.

Within the display period of the next frame 2, similarly the R image is written in the ODD frame with the positive and negative polarities, the G image is written in the ODD frame with the positive and negative polarities, and the B image is written in the ODD frame with the positive and negative polarities. For the subsequent frames, similarly, within each frame period, the writing of the R image with the positive and negative polarities, the writing of the G image with the positive and negative polarities, and the writing of the B image with the positive and negative polarities are performed while switching the EVEN frame and the ODD frame.

According to this display method, it is possible to set the time required for scanning corresponding to one frame, which is performed on the same image two times, to a time length corresponding to 360 Hz so as to correspond to bipolar driving. As a result, it is possible to switch the R, G, and B images at 180 Hz. That is, it is possible to achieve single panel field sequential driving in which no color break-up occurs.

While this display method is performed, the fifth embodiment display device performs the on/off control of the R light, the G light, and the B light as follows.

That is, the R light is turned on after an image write and response waiting time represented by a solid arrow in FIG. 34 has elapsed from the start timing of the display period of the R image within one frame period, and is turned off at the end timing of the display period of the R image.

Similarly, the G light is turned on after the image write and response waiting time has elapsed from the start timing of the display period of the G image within one frame period, and is turned off at the end timing of the display period of the G image.

The B light is turned on after the image write and response waiting time by a solid arrow in FIG. 34 has elapsed from the start timing of the display period of the B image within one frame period, and is turned off at the end timing of the display period of the B image.

5-2. Structure of Display Device

Figure 35:
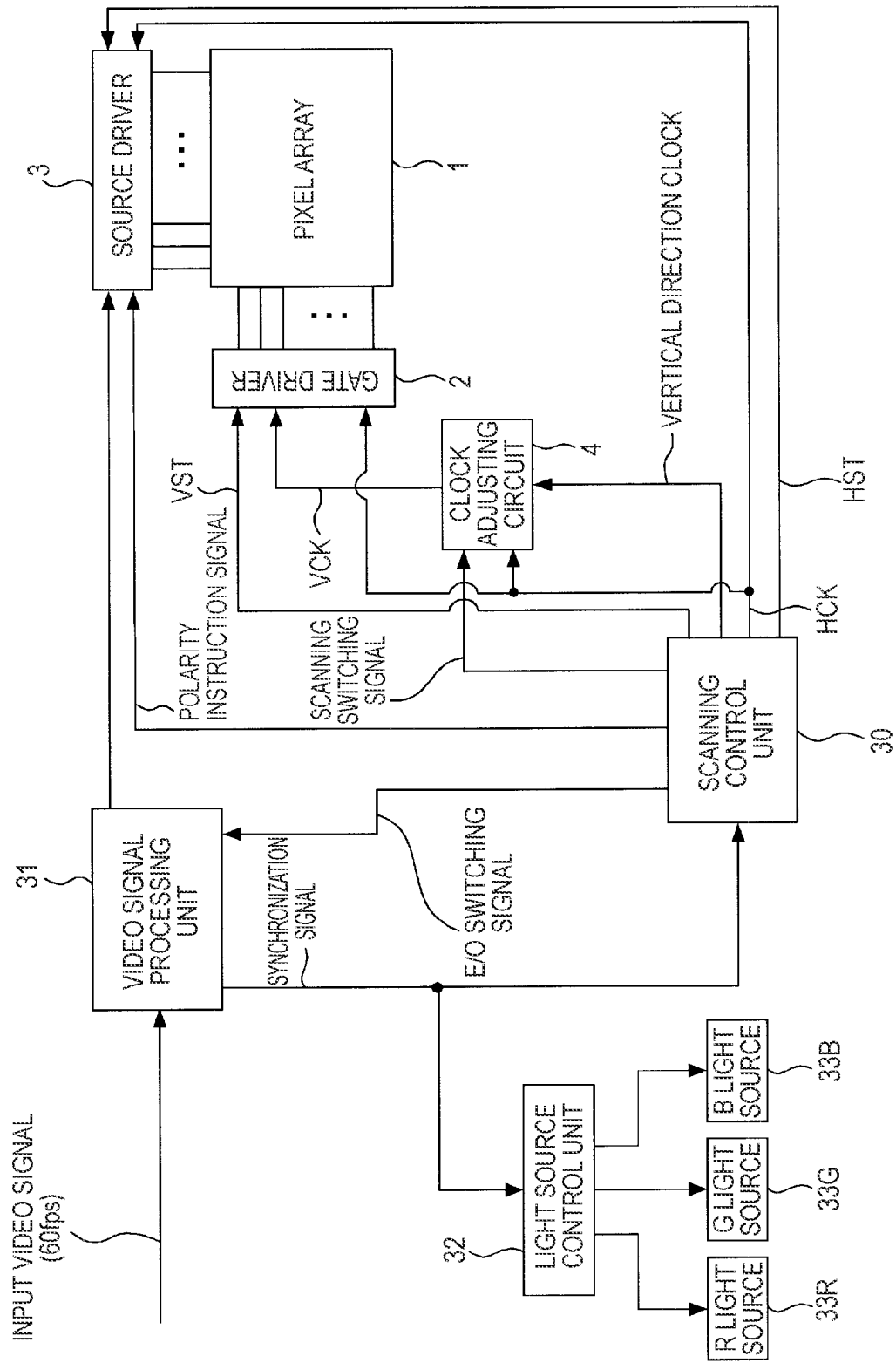
FIG. 35 is a diagram illustrating the internal structure of a display device according to the fifth embodiment.

FIG. 35 is a diagram illustrating the internal structure of a display device according to the fifth embodiment for implementing the display method according to the fifth embodiment.

In FIG. 35, the structure of an optical system is not shown.

The display device according to the fifth embodiment differs from the display device according to the first embodiment in that a scanning control unit 30 is provided instead of the scanning control unit 5 and a video signal processing unit 31 is provided instead of the video signal processing unit 6.

The display device includes an R light source 33R that emits the R light, a G light source 33G that emits the G light, a B light source 33B that emits the B light, and a light source control unit 32 that controls the on/off of the light sources 33.

As can be seen from FIG. 34, the frame rate of the input video signal is 60 fps.

Figure 36:
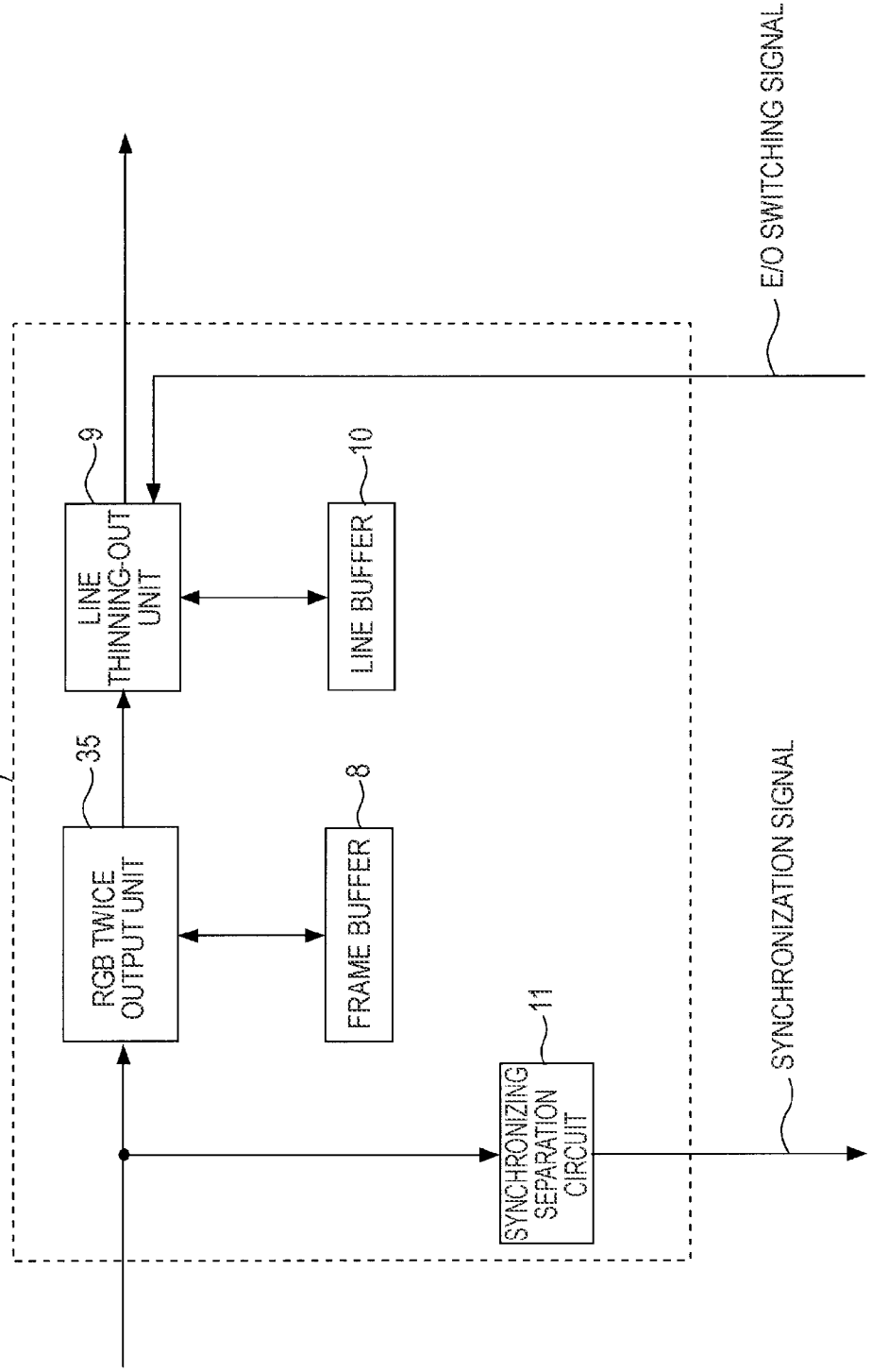
FIG. 36 is a diagram illustrating the internal structure of a video signal processing unit of the display device according to the fifth embodiment.

FIG. 36 is a diagram illustrating the internal structure of the video signal processing unit 31 shown in FIG. 35.

The video signal processing unit 31 differs from the video signal processing unit 6 of the display device according to the first embodiment in that an RGB twice output unit 35 replaces the frame twice output unit 7.

The RGB twice output unit 35 outputs each of the R image (R frame image), the G image (G frame image), and the B image (B frame image) obtained from an input video signal two times using the frame buffer 8 shown in FIG. 36.

As can be understood from FIG. 34, the R image, the G image, and the B image are output two times in this order.

FIG. 35 is referred to again.

The scanning control unit 30 is the same as the scanning control unit 5 in that it generates the timing signals (the vertical direction clock, VST, HCK, and HST), the polarity instruction signal, the E/O switching signal, and the scanning switching signal on the basis of the synchronization signal.

As can be seen from FIG. 34, the polarity instruction signal may instruct to alternately change the positive polarity and the negative polarity with one-sixth of the frame period. Therefore, the scanning control unit 30 generates and outputs as the polarity switching signal a signal that instructs to alternately change the positive polarity and the negative polarity with one-sixth of the frame period based on the synchronization signal input from the video signal processing unit 31.

In addition, the scanning control unit 30 generates and outputs as the E/O switching signal a signal that instructs to alternately change EVEN and ODD with the frame period based on the synchronization signal.

Similarly, the scanning control unit 30 generates and outputs as the scanning switching signal a signal that instructs to alternately change the sets of the lines which are simultaneously driven with the frame period based on the synchronization signal.

As shown in FIG. 34, in this case, the driving of each scanning line starts with one-sixth of the frame period. Therefore, the scanning control unit 30 gives a start pulse with one-sixth of the frame period based on the synchronization signal to generate the vertical direction start instruction signal VST and outputs it.

As the horizontal direction start instruction signal HST, a signal in which the start pulse is given at the start timing of each horizontal line period except for the blank period in the vertical direction is generated and output.

In this case, the same clock adjusting circuit as the clock adjusting circuit 4 according to the first embodiment is used.

That is, in this case, the clock adjusting circuit adds the adjustment pulse to the vertical direction clock according to the type of instruction by the scanning switching signal by the same method as that according to the first embodiment.

For example, it is assumed that one period of the vertical direction clock (that is, in this case, the period for which scanning corresponding to one frame is performed six times within one frame period) is set to a period corresponding to 556 clocks including a blank period of 4 clocks. In this case, similar to the first embodiment, when the scanning switching signal indicates the two line simultaneous driving by the sets shown in FIG. 4A, the clock adjusting circuit may not add the adjustment pulse to three clocks from the head of each period corresponding to 556 clocks of the vertical direction clock, but add the adjustment pulse to the 3rd clock to the 554th clock. When the scanning switching signal indicates the two line simultaneous driving by the sets shown in FIG. 4B, similarly, the clock adjusting circuit may not add the adjustment pulse to three clocks from the head of each period corresponding to 556 clocks of the vertical direction clock, but add the adjustment pulse to the 3rd clock to the 555th clock.

Therefore, it is possible to use the same clock adjusting circuit as the clock adjusting circuit 4 according to the first embodiment.

In FIG. 35, the light source control unit 32 controls the on/off of the R light source 33R, the G light source 33G, and the B light source 33B such that the R light, the B light, and the G light are turned on or off at the timing shown in FIG. 34, on the basis of the synchronization signal supplied from the video signal processing unit 31.

That is, the R light source 33R is turned on after a predetermined time that is set as the image write and response waiting time in advance has elapsed from the start timing of the display period of the R image within one frame period based on the synchronization signal, and is turned off at the end timing of the display period of the R image.

Similarly, the G light source 33G is turned on after a predetermined time that is set as the image write and response waiting time has elapsed from the start timing of the display period of the G image within one frame period based on the synchronization signal, and is turned off at the end timing of the display period of the G image.

The B light source 33B is turned on after a predetermined time that is set as the image write and response waiting time has elapsed from the start timing of the display period of the B image within one frame period based on the synchronization signal, and is turned off at the end timing of the display period of the B image.

6. Sixth Embodiment

6-1. Dynamic Switching to One Line Sequential Driving During Single Panel Field Sequential Driving A sixth embodiment relates to the dynamic switching between single panel field sequential driving to the two line simultaneous driving method according to the fifth embodiment is applied and single panel field sequential driving by the one line sequential driving method.

As can be understood from the above description, it is possible to reduce the scanning time using two line simultaneous driving, but it is difficult to prevent a reduction in resolution in the vertical direction. In order to prevent the reduction in resolution, it is effective to perform one line sequential driving. However, this causes color break-up during single panel field sequential driving.

In the sixth embodiment, the deviation of R, G, and B component of an input image is evaluated. When there is a deviation in the R, G, and B component, it is considered that color break-up is less likely to occur and switching to one line sequential driving is performed.

When there is no deviation in the R, G, and B components and there is a concern that the color break-up will occur, switching to two line simultaneous driving is performed.

In this way, it is possible to prevent a reduction in resolution in the vertical direction while preventing the occurrence of color break-up.

Figure 37:
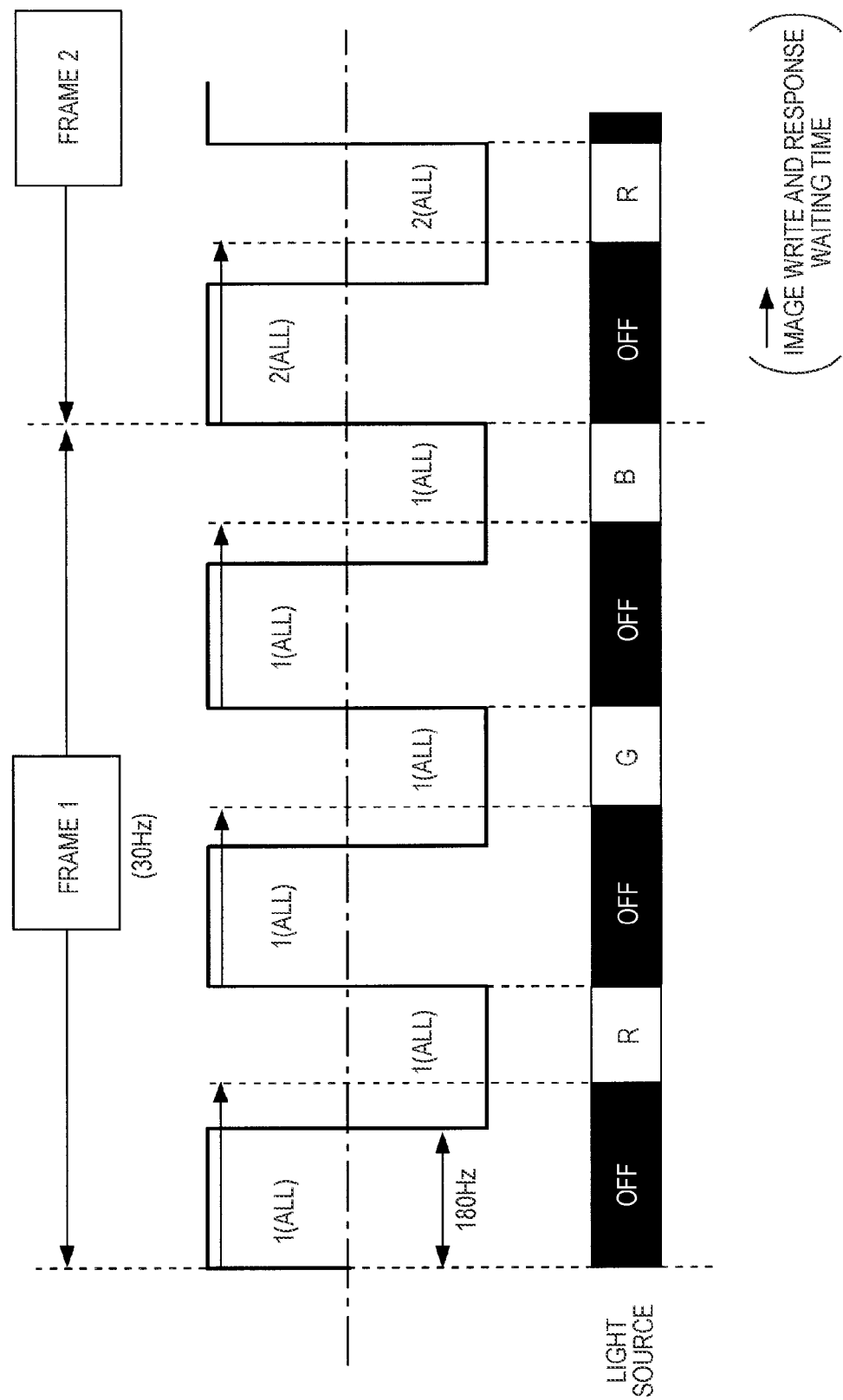
FIG. 37 is a diagram illustrating a display method when one line sequential bipolar driving is performed during single panel field sequential driving.

FIG. 37 is a diagram illustrating a display method (and the on/off timing of each light source) when one line sequential bipolar driving is performed during single panel field sequential driving.

As can be seen from FIG. 37, when switching to one line sequential driving is performed, it is necessary to change the frame rate of an input video signal to half of that during two line simultaneous driving. Specifically, when the frame rate during two line simultaneous driving is 60 Hz as shown in FIG. 34, the frame rate during one line sequential driving is changed to 30 Hz.

6-2. Structure of Display Device

Figure 38:
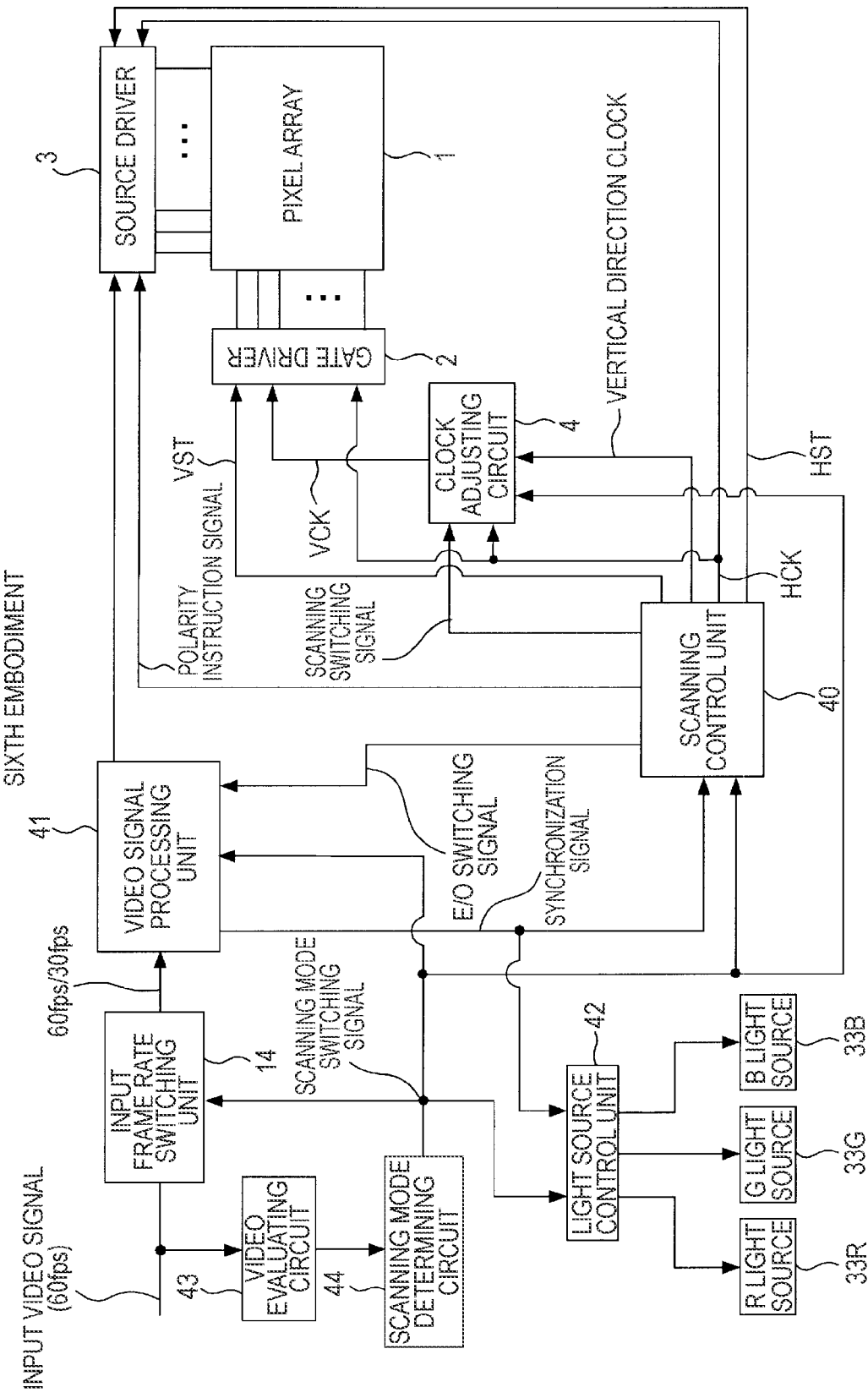
FIG. 38 is a diagram illustrating the internal structure of a display device according to a sixth embodiment.

FIG. 38 is a diagram illustrating the internal structure of a display device according to the sixth embodiment for implementing the display method according to the sixth embodiment.

The display device according to the sixth embodiment differs from the display device according to the fifth embodiment in that a scanning control unit 40 is provided instead of the scanning control unit 30, a video signal processing unit 41 is provided instead of the video signal processing unit 31, and a clock adjusting circuit 13 is provided instead of the clock adjusting circuit 4.

In addition, the display device includes a light source control unit 42 instead of the light source control unit 32.

In this case, the input frame rate switching unit 14 as that according to the second embodiment (FIG. 25) is added, and a video evaluating circuit 43 and a scanning mode determining circuit 44 are newly added.

In this case, the frame rate of an input video signal is set to a value (in this case, 60 fps) corresponding to two line simultaneous scanning.

In FIG. 38, the video evaluating circuit 43 calculates an evaluation value for the deviation of each of the R, G, and B components on the basis of an input video signal.

The scanning mode determining circuit 44 generates a scanning switching signal that instructs a change to the 'general scanning mode' when there is a deviation in the R, G, and B components and instructs a change to the 'two line simultaneous scanning mode' when there is no deviation in the R, G, and B components, on the basis of the evaluation value from the video evaluating circuit 43, and outputs the scanning switching signal.

As shown in FIG. 38, the scanning switching signal from the scanning mode determining circuit 43 is supplied to the input frame rate switching unit 14, the light source control unit 42, the video signal processing unit 41 (the line thinning-out unit 18 in FIG. 39), the scanning control unit 40, the clock adjusting circuit 4, and the clock adjusting circuit 13.

Figure 39:
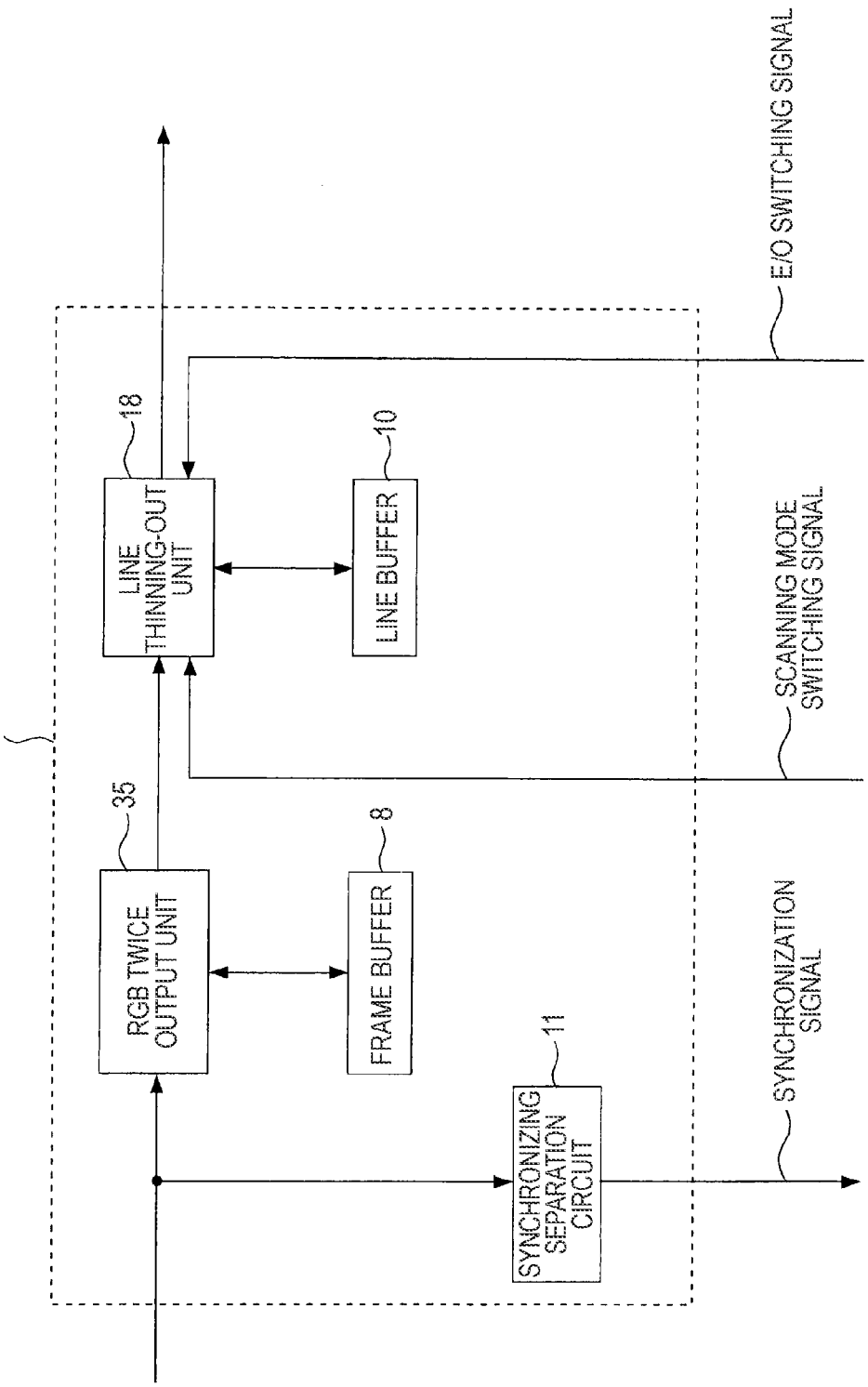
FIG. 39 is a diagram illustrating the internal structure of a video signal processing unit of the display device according to the sixth embodiment.

The video signal processing unit 41 shown in FIG. 38 differs from the video signal processing unit 31 (see FIG. 36) according to the fifth embodiment in that the same line thinning-out unit 18 as that in the second embodiment (FIG. 26) is provided instead of the line thinning-out unit 9, as shown in FIG. 39.

In FIG. 38, the scanning control unit 40 performs the same operation as the scanning control unit 30 according to the fifth embodiment when the scanning mode switching signal indicates the 'two line simultaneous scanning mode'. That is, the scanning control unit 40 differs from the scanning control unit 30 in that it performs an operation corresponding to when the scanning mode switching signal indicates the 'general scanning mode'.

As can be seen from the comparison between FIG. 34 (two line simultaneous driving) and FIG. 37 (one line sequential driving), even when the 'general scanning mode' is instructed, the same polarity instruction signal and E/O switching signal as those when the 'two line simultaneous scanning mode' is instructed are generated.

The same vertical direction start instruction signal VST may be generated when the 'general scanning mode' is instructed and when the 'two line simultaneous scanning mode' is instructed.

That is, in this case, the driving start timing of the scanning line (the output timing of the start pulse in the vertical direction) may appear with half the frame period similar to the 'two line simultaneous scanning mode'. Therefore, as the vertical direction start instruction signal VST, a signal in which the start pulse is obtained with half the frame period based on the synchronization signal in the 'general scanning mode' and the 'two line simultaneous scanning mode' is generated and output.

The horizontal direction start instruction signal HST is the same in the 'general scanning mode' and the 'two line simultaneous scanning mode' in that the start pulse is obtained at the start timing of each horizontal line period except for the blank period in the vertical direction.

Strictly, considering that the blank period is also set to in the horizontal direction as in this embodiment, when two line simultaneous scanning is performed, the start pulse in the horizontal direction is not output during the blank period, is continuously output 552 times (when the EVEN frame is displayed) or 553 times (when the ODD frame is displayed), and is not output during the blank period. These operations are repeatedly performed. On the other hand, when one line sequential scanning is performed, the start pulse in the horizontal direction is not output during the blank period, is continuously output 1104 times, and is not output during the blank period. These operations are repeatedly performed.

Therefore, the scanning control unit 40 switches the output of the horizontal direction start instruction signal HST when the 'two line simultaneous scanning mode' is instructed and when the 'general scanning mode' is instructed.

In FIG. 38, the clock adjusting circuit 13 is the same as that according to the second embodiment. That is, when the scanning mode switching signal indicates the 'two line simultaneous scanning mode', the clock adjusting circuit 13 adds the adjustment pulse to the vertical direction clock according to the type of instruction by the scanning switching signal by the same method as that of the clock adjusting circuit 4. On the other hand, when the scanning mode switching signal indicates the 'general scanning mode', the clock adjusting circuit 13 does not add the adjustment pulse to the vertical direction clock, but outputs the vertical direction clock as the vertical direction clock VCK without any change.

In FIG. 38, when the scanning mode switching signal indicates the 'two line simultaneous scanning mode', the light source control unit 42 controls the R light source 33R, the G light source 33G, and the B light source 33B, similar to the light source control unit 32 according to the fifth embodiment.

On the other hand, when the scanning mode switching signal indicates the 'general scanning mode', the light source control unit 42 controls the R light source 33R, the G light source 33G, and the B light source 33B using the information of an image overwrite and response waiting time in the 'general scanning mode', which is different from the image overwrite and response waiting time in the 'two line simultaneous scanning mode'.

7. Modifications

Although the embodiments of the invention have been described above, the invention is not limited thereto.

For example, in each embodiment, it is assumed that the frame rate is set to 60 fps during general driving. However, the value of the frame rate described in the embodiments is just an illustrative example, but the invention is not limited thereto.

The number of effective pixels in the vertical and horizontal directions according to the embodiments is just an illustrative example, but the invention is not limited thereto. In addition, the number of clocks within one period of the vertical direction clock (the number of clocks within one frame period) is just an illustrative example, but the invention is not limited thereto. The number of clocks within one frame period may be appropriately changed according to the actual embodiments.

In the embodiments, as shown in FIG. 3B, when a plurality of lines in each set in which there is no remaining line are simultaneously driven, the image signal of the EVEN line is displayed. When a plurality of lines in each set in which there is the remaining line are simultaneously driven, the image signal of the ODD line is displayed. However, inversely, when a plurality of lines in each set in which there is no remaining line are simultaneously driven, the image signal of the ODD line may be displayed. When a plurality of lines in each set in which there is the remaining line are simultaneously driven, the image signal of the EVEN line may be displayed.

In this case, when the EVEN line is displayed, the remaining line occurs. The signal value of the EVEN line (line 0) with the largest line number is written when the scanning line with line No. 0 is driven. In this way, for example, when the ODD line is displayed, the image of the line 1 of an input image is displayed on a set of 'the scanning line 0 and the scanning line 1', and the image of the line 3 of the input image is displayed on a set of ' the scanning line 2 and the scanning line 3'. Meanwhile, when the EVEN line is displayed, the image of 'the line 0' of an input image is displayed on 'the scanning line 0', and the image of the line 2 of the input image is displayed on a set of 'the scanning line 1 and the scanning line 2'. As such, it is possible to ensure the consistence of the relationship between the display positions of the lines in the vertical direction when the ODD line is displayed and when the EVEN line is displayed.

In particular, for the application of the 3D system to the two line simultaneous driving and the application of the two line simultaneous driving to the single panel field sequential driving according to the third embodiment and the fifth embodiment, in the third and fifth embodiments, in order to achieve 'two line simultaneous driving and a change in the sets of the lines that are simultaneously driven', the vertical direction clock (shift clock) is adjusted, similar to the first embodiment. A method of achieving the 'two line simultaneous driving and a change in the sets of the lines that are simultaneously driven' according to the third and fifth embodiments is not limited to the adjustment of the shift clock. For example, other methods, such as a method shown in FIG. 40 (JP-A-4-104675), may be used.

In the embodiments, the invention is applied to the structure in which the source division driving shown in FIG. 8 is performed. However, the invention may be appropriately applied to the structure in which a method of collectively writing the signal values to the signal lines is performed.

In the embodiments, the invention is applied to the display of the liquid crystal. For example, the invention may be appropriately applied to the display of other FPDs (flat panel displays), such as an organic EL display.

The present application contains subject matter related to that disclosed in Japanese Priority Patent Application JP 2009-120730 filed in the Japan Patent Office on May 19, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
    a pixel array unit including a plurality of scanning lines and a plurality of signal lines;
    a scanning line driving unit that sequentially applies a driving voltage to the plurality of scanning lines according to a shift timing indicated by a shift clock;
    a signal line driving unit that drives the plurality of signal lines on the basis of an input video signal;
    a clock adjusting unit that adjusts the shift clock such that there are n (n is a natural number equal to or greater than 2) shift timings within each one horizontal line period for which an image signal corresponding to one horizontal line is displayed, wherein the clock adjusting unit adjusts the shift clock in response to an instruction such that a state in which there are plurality of shift timings within one horizontal line period and a state in which there is one shift timing within one horizontal line period are switched; and
    a video evaluating unit that evaluates the input video signal, wherein the clock adjusting unit adjusts the shift clock in response to an instruction based on the evaluation result of the video evaluating unit such that the state in which there are the plurality of shift timings within one horizontal line period and the state in which there is one shift timing within one horizontal line period are switched.

2. The display device according to claim 1, further comprising:
    a mask unit that generates a mask signal for masking a scanning line driving signal for the period from the start timing of at least one horizontal line period to an n-th shift timing indicated by the shift clock within the one horizontal line period.

3. The display device according to claim 1, further comprising:
    a line thinning-out unit that thins out even-numbered horizontal lines or odd-numbered horizontal lines of a frame image obtained from the input video signal and outputs the thinned-out lines to the signal line driving unit;
    a first driving control unit that controls the clock adjusting unit such that sets of the plurality of scanning lines which are simultaneously driven are alternately changed with a frame period; and
    a first even-numbered/odd-numbered line output switching control unit that performs control such that the output of the even-numbered horizontal lines and the output of the odd-numbered horizontal lines by the line thinning-out unit are alternately switched with the frame period.

4. The display device according to claim 1, wherein bipolar driving is performed in which a writing operation is performed two times with positive polarity and negative polarity to display and output the same frame image.

5. The display device according to claim 4, further comprising:
    a scanning start timing control unit that gives a blank period with a length equal to the period for which scanning corresponding to one frame is performed each time the scanning corresponding to one frame, which is performed on the same frame image two times, is completed at a time in correspondence with the bipolar driving, thereby controlling the driving start timing of the scanning lines by the scanning line driving unit;
    a line thinning-out/twice output unit thins out the even-numbered horizontal lines or the odd-numbered horizontal lines of the frame image signal obtained from the input video signal and outputs the thinning result to the signal line driving unit two times in a row;
    a second driving control unit that controls the clock adjusting unit such that the sets of the plurality of scanning lines which are simultaneously driven are changed each time the scanning corresponding to one frame is performed two times in correspondence with the bipolar driving; and
    a second even-numbered/odd-numbered line output switching control unit that performs control such that the output of the even-numbered horizontal lines and the output of the odd-numbered horizontal lines by the line thinning-out/twice output unit are alternately switched each time the scanning corresponding to one frame is performed two times in correspondence with the bipolar driving.

6. A display method of a display device:
adjusting a clock adjusting unit to adjust a shift clock to output a signal to a scanning line driving unit, wherein the signal comprises n shift timings within each one horizontal line period for simultaneously driving a set of scanning lines, wherein the set of scanning lines is dynamically selected from a plurality of scanning lines based on the n shift timings applied within each one horizontal period, wherein n is a natural number equal to or greater than 2.

7. The display method of a display device according to claim 6, further comprising:
evaluating the input video signal,
adjusting the shift clock in response to an instruction based on the evaluation of the input video signal such that a state in which there are plurality of shift timings within one horizontal line period and a state in which there is one shift timing within one horizontal line period are switched.

8. A display device comprising:
a pixel array unit including a plurality of scanning lines and a plurality of signal lines;
a scanning line driving unit that sequentially applies a driving voltage to the plurality of scanning lines according to a shift timing indicated by a shift clock;
a signal line driving unit that drives the plurality of signal lines on the basis of an input video signal;
a clock adjusting unit that adjusts the shift clock such that there are n (n is a natural number equal to or greater than 2) shift timings within each one horizontal line period for which an image signal corresponding to one horizontal line is displayed, wherein bipolar driving is performed in which a writing operation is performed two times with polarity and negative polarities to display and output the same frame image;
a scanning start timing control unit that gives a blank period with a length equal to the period for which scanning corresponding to one frame is performed each time the scanning corresponding to one frame, which is performed on the same frame image two times, is completed at a time in correspondence with the bipolar driving, thereby controlling the driving start timing of the scanning lines by the scanning line driving unit;
a line thinning-out/twice output unit thins out the even-numbered horizontal lines or the odd-numbered horizontal lines of the frame image signal obtained from the input video signal and outputs the thinning result to the signal line driving unit two times in a row;
a second driving control unit that controls the clock adjusting unit such that the sets of the plurality of scanning lines which are simultaneously driven are changed each time the scanning corresponding to one frame is performed two times in correspondence with the bipolar driving; and
a second even-numbered/odd-numbered line output switching control unit that performs control such that the output of the even-numbered horizontal lines and the output of the odd-numbered horizontal lines by the line thinning-out/twice output unit are alternately switched each time the scanning corresponding to one frame is performed two times in correspondence with the bipolar driving.

9. The display device according to claim 8, further comprising:
a mask unit that generates a mask signal for masking a scanning line driving signal for the period from the start timing of at least one horizontal line period to an n-th shift timing indicated by the shift clock within the one horizontal line period.

10. The display device according to claim 8, further comprising:
a line thinning-out unit that thins out even-numbered horizontal lines or odd-numbered horizontal lines of a frame image obtained from the input video signal and outputs the thinned-out lines to the signal line driving unit;
a first driving control unit that controls the clock adjusting unit such that sets of the plurality of scanning lines which are simultaneously driven are alternately changed with a frame period; and
a first even-numbered/odd-numbered line output switching control unit that performs control such that the output of the even-numbered horizontal lines and the output of the odd-numbered horizontal lines by the line thinning-out unit are alternately switched with the frame period.

11. The display device according to claim 8,
wherein the clock adjusting unit adjusts the shift clock in response to an instruction such that a state in which there are plurality of shift timings within one horizontal line period and a state in which there is one shift timing within one horizontal line period are switched.

12. The display device according to claim 11, further comprising:
a video evaluating unit that evaluates the input video signal,
wherein the clock adjusting unit adjusts the shift clock in response to an instruction based on the evaluation result of the video evaluating unit such that the state in which there are the plurality of shift timings within one horizontal line period and the state in which there is one shift timing within one horizontal line period are switched.

* * * * *